(12) United States Patent
Bongir et al.

(10) Patent No.: US 12,374,785 B2
(45) Date of Patent: Jul. 29, 2025

(54) ANTENNA MOUNT ASSEMBLY

(71) Applicant: Hirschmann Car Communication Inc., Wilmington, DE (US)

(72) Inventors: Sumit Bongir, Pune (IN); Yassine Borkadi, Ann Arbor, MI (US); Alan Miller, Auburn Hills, MI (US)

(73) Assignee: Hirschmann Car Communication Inc., Wilmington, DE (US)

( * ) Notice: Subject to any disclaimer, the term of this patent is extended or adjusted under 35 U.S.C. 154(b) by 331 days.

(21) Appl. No.: 17/895,611

(22) Filed: Aug. 25, 2022

(65) Prior Publication Data

US 2023/0093217 A1    Mar. 23, 2023

Related U.S. Application Data

(60) Provisional application No. 63/280,687, filed on Nov. 18, 2021.

(30) Foreign Application Priority Data

Sep. 17, 2021 (IN) .............................. 202141042143

(51) Int. Cl.
*H01Q 1/32* (2006.01)
*B60R 11/00* (2006.01)
*B60R 16/03* (2006.01)
*H01Q 1/12* (2006.01)

(52) U.S. Cl.
CPC ........... *H01Q 1/3275* (2013.01); *B60R 11/00* (2013.01); *B60R 16/03* (2013.01); *H01Q 1/1214* (2013.01); *H01Q 1/3233* (2013.01); *B60R 2011/004* (2013.01); *B60R 2011/0052* (2013.01)

(58) Field of Classification Search
CPC ................ H01Q 1/3275; H01Q 1/1214; B60R 2011/004
See application file for complete search history.

(56) References Cited

U.S. PATENT DOCUMENTS

| 6,714,171 B2 | 3/2004 | Haussler et al. |
| 7,268,734 B2 | 9/2007 | Cislo |
| 7,333,065 B2 | 2/2008 | Lindackers et al. |
| 7,339,548 B2 | 3/2008 | Cislo |

(Continued)

FOREIGN PATENT DOCUMENTS

| BR | 202020001955 U2 | 8/2020 |
| CA | 2831022 C | 9/2012 |

(Continued)

*Primary Examiner* — Bradley Duckworth
(74) *Attorney, Agent, or Firm* — Laurence A. Greenberg; Werner H. Stemer; Ralph E. Locher

(57) ABSTRACT

An antenna mount assembly includes a baseplate having a bolt hub with a threaded bore and a sliding ramp. A vehicle mounting bracket is coupled to the baseplate with rooftop latches latchably coupled to an interior surface of a rooftop of a vehicle. A lock assembly is located below the baseplate and includes mounting legs coupled to the interior surface of the rooftop. The lock assembly includes a slider post engaging the sliding ramp to locate the lock assembly relative to the baseplate. A bolt is threadably coupled to the baseplate and tightened to move the lock assembly toward the baseplate. The slider post slides along the sliding ramp to rotate the lock assembly to a locked position.

33 Claims, 38 Drawing Sheets

(56) References Cited

U.S. PATENT DOCUMENTS

| | | | |
|---|---|---|---|
| 7,429,958 B2 | 9/2008 | Lindackers et al. | |
| 7,492,318 B2 | 2/2009 | Duzdar et al. | |
| 7,492,319 B2 | 2/2009 | Lindackers et al. | |
| 7,755,551 B2 | 7/2010 | Lindackers et al. | |
| 8,248,315 B2 | 8/2012 | Lindackers et al. | |
| 8,441,401 B2 | 5/2013 | Steinkamp et al. | |
| 8,570,233 B2 | 10/2013 | Lindmark et al. | |
| 8,814,127 B2 * | 8/2014 | Sato | H01Q 1/1214 248/536 |
| 9,178,272 B2 | 11/2015 | Chakam et al. | |
| 9,608,315 B2 * | 3/2017 | Gerneth | H01Q 1/1214 |
| 10,008,767 B2 | 6/2018 | Yasin et al. | |
| 10,148,004 B2 * | 12/2018 | Taira | B60R 11/00 |
| 10,283,852 B2 | 5/2019 | Thiam et al. | |
| 10,355,335 B2 | 7/2019 | Ohno et al. | |
| 11,095,015 B2 * | 8/2021 | Gerneth | H01Q 1/3275 |
| 2011/0226927 A1 * | 9/2011 | Sato | H01Q 1/3275 248/534 |
| 2013/0026331 A1 | 1/2013 | Kodaka | |
| 2014/0292593 A1 | 10/2014 | Thiam et al. | |
| 2016/0064807 A1 | 3/2016 | Reed et al. | |
| 2018/0309184 A1 * | 10/2018 | Iwakami | H01Q 1/1207 |

FOREIGN PATENT DOCUMENTS

| | | |
|---|---|---|
| CN | 208507917 U | 2/2019 |
| EP | 3731341 A1 | 10/2010 |
| JP | 2018182494 A | 11/2018 |

* cited by examiner

ANTENNA MOUNT ASSEMBLY

CROSS REFERENCE TO RELATED APPLICATIONS

This application claims benefit to Indian Application No. 202141042143, filed 17 Sep. 2021, and claims benefit to U.S. Provisional Application No. 63/280,687, filed 18 Nov. 2021, the subject matter of which are herein incorporated by reference in their entirety.

BACKGROUND OF THE INVENTION

The subject matter herein relates generally to antennas for vehicles.

Antennas are used on vehicles for various purposes, such as radio, navigation, global positioning systems (GPS), vehicle-to-vehicle communication, and the like. Some known antennas are mounted to the rooftop of the vehicle. Assembly of the antenna to the rooftop may be difficult and time consuming. For example, it may be desirable for the antenna to be located at the exterior of the vehicle but it may also be desirable to mount the antenna from the interior of the vehicle. Positioning of the antenna during installation may be difficult to maintain. Additionally, holding the loose pieces together during installation may be problematic. Installation may require multiple people, such as one installer holding the antenna at the exterior of the vehicle and another installer inside the vehicle securing the antenna to the rooftop, which increases labor costs for vehicle assembly.

A need remains for a reliable and cost effective antenna mount assembly for mounting an antenna to a vehicle.

BRIEF DESCRIPTION OF THE INVENTION

In one embodiment, an antenna mount assembly is provided and includes a baseplate having an upper surface and a lower surface. The lower surface is configured to be coupled to an exterior surface of a rooftop of a vehicle. The baseplate has a bolt hub with a threaded bore. The bolt hub has a sliding ramp angled non-parallel to the baseplate. The antenna mount assembly includes a vehicle mounting bracket coupled to the baseplate. The vehicle mounting bracket includes rooftop latches latchably coupled to an interior surface of the rooftop of the vehicle. The antenna mount assembly includes a lock assembly located below the lower surface of the baseplate and is configured to face the interior surface of the rooftop of the vehicle. The lock assembly includes a base and mounting legs extending from the base. The mounting legs are configured to be coupled to the interior surface of the rooftop of the vehicle. The lock assembly has at least one cable opening configured to hold at least one antenna cable. The lock assembly has a slider post engaging the sliding ramp to locate the lock assembly relative to the baseplate and a bolt threadably coupled to the baseplate. The bolt has a head coupled to the lock assembly. The bolt has a threaded shank extending from the head received in the threaded bore of the bolt hub. The bolt is tightened to move the lock assembly toward the baseplate. The slider post slides along the sliding ramp as the lock assembly is moved toward the baseplate to rotate the lock assemblies to a locked position. The mounting legs engage a vehicle by tightening the bolt to drive the mounting legs of the lock assembly into the interior surface of the rooftop to tightly couple the assembled unit to the rooftop of the vehicle.

In another embodiment, an antenna mount assembly is provided and includes a baseplate having an upper surface and a lower surface. The lower surface is configured to be coupled to an exterior surface of a rooftop of a vehicle. The baseplate has a bolt hub having a threaded bore. The baseplate includes cable slots extending therethrough configured to receive at least one antenna cable. The antenna mount assembly includes a vehicle mounting bracket coupled to the upper surface of the baseplate. The vehicle mounting bracket includes rooftop latches latchably coupled to an interior surface of the rooftop of the vehicle. The antenna mount assembly includes a lock assembly located below the lower surface of the baseplate and configured to face the interior surface of the rooftop of the vehicle. The lock assembly includes a base and mounting legs extending from the base. The mounting legs are configured to be coupled to the interior surface of the rooftop of the vehicle. The lock assembly is rotated relative to the baseplate to a locked position. The mounting legs engage the rooftop in the locked position. The lock assembly has cable openings configured to hold the corresponding cables. The lock assembly rotates the cables relative to the baseplate in the cable slots as the lock assembly moves to the locked position. The antenna mount assembly includes a bolt threadably coupled to the baseplate. The bolt has a head coupled to the lock assembly. The bolt has a threaded shank extending from the head received in the threaded bore of the bolt hub. The bolt is tightened to move the lock assembly toward the baseplate as the lock assembly is moved to the locked position.

In a further embodiment, an antenna mount assembly is provided and includes a baseplate having an upper surface and a lower surface. The lower surface is configured to be coupled to an exterior surface of a rooftop of a vehicle. The baseplate has a threaded bore extending through the baseplate. The baseplate includes at least one cable slot extending therethrough configuring to receive at least one antenna cable. The antenna mount assembly includes a vehicle mounting bracket having a ring coupled to the upper surface of the baseplate. The ring has an opening aligned with the treaded bore. The vehicle mounting bracket includes rooftop latches extending from the ring. The rooftop latches extend through the baseplate to latchably couple to an interior surface of the rooftop of the vehicle. The antenna mount assembly includes a lock assembly located below the lower surface of the baseplate and configured to face the interior surface of the rooftop of the vehicle. The lock assembly includes a base and mounting legs extending from the base. The mounting legs are configured to be coupled to the interior surface of the rooftop of the vehicle. The lock assembly has at least one cable opening configured to hold the corresponding at least one antenna cable. It has a bolt threadably coupled to the baseplate. The bolt has a head coupled to the lock assembly. The bolt has a threaded shank extending from the head. The threaded shank is received in the threaded bore of the baseplate and being threadably coupled to the baseplate in the threaded bore. The bolt includes a retainer extending from the threaded shank. The retainer couples to the baseplate. The bolt couples the lock assembly to the baseplate and the vehicle mounting bracket as an assembled unit to restrict inadvertent disassembly of the vehicle antenna assembly. The assembled unit is configured to be mounted to the rooftop of the vehicle by passing the bolt, the lock assembly through an opening in the rooftop. The assembled unit is configured to be mounted to the rooftop of the vehicle by loosely coupling the vehicle mounting bracket to the rooftop. The assembled unit is configured to be mounted to the rooftop of the vehicle by tightening the bolt to drive the mounting legs of the lock assembly into the interior surface of the rooftop to tightly couple the assembled unit to the rooftop of the vehicle.

DETAILED DESCRIPTION OF THE INVENTION

Figure 1:
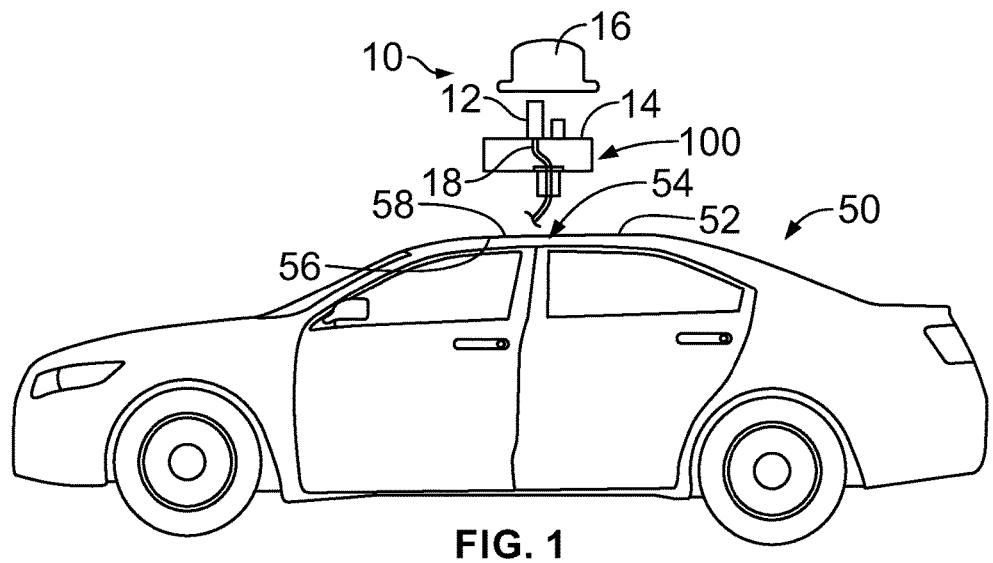
FIG. 1 is a schematic view of an antenna for a vehicle and an antenna mount assembly in accordance with an exemplary embodiment used to mount the antenna to the vehicle.

FIG. 1 is a schematic view of an antenna 10 for a vehicle 50 and an antenna mount assembly 100 in accordance with an exemplary embodiment used to mount the antenna 10 to the vehicle 50. The antenna 10 is configured to be mounted to a rooftop 52 of the vehicle 50. The antenna mount assembly 100 is configured to be coupled to the rooftop 52 to secure the antenna 10 to the vehicle 50. In an exemplary embodiment, the antenna mount assembly 100 is received in an opening 54 in the rooftop 52. The opening 54 may be a small opening in the rooftop 52, such as being approximately 20 mm×20 mm; however, the opening 54 may have other sizes or shapes in alternative embodiments. The antenna mount assembly 100 may be secured to an interior surface 56 of the rooftop 52 to mount the antenna 10 to an exterior surface 58 of the rooftop 52.

In an exemplary embodiment, the antenna 10 includes one or more antenna elements 12 mounted to an antenna circuit board 14. The antenna mount assembly 100 is configured to be coupled to the antenna 10, such as the antenna circuit board 14 for mounting the antenna 10 to the vehicle 50. In an exemplary embodiment, the antenna 10 includes a cover 16, such as a radome, that covers the antenna elements 12 and defines the exterior of the antenna 10. In various embodiments, the cover 16 is fin shaped defining a shark fin antenna. The antenna 10 may have other shapes in alternative embodiments. The antenna 10 may be mounted to other portions of the vehicle 50 other than the rooftop 52 in alternative embodiments.

In an exemplary embodiment, the antenna mount assembly 100 is preassembled as an assembled unit 102. The assembled unit 102 is configured to be mounted to the vehicle 50 as a single piece. For example, an installer does not need to handle multiple pieces during the installation. The antenna mount assembly 100 is installed from above. For example, a portion of the antenna mount assembly 100 may be lowered through the opening 54 to the interior of the vehicle 50. In an exemplary embodiment, the installer accesses the bottom portion of the antenna mount assembly 100 from the interior of the vehicle 50 to tighten and lock the antenna mount assembly 100 to the rooftop 52. For example, the antenna mount assembly 100 may include a threaded fastener, such as a bolt, that is accessed from the interior of the vehicle 50, which is tightened to lock the antenna mount assembly 100 to the rooftop 52.

Figure 2:
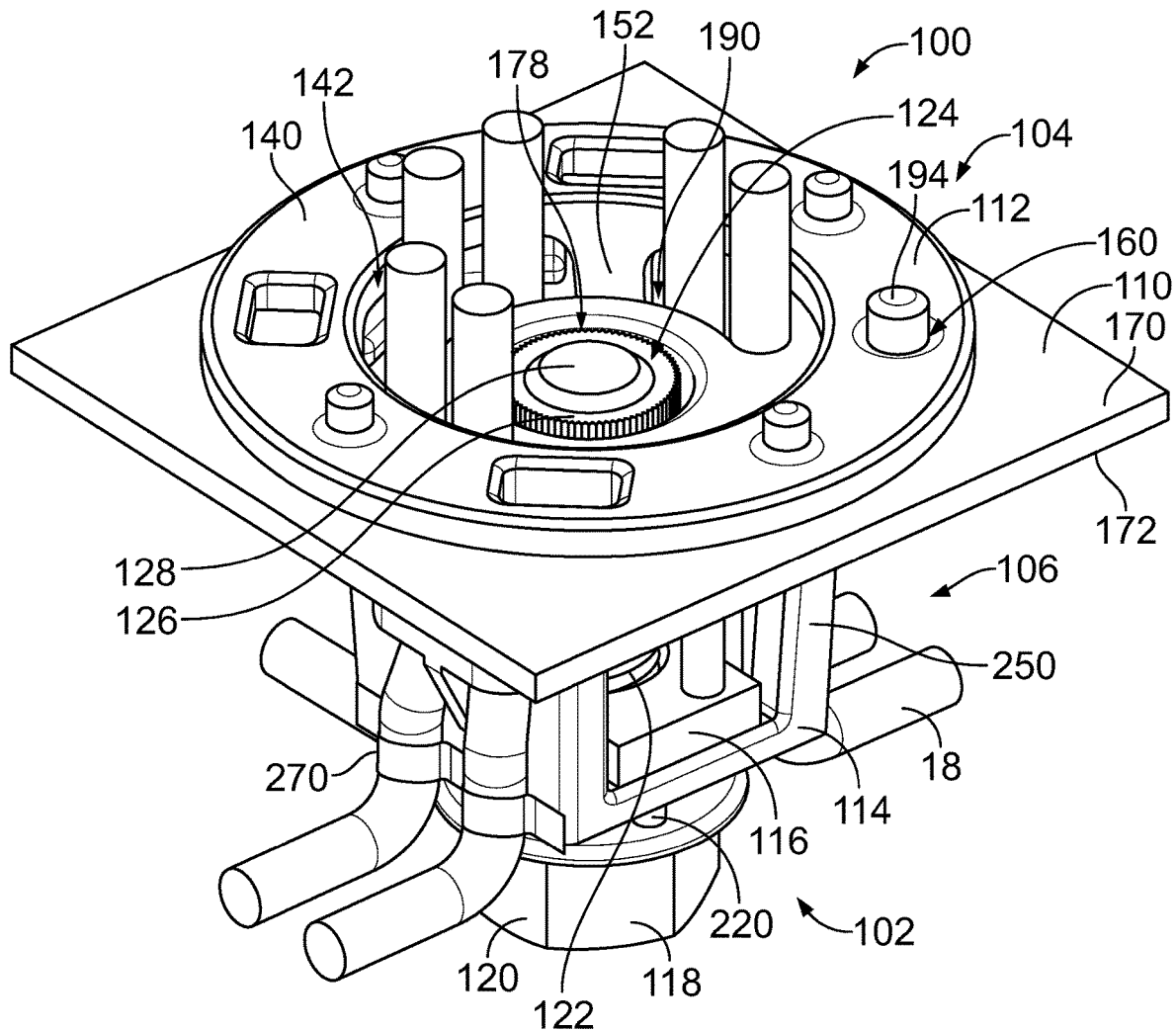
FIG. 2 is a top perspective view of the antenna mount assembly in accordance with an exemplary embodiment.
Figure 3:
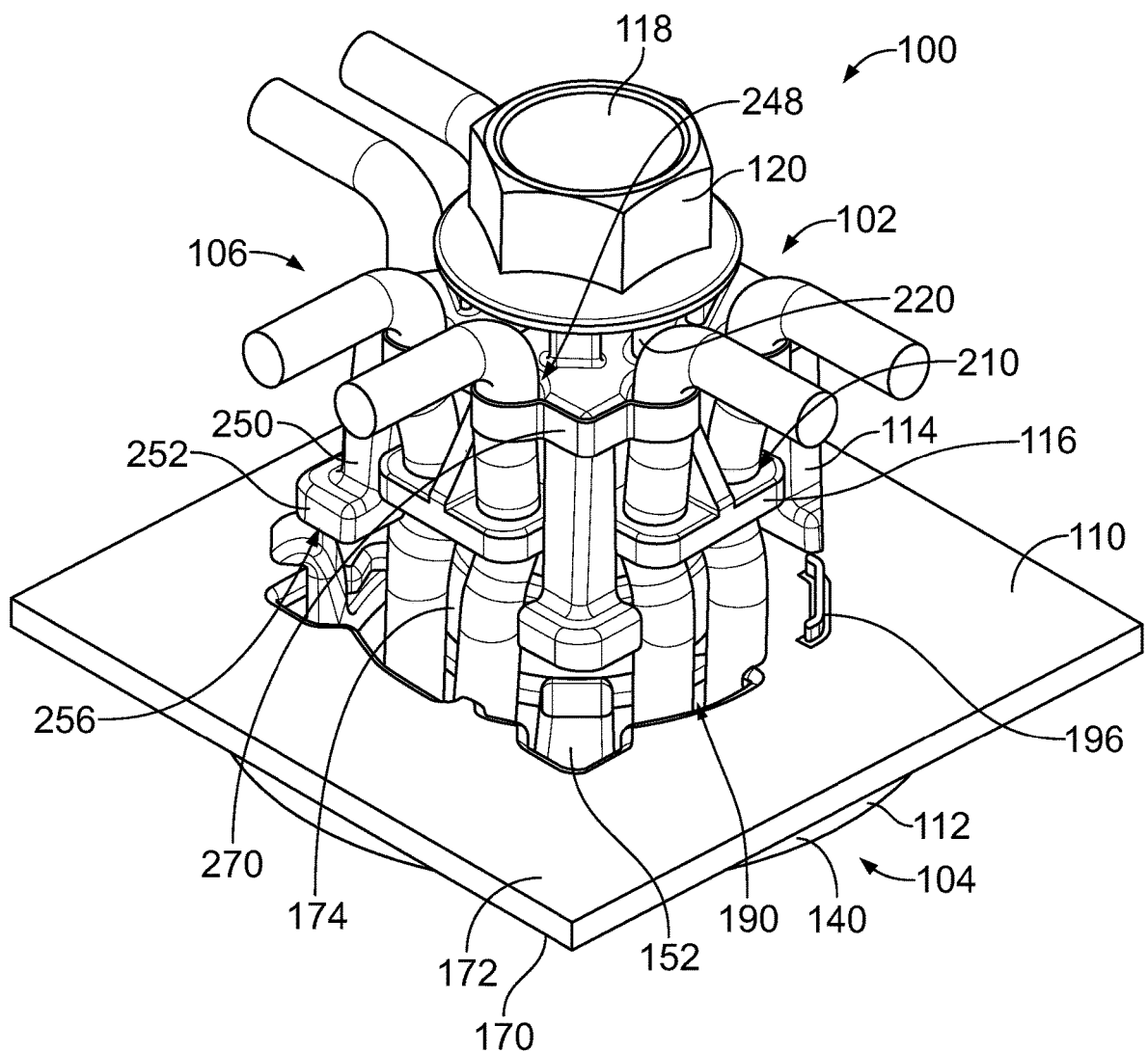
FIG. 3 is a bottom perspective view of the antenna mount assembly in accordance with an exemplary embodiment.

FIG. 2 is a top perspective view of the antenna mount assembly 100 in accordance with an exemplary embodiment. FIG. 3 is a bottom perspective view of the antenna mount assembly 100 in accordance with an exemplary embodiment. FIGS. 2 and 3 illustrates the antenna mount assembly 100 as the assembled unit 102 with the individual pieces of the antenna mount assembly 100 loosely held together as the assembled unit 102. For example, the individual pieces of the antenna mount assembly 100 are unable to be separated or fall apart from the assembled unit 102 during the installation process. The assembled unit 102 includes an upper portion 104 and a lower portion 106. The lower portion 106 is coupled to the upper portion 104 to form the assembled unit 102. The upper portion 104 is configured to be located along the exterior of the vehicle 50 (shown in FIG. 1) while the lower portion 106 is configured to be located within the interior of the vehicle 50. During installation, the lower portion 106 may be lowered into the interior of the vehicle 50 through the opening 54 from the exterior of the vehicle 50.

The antenna mount assembly 100 includes a baseplate 110, a vehicle mounting bracket 112, a lock assembly 115, and a bolt 118. The baseplate 110 and the vehicle mounting bracket 112 form the upper portion 104 of the assembled unit 102. The lock assembly 115 is used to mount the antenna mount assembly 100 to the vehicle 50, such as mounting the baseplate 110 and/or the vehicle mounting bracket 112 to the vehicle 50. In an exemplary embodiment, the lock assembly 115 includes a mounting lock 114 and a cable frame 116. The mounting lock 114 and the cable frame 116 form the lower portion 106 of the assembled unit 102. In various embodiments, the mounting lock 114 and the cable frame 116 are separate and discrete structures configured to be coupled together to form the lock assembly 115. In alternative embodiments, the cable frame 116 may be integrated with the mounting lock 114 as a unitary, single piece structure. The bolt 118 extends through the antenna mount assembly 100 from the top to the bottom and thus forms part of the upper portion 104 and the lower portion 106.

In an exemplary embodiment, the bolt 118 is a threaded fastener. The bolt 118 includes a head 120 and a threaded shank 122 extending from the head 120. In an exemplary embodiment, the bolt 118 includes a retainer 124 used to secure the bolt 118 to the baseplate 110. In the illustrated embodiment, the retainer 124 includes a threaded nut 126.

The threaded nut 126 is coupled to a distal end 128 of the threaded shank 122 opposite the head 120. Optionally, the threaded nut 126 may be secured to the end of the threaded shank, such as using a threadlocker. When the retainer 124 is coupled to the bolt 118, the bolt 118 is retained with the baseplate 110. The bolt 118 is unable to be inadvertently disassembled or removed from the baseplate 110. When the bolt 118 is untightened, the retainer 124 is coupled to the baseplate 110 to prevent removal of the bolt 118 from the baseplate 110. The bolt 118 is used to secure the lock assembly 115 (for example, the mounting lock 114 and the cable frame 116) to the baseplate 110. When the retainer 124 is coupled to the bolt 118, the bolt 118, the cable frame 116, and the mounting lock 114 are unable to be inadvertently disassembled from the baseplate 110. The pieces form the assembled unit 102 which may be installed on the vehicle 50 without losing any of the pieces during assembly. The installer does not need a separate bolt to securely locked the antenna mount assembly 100 to the vehicle 50 during installation. Rather, all of the components of the antenna mount assembly 100 may be installed onto the vehicle 50 from above as the assembled unit 102.

In an exemplary embodiment, the antenna mount assembly 100 is used to hold one or more antenna cables 18. For example, the cable frame 116 may hold the antenna cables 18. Optionally, a plurality of the antenna cables 18 may be held by the cable frame 116. For example, in the illustrated embodiment, the cable frame 116 holds six of the antenna cables 18. Optionally, the antenna cables 18 may be held in pairs. The antenna cables 18 may be spaced apart around the cable frame 116. For example, the antenna cables 18 may be provided on multiple sides of the cable frame 116. The antenna cables 18 are configured to be electrically connected to corresponding antenna elements 12 of the antenna 10 (shown in FIG. 1). The antenna mount assembly 100 is used to route the cables through the rooftop 52 of the vehicle 50 (shown in FIG. 1) from the antenna 10 at the exterior of the vehicle to other components at the interior of the vehicle 50, such as the radio, the GPS, the navigation system, or other components of the vehicle 50.

The baseplate 110 is shown as a square; however, the baseplate 110 may have other shapes in alternative embodiments. The baseplate 110 is configured to be coupled to the antenna 10 (shown in FIG. 1) and is used to mount the antenna 10 to the vehicle 50 (shown in FIG. 1). The baseplate 110 may be used to support the antenna circuit board 14 and/or the cover 16 of the antenna 10. In various embodiments, the baseplate 110 has a complementary shape as the antenna circuit board 14 and/or the cover 16. For example, the baseplate 110 may form a receptacle or chamber that receives the antenna circuit board 14. The baseplate 110 may have walls forming the chamber that receives the antenna circuit board 14. The cover 16 may be coupled to the walls of the baseplate 110.

The vehicle mounting bracket 112 is coupled to the baseplate 110. Vehicle mounting bracket 112 is used to couple the antenna mount assembly 100 to the rooftop 52 of the vehicle 50. For example, during initial installation, the antenna mount assembly 100 is loaded through the opening 54 in the rooftop 52 and the vehicle mounting bracket 112 is configured to be snap coupled to the rooftop 52 to initially hold the antenna mount assembly 100 in place at the opening 54 of the rooftop 52. The latches of the vehicle mounting bracket 112 may be latchably coupled to the rooftop 52 to generally hold the position of the antenna mount assembly 100 on the rooftop 52 until the antenna mount assembly 100 can be tightened and locked into position on the vehicle 50.

The vehicle mounting bracket 112 holds the general orientation and position of the baseplate 110 on the rooftop 52 of the vehicle 50.

In an exemplary embodiment, the cable frame 116 is coupled to the mounting lock 114. The bolt 118 is also coupled to the mounting lock 114. The bolt 118 extends through the antenna mount assembly 100 from the top of the antenna mount assembly 100 to the bottom of the antenna mount assembly 100. The bolt 118 is coupled to the baseplate 110 to secure the mounting lock 114 and the cable frame 116 to the baseplate 110.

In an exemplary embodiment, the lock assembly 115 is located below the baseplate 110. For example, the cable frame 116 and the mounting lock 114 are located below the baseplate 110. The bolt 118 also extends below the baseplate 110. The cable frame 116, the mounting lock 114, and a portion of the bolt 118 are configured to be lowered through the opening 54 in the rooftop 52 to the interior of the vehicle 50.

During installation, the lock assembly 115 may be rotated relative to the baseplate 110 to a locked position. For example, the cable frame 116 and the mounting lock 114 may be rotated relative to the baseplate 110 to a locked position. The mounting lock 114 engages the bottom side of the rooftop 52 to lock the antenna mount assembly 100 to the rooftop 52. In an exemplary embodiment, the mounting lock 114 is rotated to the locked position by tightening the bolt 118. In the illustrated embodiment, the bolt 118 is accessible from the bottom of the antenna mount assembly 100 and is thus accessible at the interior of the vehicle 50 during installation. The bolt 118 is tightened by rotating the bolt 118. As the bolt 118 is tightened, the mounting lock 114 is rotated to the locked position. The mounting lock 114 is configured to be securely couple to the rooftop 52 in the locked position.

In an exemplary embodiment, the mounting lock 114 is electrically conductive. For example, the mounting lock 114 is manufactured from a metal material. Optionally, the mounting lock 114 may be a diecast component. In an exemplary embodiment, the bolt 118 is electrically conductive. For example, the bolt 118 is manufactured from a metal material. In an exemplary embodiment, the baseplate 110 is electrically conductive. For example, the baseplate 110 may be manufactured from a metal material. Optionally, the baseplate 110 may be a stamped and formed part. When installed, the antenna mount assembly 100 is electrically grounded to the rooftop 52 of the vehicle 50. The mounting lock 114 engages and is electrically connected to the rooftop 52. The bolt 118 engages and is electrically connected to the mounting lock 114. The bolt 118 extends through the antenna mount assembly 100 and is coupled to the baseplate 110. The baseplate 110 is electrically grounded to the rooftop 52 through the bolt 118 and through the mounting lock 114. In an exemplary embodiment, the baseplate 110 forms a ground plane for the antenna 10. For example, the baseplate 110 may be electrically connected to the antenna circuit board 14 and/or the antenna elements 12.

Figure 4:
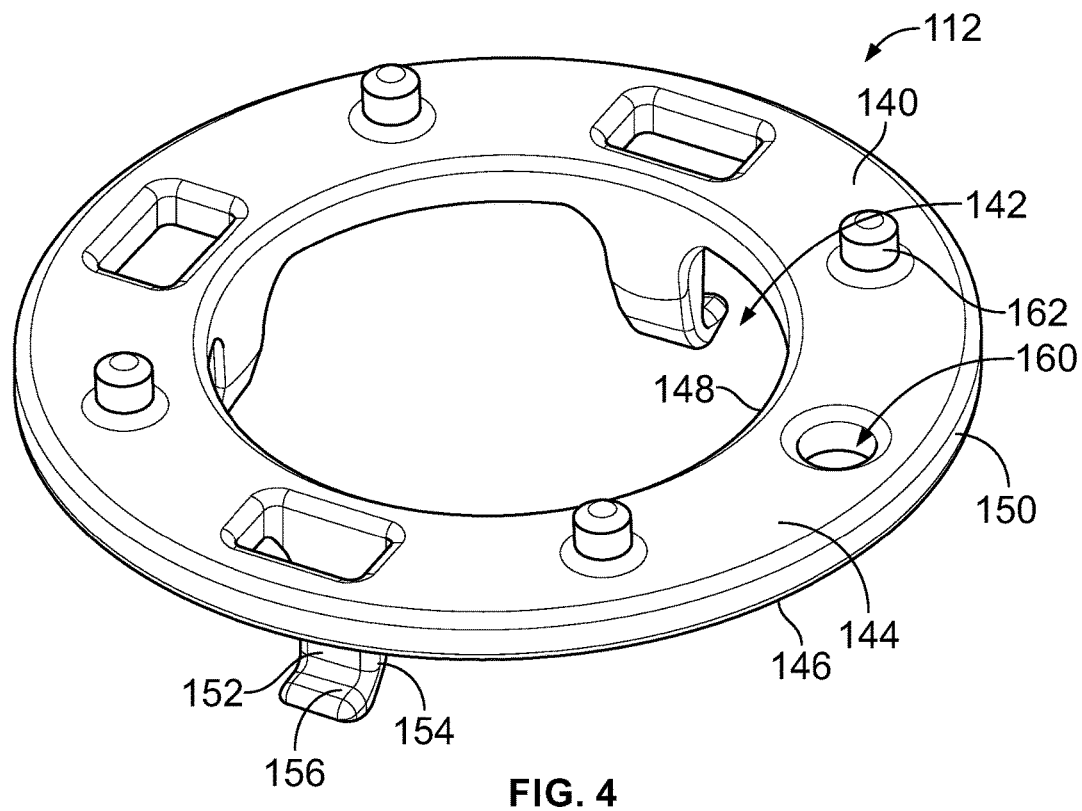
FIG. 4 is a top perspective view of the vehicle mounting bracket in accordance with an exemplary embodiment.
Figure 5:
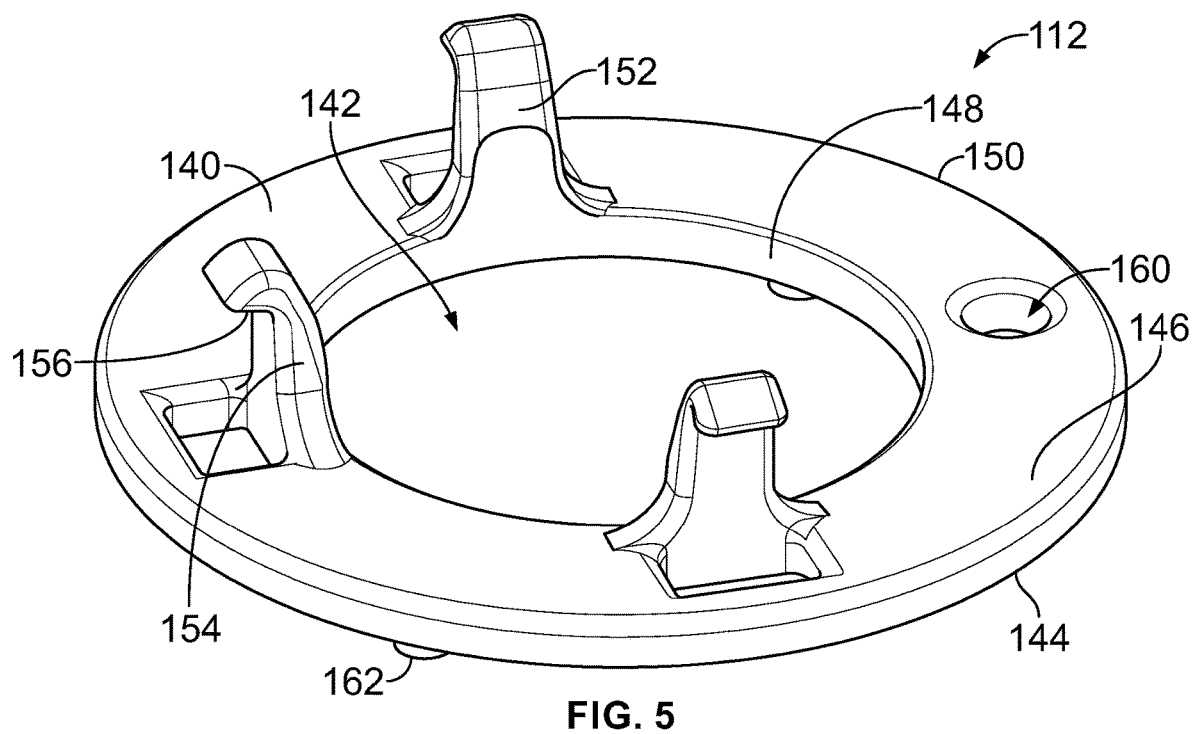
FIG. 5 is a bottom perspective view of the vehicle mounting bracket in accordance with an exemplary embodiment.

FIG. 4 is a top perspective view of the vehicle mounting bracket 112 in accordance with an exemplary embodiment. FIG. 5 is a bottom perspective view of the vehicle mounting bracket 112 in accordance with an exemplary embodiment. The vehicle mounting bracket 112 includes a ring 140 surrounding an opening 142. The ring 140 has an upper surface 144 and a lower surface 146. The ring 140 has an interior edge 148 forming the opening 142 and an exterior edge 150 opposite the interior edge 148 defining the outer perimeter of the ring 140. In an exemplary embodiment, the ring 140 is manufactured from a plastic material. For example, the ring 140 may be injection molded using plastic material.

The vehicle mounting bracket 112 includes a plurality of rooftop latches 152 extending from the lower surface 146. The rooftop latches 152 are configured to be latchably coupled to the rooftop 52. For example, during installation. As the antenna mount assembly 100 is lowered through the opening 54 and the rooftop 52, the rooftop latches 152 extend through the opening 54 in the rooftop 52 to engage the interior surface 56 of the rooftop 52. Each rooftop latch 152 includes a latch arm 154 having a latch surface 156 configured to engage the rooftop 52. When unlatched, the antenna mount assembly 100 is loosely coupled to the rooftop 52. Antenna mount assembly 100 is secured from incidental falling off for removal from the rooftop 52 while installation is completed and the antenna mount assembly 100 is locked onto the rooftop 52 (for example, using the mounting lock 114 (shown in FIGS. 2 and 3). Optionally, the latch arms 154 are deflectable. In the illustrated embodiment, the vehicle mounting bracket 112 includes three rooftop latches 152. Greater or fewer rooftop latches 152 may be provided in alternative embodiments. In the illustrated embodiment, the rooftop latches 152 are offset 90° from each other having one quadrant devoid of any rooftop latches 152. For example, the rooftop latches 152 are provided at north, south, and west orientations without a corresponding rooftop latch at the east orientation. The open area leaves space for other components of the vehicle mounting bracket 112, such as a locating feature.

In an exemplary embodiment, the vehicle mounting bracket 112 includes one or more locating features 160 used to locate the vehicle mounting bracket 112 relative to the baseplate 110 (shown in FIG. 2). In the illustrated embodiment, the locating feature 160 is an opening. Other types of locating features may be used in alternative embodiments, such as a slot, a groove, a channel, a tab, a rib, a post, and the like.

In an exemplary embodiment, the vehicle mounting bracket 112 includes one or more circuit board supports 162 extending from the upper surface 144. The circuit board supports 162 support the antenna circuit board 14 (shown in FIG. 1) relative to the antenna mount assembly 100. The circuit board supports 162 of the antenna circuit board 14 at an elevated position above the upper surface 144. The circuit board supports 162 elevate the antenna circuit board 14 to provide a space for routing the antenna cables 18. In the illustrated embodiment, the circuit board supports 162 are posts extending from the upper surface 144. Other structures may be used in alternative embodiments. In the illustrated embodiment, four circuit board supports 162 are provided at spaced apart locations. Greater or fewer circuit board supports 162 may be used in alternative embodiments.

Figure 6:
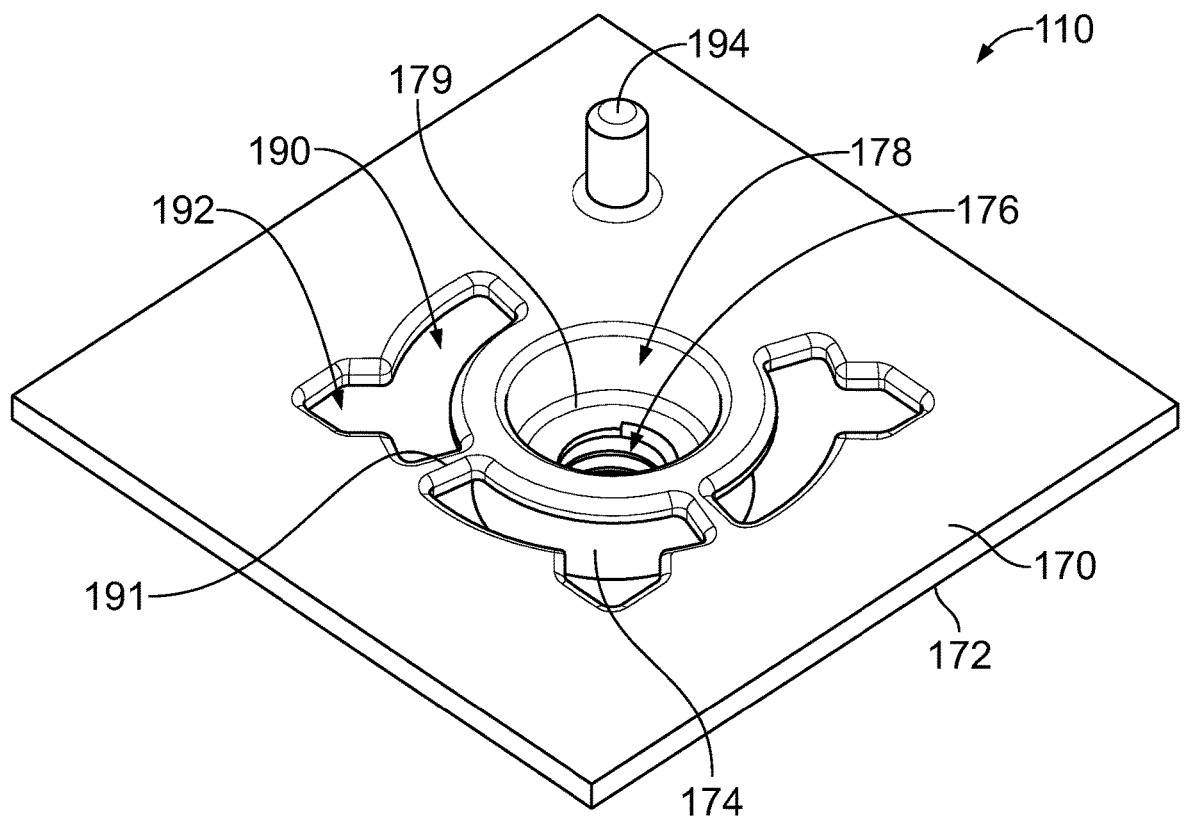
FIG. 6 is a top perspective view of the baseplate in accordance with an exemplary embodiment.
Figure 7:
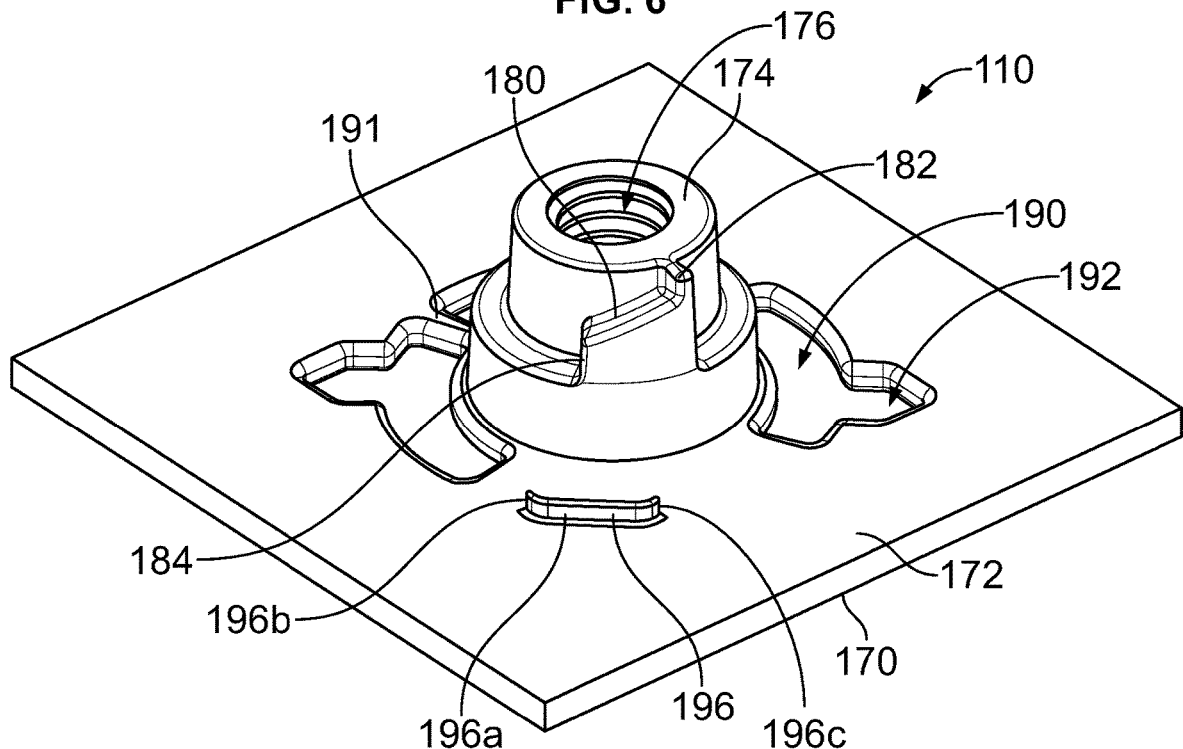
FIG. 7 is a bottom perspective view of the baseplate in accordance with an exemplary embodiment.

FIG. 6 is a top perspective view of the baseplate 110 in accordance with an exemplary embodiment. FIG. 7 is a bottom perspective view of the baseplate 110 in accordance with an exemplary embodiment. In an exemplary embodiment, the baseplate 110 is manufactured from a conductive material, such as a metal material. The baseplate 110 may be stamped and formed from a blank or sheet of metal material. Alternatively, the baseplate 110 may be diecast or manufactured as a plated plastic structure.

The baseplate 110 includes an upper surface 170 and a lower surface 172. The lower surface 172 faces the exterior surface 58 of the rooftop 52 (shown in FIG. 1). In an exemplary embodiment, a seal (not shown) may be provided at the lower surface 172. For example, the seal may be a perimeter seal or a gasket provided between the lower surface 172 and the exterior surface 58.

The baseplate 110 includes a bolt hub 174 configured to receive the bolt 118. In an exemplary embodiment, the bolt hub 174 extends from the lower surface 172. The bolt hub 174 includes a threaded bore 176 extending therethrough. The bolt 118 is configured to be threadably coupled to the bolt hub 174 at the threaded bore 176. In an exemplary embodiment, the bolt hub 174 includes a nut pocket 178 at the top of the bolt hub 174. The nut pocket 178 receives the threaded nut 126 (shown in FIG. 2). In an exemplary embodiment, the bolt hub 174 includes a shoulder 179 at the bottom of the nut pocket 178. The shoulder provides a stop surface for the threaded nut 126 to position and retain the threaded nut 126 in the nut pocket 178. For example, the shoulder prevents the bolt 118 from pulling the threaded nut 126 through the threaded bore 176.

In an exemplary embodiment, the baseplate 110 includes a slider ramp 180. The slider ramp 180 is configured to interface with the cable frame 116 to position the cable frame 116 and the mounting block 114 relative to the baseplate 110. In the illustrated embodiment, the slider ramp 180 is provided at the exterior of the bolt hub 174. The slider ramp 180 may be provided at other locations in alternative embodiments. The slider ramp 180 is angled nonparallel to the upper surface 170 and the lower surface 172 of the baseplate 110. The cable frame 116 is configured to slide along the slider ramp 180 during installation to position the cable frame 116 relative to the baseplate 110.

In an exemplary embodiment, the baseplate 110 includes a first rotation stop element 182 and a second rotation stop element 184. The slider ramp 180 extends between the first and second rotation stop elements 182, 184. In the illustrated embodiment, the rotation stop elements 182, 184 are vertically extending walls. Other types of stop elements may be used in alternative embodiments. The rotation stop elements 182, 184 provide stop surfaces for the cable frame 116. For example, the cable frame 116 is unable to move along the slider ramp 180 past the first rotation stop element 182 or past the second rotation stop element 184. The movement of the cable frame 116 is contained between the first rotation stop element 182 at the second rotation stop element 184. In an exemplary embodiment, the first and second rotation stop elements 182, 184 are radially offset from each other by between 30° and 60°. For example, the rotation stop elements 182, 184 may be radially offset from each other by approximately 45° in various embodiments. The slider ramp 180 and the rotation stop elements 182, 184 allow rotation movement of the cable frame 116 by between 30° and 60°. For example, in the illustrated embodiment, the slider ramp 180 and the rotation stop elements 182, 184 may allow rotation of the cable frame 116 by approximately 45°. In an exemplary embodiment, the first and second rotation stop elements 182, 184 are also vertically offset from each other with the slider ramp 180 being angled to allow vertical movement in addition to rotational movement of the cable frame 116. For example, the first rotation stop element 182 may be closer to the bottom of the bolt hub 174 and the second rotation stop elements 184 may be closer to the top of the bolt hub 174.

The baseplate 110 includes cable slots 190 extending therethrough. The cable slots 190 are configured to receive corresponding antenna cables 18 and allow the antenna cables 18 to pass through the baseplate 110. In the illustrated embodiment, the cable slots 190 are separated by separating walls 191. In an exemplary embodiment, the cable slots 190 are elongated to allow the antenna cables 18 to move within the cable slots 190. For example, the antenna cables 18 may be rotated with the cable frame 16 within the cable slots 190. In the illustrated embodiment, the cable slots 190 follow arcuate paths. The cable slots 190 may have other shapes in alternative embodiments. In the illustrated embodiment, three cable slots 190 are provided. Greater or fewer cable slots 190 may be provided in alternative embodiments. Optionally, each cable slot 190 may receive multiple antenna cables 18. For example, each cable slot 190 may receive a pair of the antenna cables 18.

The baseplate 110 includes latch pockets 192 extending therethrough. The latch pockets 192 receive corresponding rooftop latches 152 (shown in FIG. 5) of the vehicle mounting bracket 112. The rooftop latches 152 may extend through the baseplate 110 to interface with the rooftop 52. In the illustrated embodiment, the latch pockets 192 are open to the cable slots 190. Alternatively, the latch pockets 192 may be remote from the cable slots 190.

In an exemplary embodiment, the baseplate 110 includes a mounting bracket locating feature 194. The mounting bracket locating feature 194 is used to locate the vehicle mounting bracket 112 relative to the baseplate 110. In the illustrated embodiment, the mounting bracket locating feature 194 is a post extending from the upper surface 170 of the baseplate 110. Other types of locating features may be used in alternative embodiments, such as a rib, a tab, a rail, an opening, a channel, a slot, and the like. Optionally, multiple mounting bracket locating features 194 may be provided.

In an exemplary embodiment, the baseplate 110 includes a rooftop locating feature 196. The rooftop locating feature 196 is used to locate the baseplate 110 relative to the rooftop 52. In the illustrated embodiment, the rooftop locating feature 196 is a tab extending from the lower surface 172 of the baseplate 110. The tab includes a main wall 196a extending at an angle, such as at a 45° angle, relative to a pair of the end walls 196b, 196c. The walls of the tab may fit in the opening 54 in the rooftop 52 to orient the baseplate 110 relative to the rooftop 52. Other types of locating features may be used in alternative embodiments, such as a rib, a rail, a post, an opening, a channel, a slot, and the like. Optionally, multiple rooftop locating features 196 may be provided.

Figure 8:
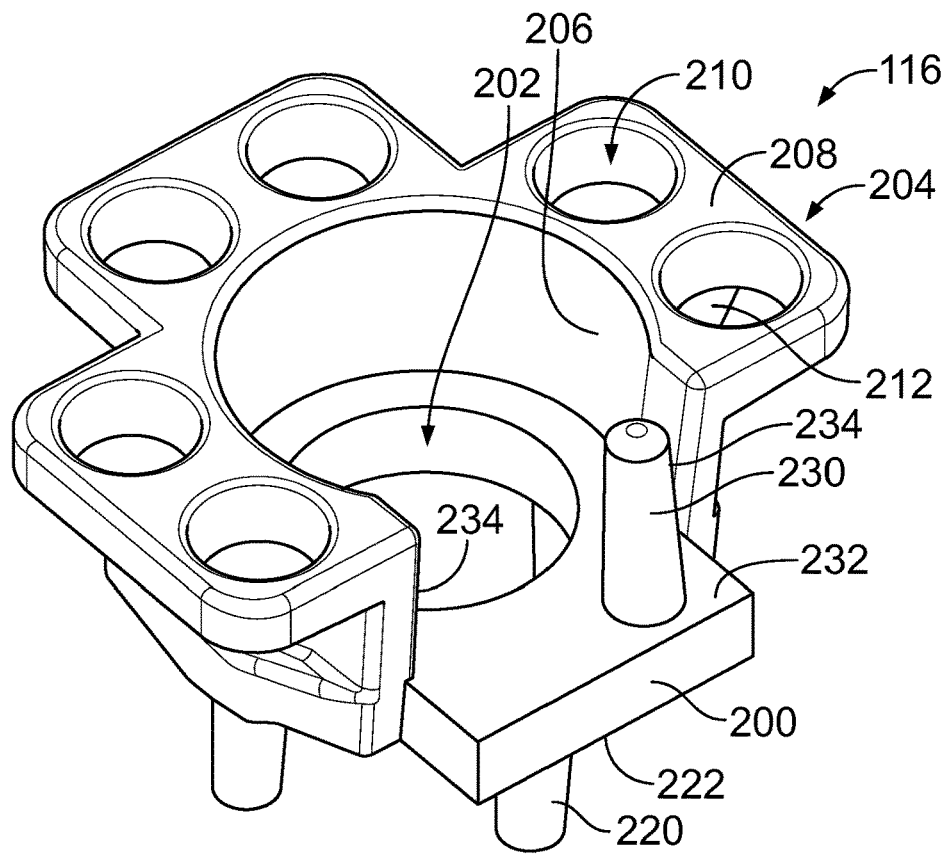
FIG. 8 is a top perspective view of the cable frame in accordance with an exemplary embodiment.
Figure 9:
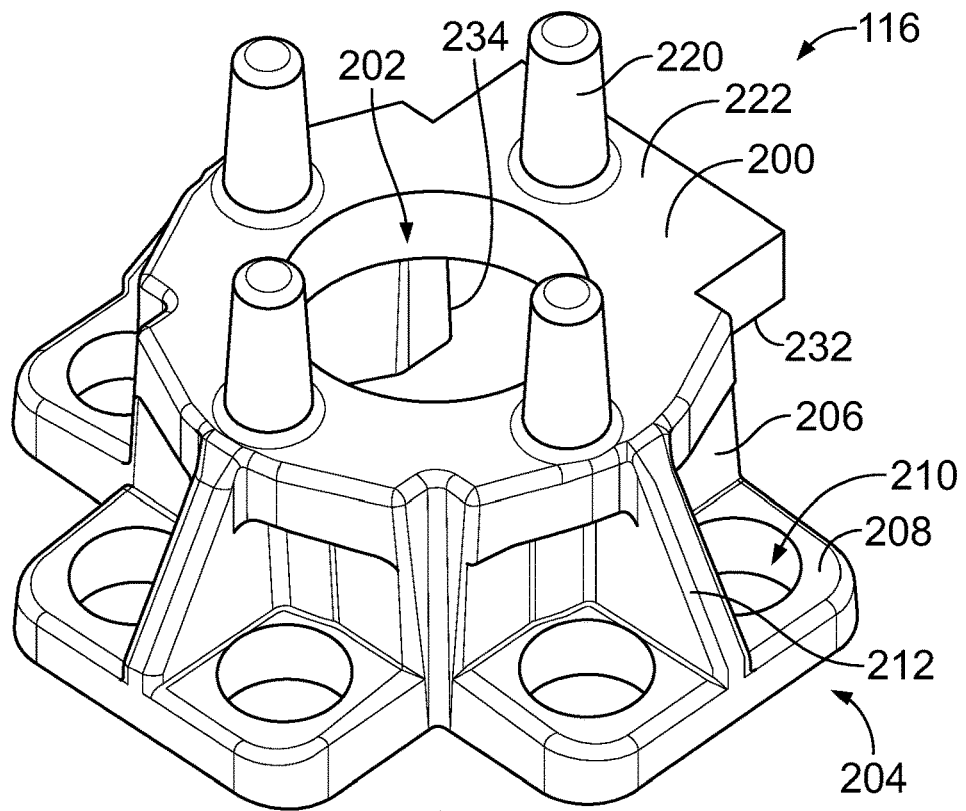
FIG. 9 is a bottom perspective view of the cable frame in accordance with an exemplary embodiment.

FIG. 8 is a top perspective view of the cable frame 116 in accordance with an exemplary embodiment. FIG. 9 is a bottom perspective view of the cable frame 116 in accordance with an exemplary embodiment. The cable frame 116 includes a cable frame base 200 having an opening 202 therethrough configured to receive the bolt 118 (shown in FIG. 2). The opening 202 is provided at the interior of the cable frame 116, such as approximately centered within the cable frame 116.

The cable frame 116 includes cable supports 204 extending from a top of the cable frame base 200. The cable supports 204 are used to support corresponding antenna cables 18 (shown in FIG. 2). In an exemplary embodiment, multiple cable supports 204 are provided at least partially surrounding the opening 202. The cable supports 204 are provided at multiple sides of the cable frame base 200. For example, in the illustrated embodiment, the cable frame 116 includes cable supports 204 at three sides of the cable frame 116. The remaining fourth side is open, such as for other components of the cable frame 116. In an exemplary embodiment, each cable support 204 includes a sidewall 206 and an end wall 208 extending from the side wall 206. The side wall 206 extends from the cable frame base 200, such as in a vertical direction. The end wall 208 is located at the distal end of the side wall 206 and may extend horizontally. The end wall 208 includes one or more cable openings 210 configured to receive corresponding antenna cables 18. The cable openings 210 are arranged around the cable frame 116 to position the antenna cables 18 relative to each other. In the illustrated embodiment, the cable openings 210 are closed to completely retain the cables 18. Alternatively, the cable openings 210 may be open sided to allow the antenna cables 18 to be loaded into and removed from the cable openings 210. Optionally, the cable openings 210 may be hook-shaped to provide retention of the antenna cables 18 yet still allow the antenna cables 18 to be removable from the cable openings 210. In an exemplary embodiment, each cable support 204 may include a buttress wall 212 between the side wall 206 and the end wall 208 to support the end wall 208.

In an exemplary embodiment, the cable frame 116 includes a plurality of mounting posts 220 used to mount the cable frame 116 to the mounting lock 114 (shown in FIG. 2). The mounting post 220 extend from a bottom 222 of the cable frame base 200. In an exemplary embodiment, the mounting post 220 are heat stakes configured to be heat staked to the mounting lock 114. The mounting posts 220 may be secured to the mounting lock 114 by other means in alternative embodiments for example, the mounting posts 220 may include latches or clips configured to be coupled to the mounting lock 114. In other various embodiments, fasteners may be used to secure the cable frame 116 to the mounting lock 114. In the illustrated embodiment, four mounting posts 220 are provided. Greater or fewer mounting posts 220 may be used in alternative embodiments.

In an exemplary embodiment, the cable frame 116 includes a slider post 230 extending from the cable frame base 200. The slider post 230 extends from a top 232 of the cable frame base 200. The slider post 230 is configured to interface with the baseplate 110 (shown in FIG. 7) to position the cable frame 116 relative to the baseplate 110. In an exemplary embodiment, the slider post 230 is configured to interface with the slider ramp 180 (shown in FIG. 7) of the baseplate 110. The slider post 230 is movable along the slider ramp 180 to position the cable frame 116 relative to the baseplate 110. The slider post 230 is configured to slide along the slider ramp 180, which causes the cable frame 116 to rotate during assembly of the antenna mount assembly 100. Other types of locating features may be used in alternative embodiments to locate the cable frame 116 relative to the baseplate 110.

In an exemplary embodiment, the cable frame 116 includes one or more stop features 234 used to position the cable frame 116 relative to the baseplate 110. Optionally, a side edge of the slider post 230 may define one of the stop features 234. In an exemplary embodiment, one or more of the side walls 206 of the cable support 204 may define one or more of the stop features 234. The stop features 234 engage complementary stop features of the baseplate 110 to limit movement of the cable frame 116 relative to the baseplate 110. For example, the stop features 234 may limit vertical movement and/or horizontal movement and/or rotating movement of the cable frame 116 relative to the baseplate 110.

Figure 10:
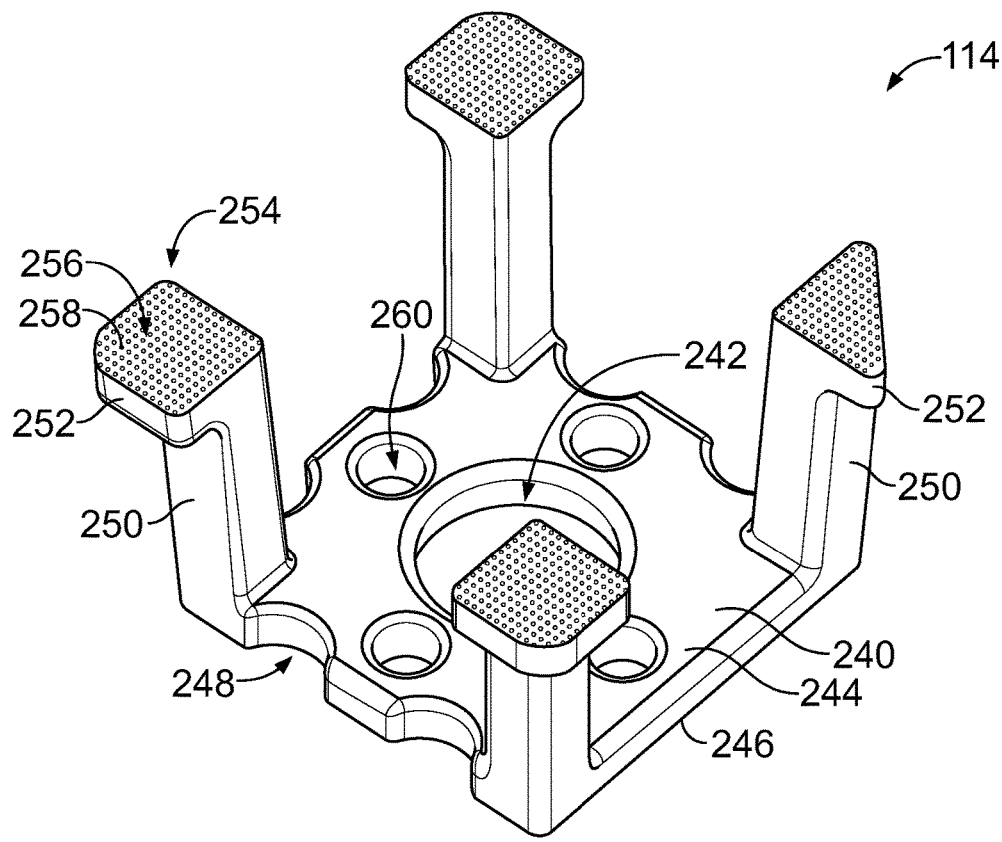
FIG. 10 is a top perspective view of the mounting lock in accordance with an exemplary embodiment.
Figure 11:
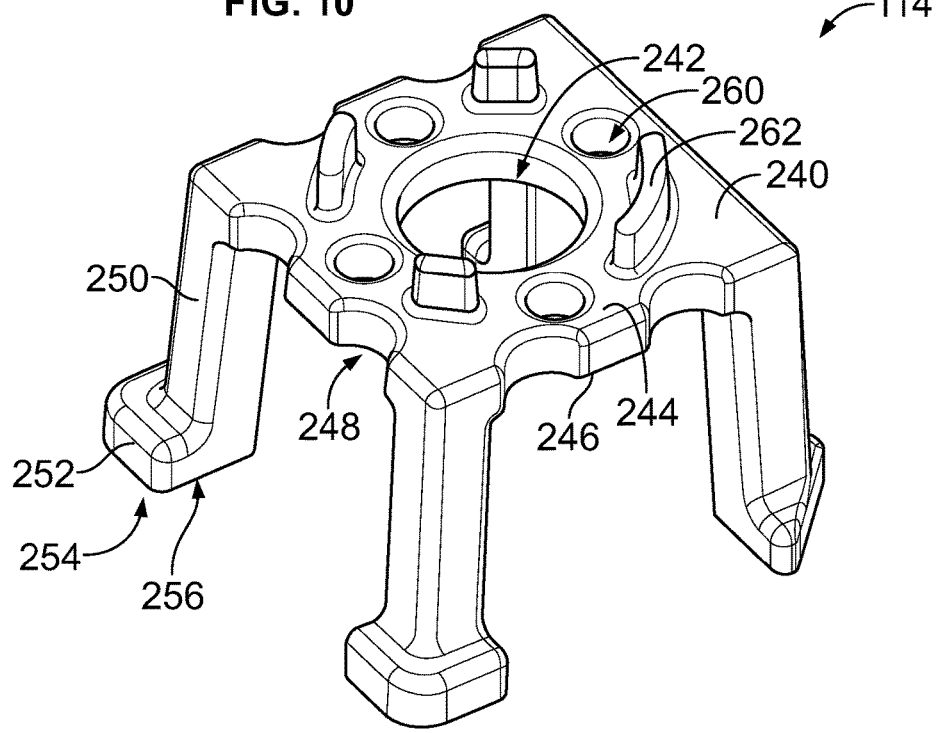
FIG. 11 is a bottom perspective view of the mounting lock in accordance with an exemplary embodiment.

FIG. 10 is a top perspective view of the mounting lock 114 in accordance with an exemplary embodiment. FIG. 11 is a bottom perspective view of the mounting lock 114 in accordance with an exemplary embodiment. In an exemplary embodiment, the mounting lock 114 is manufactured from an electrically conductive material, such as a metal material. In various embodiments, the mounting lock 114 is a diecast component.

The mounting lock 114 includes a mounting lock base 240 having an opening 242 therethrough configured to receive the bolt 118 (shown in FIG. 2). Optionally, the mounting lock base 240 may be generally planar having an upper surface 244 and a lower surface 246. In the illustrated embodiment, the mounting lock base 240 is generally rectangular, such as being square. The mounting lock base 240 is sized and shaped to fit through the opening 54 in the rooftop 52 of the vehicle 50. The opening 242 and the mounting lock base 240 is provided at the interior of the cable frame 116, such as approximately centered within the cable frame 116. In an exemplary embodiment, the mounting lock base 240 includes cable pockets 248 along the edges of the mounting lock base 240. The cable pockets 248 are configured to receive corresponding antenna cables 18. In the illustrated embodiment, the cable pockets 248 are open sided. Alternatively, the cable pockets 248 may be enclosed to completely surround the antenna cables 18 and hold the antenna cables 18 in the mounting lock base 240.

The mounting lock 114 includes mounting legs 250 extending from the mounting lock base 240. In an exemplary embodiment, the mounting legs 250 are integral with the mounting lock base 240. For example, the mounting legs 250 are diecast with the mounting lock base 240. In the illustrated embodiment, the mounting legs 250 extend upward from the upper surface 244. Optionally, the mounting legs 250 may be solid legs for rigidity and strength for mating with the rooftop 52 of the vehicle 50. The mounting legs 250 are provided in the four corners of the mounting lock base 240 in the illustrated embodiment. However, other locations are possible in alternative embodiments. Greater or fewer than four mounting legs 250 may be used in alternative embodiments. Each mounting leg 250 includes a foot 252 at the distal end 254 thereof. The foot 252 has a greater cross-sectional area than the mounting leg 250. The foot 252 has an upward facing engagement surface 256 configured to engage the interior surface 56 of the rooftop 52 when the antenna mount assembly 100 is installed in the vehicle 50. In the illustrated embodiment, the foot 252 forms a generally rectangular pad for seating against the rooftop 52. Optionally, at least one of the feet 252 may have a different shape, such as for keying and orientation of the mounting lock 114 relative to the baseplate 110 and/or the rooftop 52. For example, the opening 54 in the rooftop 52 may have one or more corners that are shaped differently. The feet 252 are shaped to correspond with the shape of the opening 54 in the rooftop 52. In various embodiments, serrations 258 are provided at the engagement surface 256. The serrations 258 scour the metal surface of the rooftop 52 during assembly to wipe against the interior surface 56 and create a metal-to-metal interface between the mounting lock 114 and the rooftop 52.

In an exemplary embodiment, the mounting lock base 240 includes openings 260 that receive the mounting posts 220 (shown in FIG. 9) of the cable frame 116. The mounting posts 220 pass through the openings 260 and/or heat staked to securely couple the cable frame 116 to the mounting lock 114. Other types of securing features may be used in alternative embodiments. Additionally, other types of locating features may be used in alternative embodiments to orient the cable frame 116 relative to the mounting lock 114.

In an exemplary embodiment, the mounting lock base 240 includes stop tabs 262 extending from the lower surface 246 of the mounting lock base 240. The stop tabs 262 surrounds the opening 242. Optionally, the stop tabs 262 may be located between the openings 260. The stop tabs 262 are configured to interface with the bolt 118 during assembly. For example, the bolt 118 may press against the stop tabs 262 as the bolt 118 is tightened. The stop tabs 262 hold the head 120 of the bolt 118 at a spaced apart location from the mounting lock base 240, such as to provide a space for the mounting posts 220. In an exemplary embodiment, the stop tabs 262 are integral with the mounting lock base 240. For example, the stop tabs 262 are diecast with the mounting lock base 240. The mounting lock 114 is configured to be electrically connected to the bolt 118 through the stop tabs 262.

Returning to FIGS. 2 and 3, the parts of the antenna mount assembly 100 are assembled together to form the assembled unit 102. The vehicle mounting bracket 112 is coupled to the upper surface 170 of the baseplate 110. The cable frame 116 is coupled to the mounting lock 114 to form the lower portion 106, and the lower portion 106 is coupled to the baseplate 110 using the bolt 118. The threaded nut 126 holds the bolt 118 in the bolt hub 174 of the baseplate 110. The bolt 118 is unable to be backed out of the bolt hub 174 by way of the nut 126 being held in the nut pocket 178. The head 120 of the bolt 118 is located below the mounting lock 114 to capture the mounting lock 114 and the cable frame 116 between the head 120 and the baseplate 110. As such, the lower portion 106 of the antenna mount assembly 100 is unable to be inadvertently removed from the upper portion 104 of the antenna mount assembly 100. The assembled unit 102 remains an assembled unit without worry of the various pieces coming apart during installation. Additionally, the installer does not need to hold the various parts together during installation. Rather, the installer may simply use a drill or ratchet tool to tighten the bolt 118 to complete installation to the vehicle 50. As such, the antenna mount assembly 100 may be assembled with one hand by the installer.

When assembled, the cable frame 116 is securely coupled to the mounting lock 114 using the mounting posts 220. For example, the mounting posts 220 may be heat staked to the mounting lock 114. The antenna cables 18 may be preassembled in the cable frame 116 prior to mounting the cable frame 116 to the mounting lock 114. The antenna cables 18 pass through the opening 142 and the ring 140 of the vehicle mounting bracket 112 and pass through the cable slots 190 in the baseplate 110 to the cable frame 116. The antenna cables 18 are received in the corresponding cable openings 210. In an exemplary embodiment, the cable openings 210 are aligned with the cable pockets 248. The antenna cables 18 are received in corresponding cable pockets 248 of the mounting lock 114. In an exemplary embodiment, one or more cable retainers 270 may be used to secure the antenna cables 18 to the antenna mount assembly 100. In the illustrated embodiment, the cable retainer 270 is tape wrapped around the mounting lock 114 to retain the antenna cables 18 in the cable pockets 248. Other types of cable retainers may be used in alternative embodiments, such as a zip tie. The cable retainers 270 organize the antenna cables 18 and hold the antenna cables 18 as part of the lower portion 106 for ease of loading the antenna mount assembly 100 (with the antenna cables 18) through the opening 54 in the rooftop 52. In an exemplary embodiment, the cable retainers 270 may be coupled to the mounting lock 114 and/or the cable frame 116 after the antenna mount assembly 100 is assembled, such as at a final stage of assembly.

When assembled, the vehicle mounting bracket 112 is coupled to the baseplate 110. The mounting bracket locating feature 194 of the baseplate 110 interfaces with the locating feature 160 of the vehicle mounting bracket 112 to orient the vehicle mounting bracket 112 relative to the baseplate 110. For example, the post forming the mounting bracket locating feature 194 is received in the opening defining the locating feature 160. The rooftop latches 152 extend from the bottom of the vehicle mounting bracket 112 through the baseplate 110. The rooftop latches 152 are received in the rooftop locating features 196 and pass through the baseplate 110 to the bottom side of the baseplate 110 for interfacing with the rooftop 52 of the vehicle 50. The rooftop latches 152 are used during the initial installation to latchably couple the antenna mount assembly 100 to the rooftop 52. The rooftop latches 152 hold the position of the antenna mount assembly 100 on the rooftop while the installer tightens the bolt to lockably couple the antenna mount assembly 100 to the rooftop 52. The antenna mount assembly 100 is more securely coupled to the rooftop 52 when lockably coupled as compared to being latchably coupled.

When assembled, the feet 252 of the mounting legs 250 of the mounting lock 114 face the bottom side of the baseplate 110. The engagement surfaces 256 are spaced apart from the lower surface 172 of the baseplate 110. The gap or space between the engagement surfaces 256 and the lower surface 172 is wide enough to receive the rooftop 52 of the vehicle 50. After the antenna mount assembly 100 is loaded onto the rooftop 52 and in the latched position (rooftop latches 152 coupled to the lower surface 172), the bolt 118 is tightened to close the gap and force the mounting lock 114 to a locked position to secure the antenna mount assembly 100 to the rooftop 52 of the vehicle 50. The feet 252 are pressed into engagement with the baseplate 110 in the locked position. In an exemplary embodiment, the mounting lock 114 is rotated, while moved upward, to move the mounting legs 250 from clearance positions to engagement positions.

Figure 12:
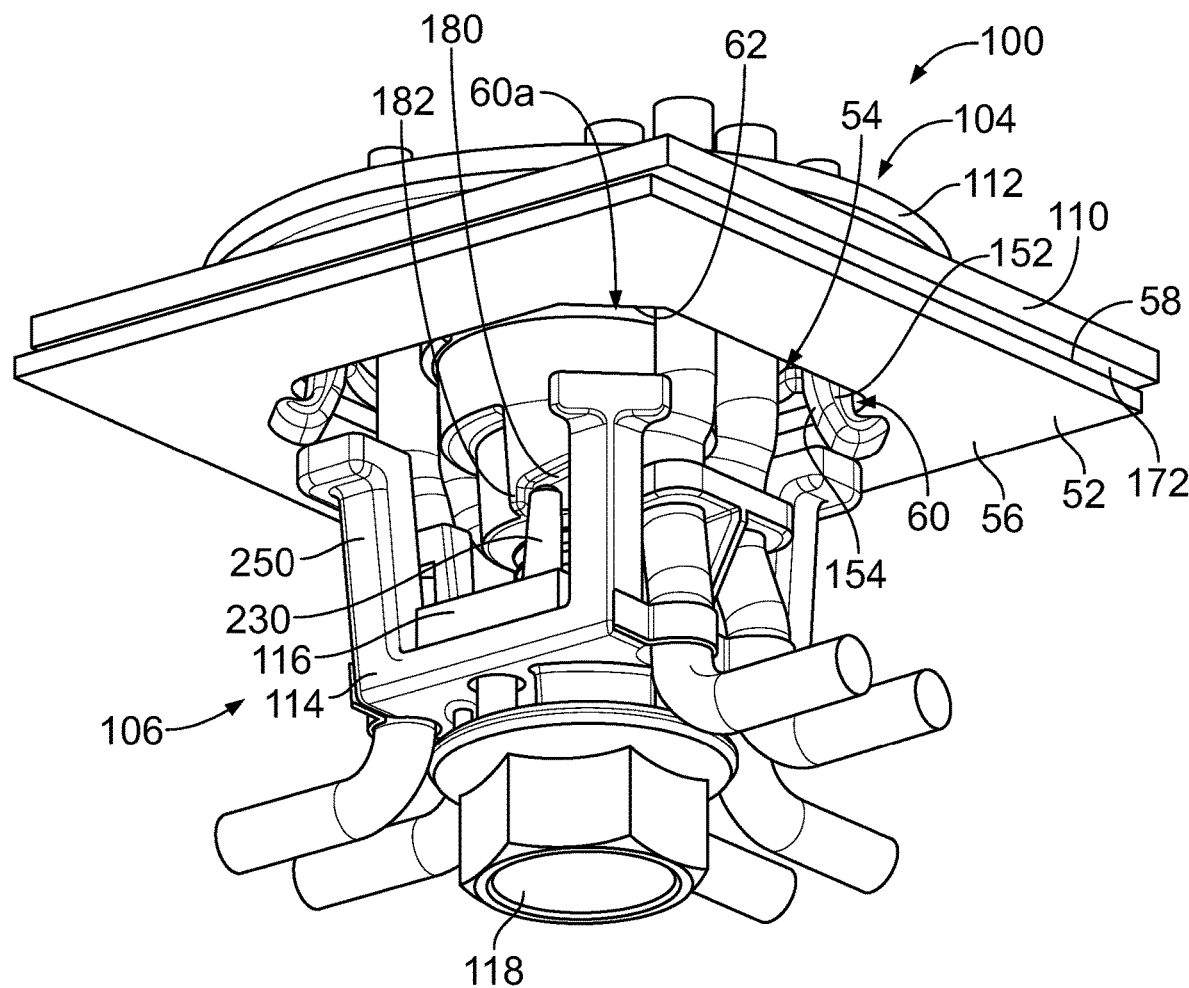
FIG. 12 is a bottom perspective view of the antenna mount assembly partially installed on the rooftop of the vehicle in accordance with an exemplary embodiment.
Figure 13:
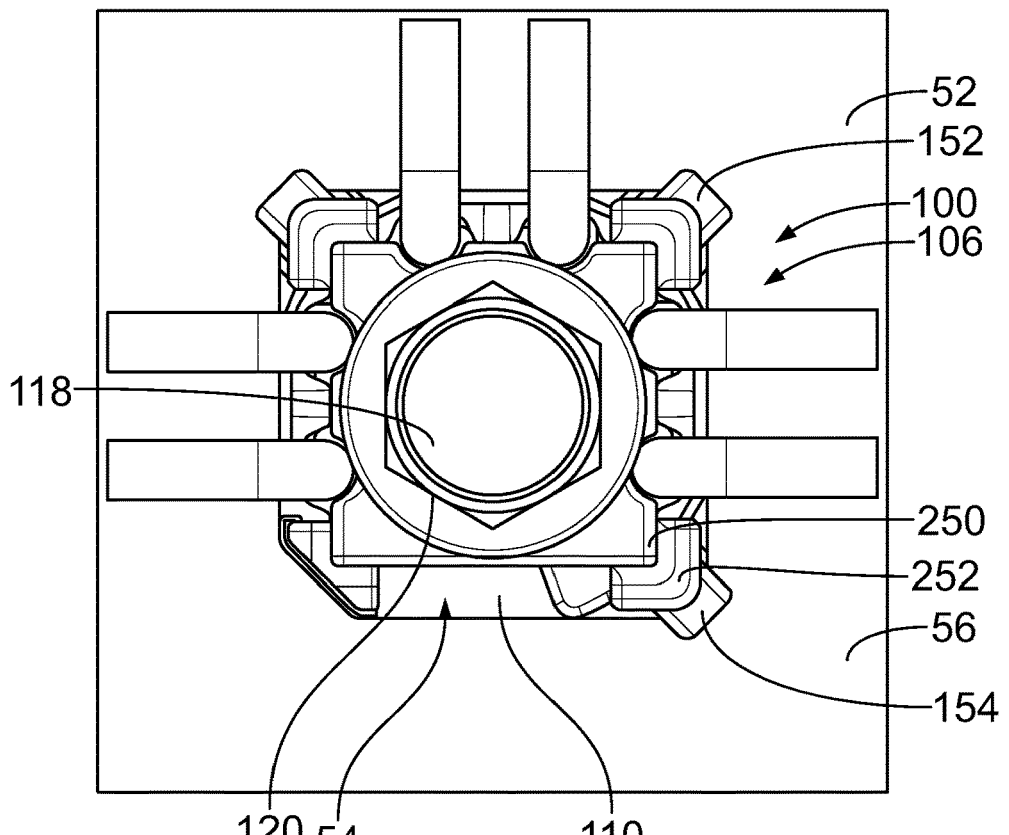
FIG. 13 is a bottom view of the antenna mount assembly partially installed on the rooftop of the vehicle in accordance with an exemplary embodiment.

FIG. 12 is a bottom perspective view of the antenna mount assembly 100 partially installed on the rooftop 52 of the vehicle 50 in accordance with an exemplary embodiment. FIG. 13 is a bottom view of the antenna mount assembly 100 partially installed on the rooftop of the vehicle 50 in accordance with an exemplary embodiment. The antenna mount assembly 100 is shown in a latched position (and unlocked position). In the illustrated embodiment, the vehicle mounting bracket 112 is latchably coupled to the rooftop 52. The rooftop latches 152 are coupled to the interior surface 56 of the rooftop 52.

During installation, the lower portion 106 of the antenna mount assembly 100 is loaded through the opening 54 in the rooftop 52 from above. The antenna mount assembly 100 is loaded until the lower surface 172 of the baseplate 110 bottoms out against the exterior surface 58 of the rooftop 52. A seal (not shown) may be positioned between the lower surface 172 and the exterior surface 58 defining a sealed interface between the antenna mount assembly 100 and the rooftop 52. The rooftop latches 152 are loaded through the opening 54 in the rooftop 52. The latch arms 154 are clipped onto (for example, snappably coupled to) the rooftop 52. In an exemplary embodiment, the rooftop latches 152 are located in corners 60 of the opening 54. The rooftop latches 152 resist rotation of the antenna mount assembly 100 relative to the rooftop 52 when the rooftop latches 152 are in the corners 60. The rooftop 52 is held between the rooftop latches 152 and the baseplate 110.

The lock assembly 115 is sized and shaped to fit through the opening 54 in the rooftop 52. For example, the cable frame 116 and the mounting lock 114 are sized and shaped to fit through the opening 54 in the rooftop 52. For example, the mounting legs 250 may be aligned with the corners 60 to pass through the opening 54. The mounting lock 114 is in a clearance position to pass through the opening 54. The lower portion 106 is able to drop through the opening 54 in the clearance position. Optionally, one of the corners 60 may have a chamfer 62. The chamfered corner 60a defines a keying feature for keyed mating of the antenna mount assembly 100 with the rooftop 52. The antenna mount assembly 100 can only be loaded through the opening 54 in a particular orientation. For example, the mounting leg 250 with the truncated foot 252a must be aligned with the chamfered corner 60a for clearance and loading through the opening 54. Additionally, the vehicle mounting bracket 112 is only able to couple with the rooftop 52 in a single orientation, such as with the three rooftop latches in the three non-chamfered corners. As such, the orientation of the baseplate 110 relative to the rooftop 52 is controlled by the keyed mating of the vehicle mounting bracket 112 with the rooftop 52. Other types of keying features may be used in alternative embodiments to orient the antenna mount assembly 100 with the rooftop 52. In other embodiments, the antenna mount assembly may be coupled to the rooftop 52 without keyed mating features.

In an exemplary embodiment, the lower portion 106 is oriented relative to the upper portion 104 using locating features, such as the slider post 230, the slider ramp 180, the rotation stop elements 182, 184, and the like. In the illustrated embodiment, in the clearance position (prior to torquing or tightening the bolt 118), the slider post 230 is at the top of the slider ramp 180. The slider post 230 engages the first rotation stop element 182 to locate the cable frame 116 (and thus the mounting lock 114) relative to the baseplate 110. The first rotation stop element 182 prevents rotation of the cable frame 116 in one direction. As the bolt 118 is tightened, the slider post 230 is only able to slide along the slider ramp 180 in one direction away from the first rotation stop element 182. The cable frame 116 and the mounting lock 114 are configured to be moved toward the rooftop 52, in a rotating direction, as the slider post 230 slides along the slider ramp 180. The cable frame 116 and the mounting lock 114 are moved toward the rooftop 52 to close the gap between the mounting legs 250 and the rooftop 52. As the cable frame and the mounting lock 114 are rotated, the mounting legs 250 move from the clearance positions (aligned with the corners 60) to engagement positions (offset from the corners 60) The mounting legs 250 are aligned with the interior surface 56 of the rooftop 52 to engage the rooftop 52.

Figure 15:
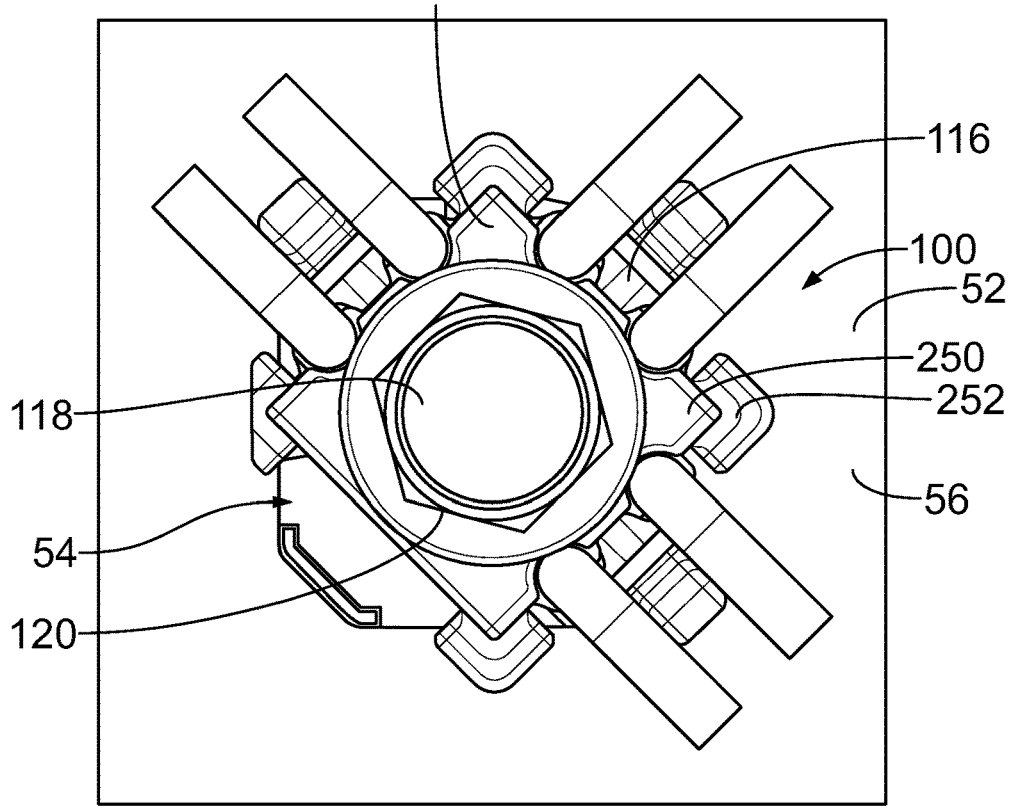
FIG. 15 is a bottom view of the antenna mount assembly locked to the rooftop of the vehicle in accordance with an exemplary embodiment.
Figure 14:
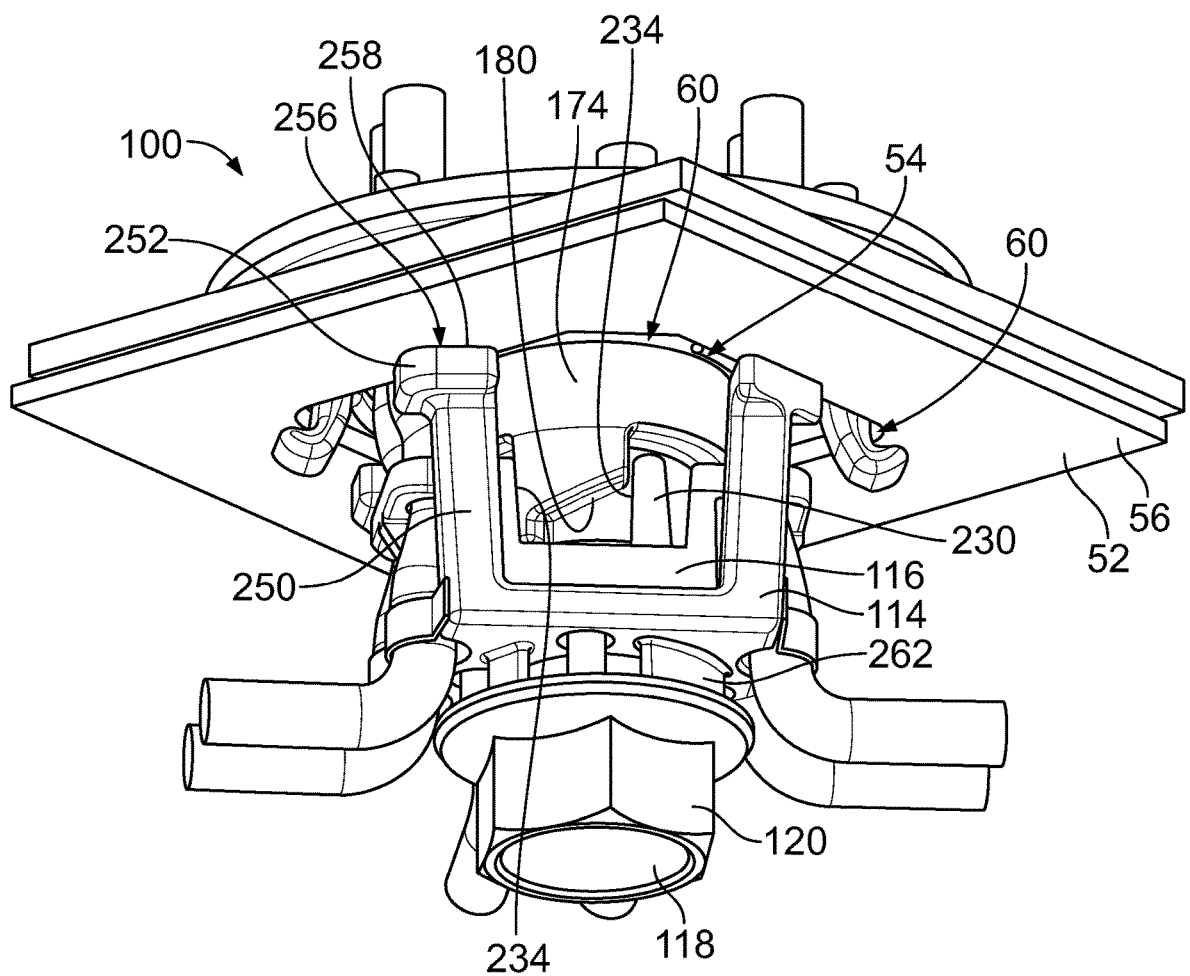
FIG. 14 is a bottom perspective view of the antenna mount assembly locked to the rooftop of the vehicle in accordance with an exemplary embodiment.

FIG. 14 is a bottom perspective view of the antenna mount assembly 100 locked to the rooftop 52 of the vehicle 50 in accordance with an exemplary embodiment. FIG. 15 is a bottom view of the antenna mount assembly 100 locked to the rooftop of the vehicle 50 in accordance with an exemplary embodiment. The antenna mount assembly 100 is shown in the locked position.

During installation, the bolt 118 is tightened to lock the antenna mount assembly 100 to the rooftop 52. As the bolt 118 is tightened, the head 120 is driven into the stop tabs 262 of the mounting lock 114. As the mounting lock 114 is driven upward by the bolt 118, the slider post 230 of the cable frame 116 is driven along the slider ramp 180. The slider post 230 rotates along the slider ramp 180 to rotate the mounting lock 114 and move the mounting legs 250 from the clearance position (FIGS. 12 and 13) to the engaging position (FIGS. 14 and 15). The mounting legs 250 are rotated to positions offset from the corners 60, such as along the edges of the opening 54 between the corners 60. In an exemplary embodiment, the mounting lock 114 is rotated approximately 45° to approximately center the feet 252 between the corners 60. The serrations 258 at the engagement surfaces 256 of the feet 252 engage the interior surface 56 of the rooftop 52. The serrations 258 may wipe along the interior surface 56 to create a metal to metal connection between the mounting lock 114 and the rooftop 52. The slider post 230 slides along the slider ramp 180 to the end. After the slider post 230 clears the end of the slider ramp 180, the cable frame 116 is configured to be driven upward without rotating to drive the mounting legs 250 into the rooftop 52. The stop feature 234 may engage a stop wall of the bolt hub 174 to prevent further rotation of the cable frame 116. The bolt 118 is tightened to lock the mounting legs 250 against the rooftop 52 and prevent movement of the antenna mount assembly 100 relative to the rooftop 52.

Figure 16:
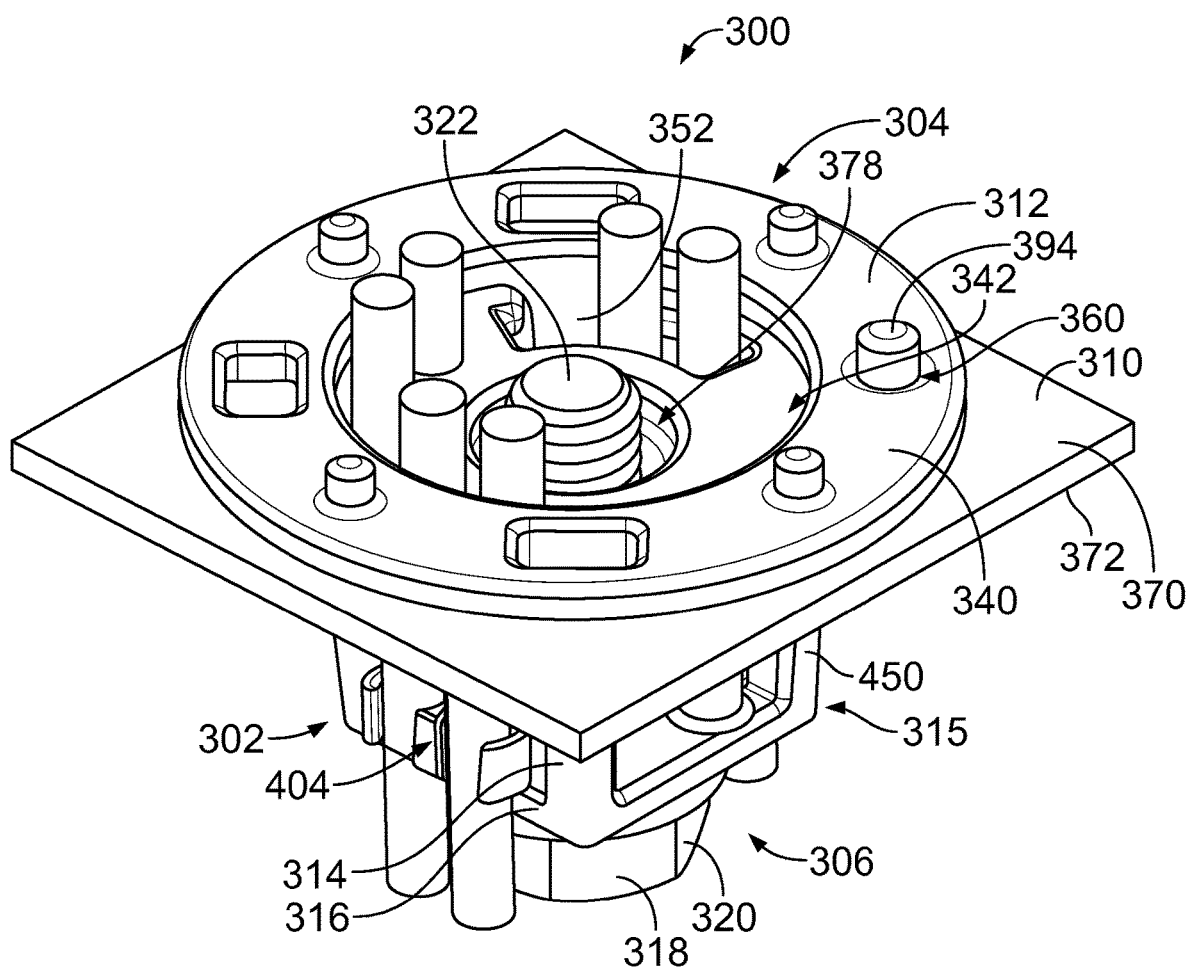
FIG. 16 is a top perspective view of the antenna mount assembly in accordance with an exemplary embodiment.
Figure 17:
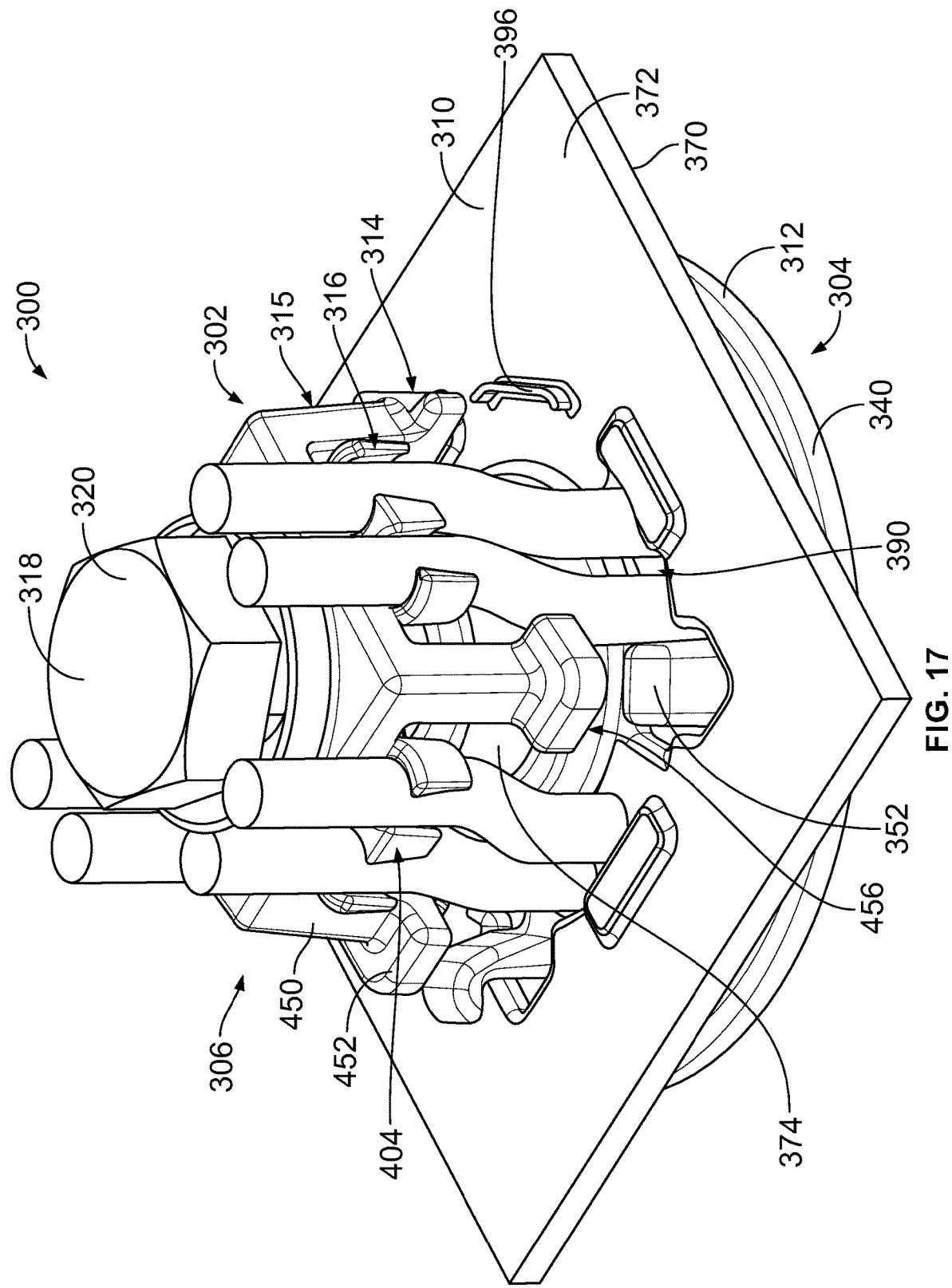
FIG. 17 is a bottom perspective view of the antenna mount assembly in accordance with an exemplary embodiment.

FIG. 16 is a top perspective view of an antenna mount assembly 300 in accordance with an exemplary embodiment. FIG. 17 is a bottom perspective view of the antenna mount assembly 300 in accordance with an exemplary embodiment. The antenna mount assembly 300 is similar to the antenna mount assembly 100 (shown in FIG. 1) and may be used in place of the antenna mount assembly 100 in the vehicle 50 (shown in FIG. 1). FIGS. 16 and 17 illustrates the antenna mount assembly 300 as an assembled unit 302 with the individual pieces of the antenna mount assembly 300 loosely held together as the assembled unit 302. For example, the individual pieces of the antenna mount assembly 300 are unable to be separated or fall apart from the assembled unit 302 during the installation process. The assembled unit 302 includes an upper portion 304 and a lower portion 306. The lower portion 306 is coupled to the upper portion 304 to form the assembled unit 302. The upper portion 304 is configured to be located along the exterior of the vehicle 50 (shown in FIG. 1) while the lower portion 306 is configured to be located within the interior of the vehicle 50. During installation, the lower portion 306 may be lowered into the interior of the vehicle 50 through the opening 54 from the exterior of the vehicle 50.

The antenna mount assembly 300 includes a baseplate 310, a vehicle mounting bracket 312, a lock assembly 315, and a bolt 318. The baseplate 310 and the vehicle mounting bracket 312 form the upper portion 304 of the assembled unit 302. The lock assembly 315 forms the lower portion 306 of the assembled unit 302. The lock assembly 315 is used to mount the antenna mount assembly 300 to the vehicle 50, such as mounting the baseplate 310 and/or the vehicle mounting bracket 312 to the vehicle 50. In an exemplary embodiment, the lock assembly 315 includes a mounting lock 314 and a cable frame 316. In the illustrated embodiment, the mounting lock 314 and the cable frame 316 are integrated as a unitary, single piece structure. The bolt 318 extends through the antenna mount assembly 300 from the top to the bottom and thus forms part of the upper portion 304 and the lower portion 306.

In an exemplary embodiment, the bolt 318 is a threaded fastener. The bolt 318 includes a head 320 and a threaded shank 322 extending from the head 320. In an exemplary embodiment, the bolt 318 includes a retainer (not shown), which may be similar to the retainer 124 (shown in FIG. 2), to secure the bolt 318 to the baseplate 310. In an exemplary embodiment, the retainer is a threaded nut. Optionally, the threaded nut may be secured to the end of the threaded shank, such as using a threadlocker. When the retainer is coupled to the bolt 318, the bolt 318 is retained with the baseplate 310. The bolt 318 is unable to be inadvertently disassembled or removed from the baseplate 310. When the bolt 318 is untightened, the retainer is coupled to the baseplate 310 to prevent removal of the bolt 318 from the baseplate 310. The bolt 318 is used to secure the lock assembly 315 (for example, the mounting lock 314 and the cable frame 316) to the baseplate 310. When the retainer is coupled to the bolt 318, the bolt 318 and the lock assembly 315 are unable to be inadvertently disassembled from the baseplate 310. The pieces form the assembled unit 302 may be installed on the vehicle 50 without losing any of the pieces during assembly. The installer does not need a separate bolt to securely locked the antenna mount assembly 300 to the vehicle 50 during installation. Rather, all of the components of the antenna mount assembly 300 may be installed onto the vehicle 50 from above as the assembled unit 302.

In an exemplary embodiment, the antenna mount assembly 300 is used to hold one or more of the antenna cables 18. For example, the cable frame 316 of the lock assembly 315 may hold the antenna cables 18. Optionally, a plurality of the antenna cables 18 may be held by the cable frame 316. For example, in the illustrated embodiment, the lock assembly 315 holds six of the antenna cables 18. Optionally, the antenna cables 18 may be held in pairs. The antenna cables 18 may be spaced apart around the cable frame 316. For example, the antenna cables 18 may be provided on multiple sides of the cable frame 316. The antenna cables 18 are configured to be electrically connected to corresponding antenna elements 12 of the antenna 10 (shown in FIG. 1). The antenna mount assembly 300 is used to route the cables through the rooftop 52 of the vehicle 50 (shown in FIG. 1) from the antenna 10 at the exterior of the vehicle to other components at the interior of the vehicle 50, such as the radio, the GPS, the navigation system, or other components of the vehicle 50.

The baseplate 310 is shown as a square; however, the baseplate 310 may have other shapes in alternative embodiments. The baseplate 310 is configured to be coupled to the antenna 10 (shown in FIG. 1) and is used to mount the antenna 10 to the vehicle 50 (shown in FIG. 1). The baseplate 310 may be used to support the antenna circuit board 14 and/or the cover 16 of the antenna 10. In various embodiments, the baseplate 310 has a complementary shape as the antenna circuit board 14 and/or the cover 16. For example, the baseplate 310 may form a receptacle or chamber that receives the antenna circuit board 14. The baseplate 310 may have walls forming the chamber that receives the antenna circuit board 14. The cover 16 may be coupled to the walls of the baseplate 310.

The vehicle mounting bracket 312 is coupled to the baseplate 310. The vehicle mounting bracket 312 is used to couple the antenna mount assembly 300 to the rooftop 52 of the vehicle 50. For example, during initial installation, the antenna mount assembly 300 is loaded through the opening 54 in the rooftop 52 and the vehicle mounting bracket 312 is configured to be snap coupled to the rooftop 52 to initially hold the antenna mount assembly 300 in place at the opening 54 of the rooftop 52. The latches of the vehicle mounting bracket 312 may be latchably coupled to the rooftop 52 to generally hold the position of the antenna mount assembly 300 on the rooftop 52 until the antenna mount assembly 300 can be tightened and locked into position on the vehicle 50. The vehicle mounting bracket 312 holds the general orientation and position of the baseplate 310 on the rooftop 52 of the vehicle 50.

In an exemplary embodiment, the cable frame 316 is coupled to the mounting lock 314. The bolt 318 is also coupled to the mounting lock 314. The bolt 318 extends through the antenna mount assembly 300 from the top of the antenna mount assembly 300 to the bottom of the antenna mount assembly 300. The bolt 318 is coupled to the baseplate 310 to secure the lock assembly 315 to the baseplate 310.

In an exemplary embodiment, the lock assembly 315 is located below the baseplate 310. For example, the cable frame 316 and the mounting lock 314 of the lock assembly 315 are located below the baseplate 310. The bolt 318 also extends below the baseplate 310. The lock assembly 315 and a portion of the bolt 318 are configured to be lowered through the opening 54 in the rooftop 52 to the interior of the vehicle 50.

During installation, the lock assembly 315 may be rotated relative to the baseplate 310 to a locked position. For example, the cable frame 316 and the mounting lock 314 may be rotated relative to the baseplate 310 to a locked position. The mounting lock 314 engages the bottom side of the rooftop 52 to lock the antenna mount assembly 300 to the rooftop 52. In an exemplary embodiment, the mounting lock 314 is rotated to the locked position by tightening the bolt 318. In the illustrated embodiment, the bolt 318 is accessible from the bottom of the antenna mount assembly 300 and is thus accessible at the interior of the vehicle 50 during installation. The bolt 318 is tightened by rotating the bolt 318. As the bolt 318 is tightened, the lock assembly 315 is rotated to the locked position. The lock assembly 315 is configured to be securely couple to the rooftop 52 in the locked position.

In an exemplary embodiment, the lock assembly 315 is electrically conductive. For example, the lock assembly 315 is manufactured from a metal material. Optionally, the lock assembly 315 may be a diecast component. In an exemplary embodiment, the bolt 318 is electrically conductive. For example, the bolt 318 is manufactured from a metal material. In an exemplary embodiment, the baseplate 310 is electrically conductive. For example, the baseplate 310 may be manufactured from a metal material. Optionally, the baseplate 310 may be a stamped and formed part. When installed, the antenna mount assembly 300 is electrically grounded to the rooftop 52 of the vehicle 50. The lock assembly 315 engages and is electrically connected to the rooftop 52. The bolt 318 engages and is electrically connected to the lock assembly 315, such as to the mounting lock 314. The bolt 318 extends through the antenna mount assembly 300 and is coupled to the baseplate 310. The baseplate 310 is electrically grounded to the rooftop 52 through the bolt 318 and through the lock assembly 315. In an exemplary embodiment, the baseplate 310 forms a ground plane for the antenna 10. For example, the baseplate 310 may be electrically connected to the antenna circuit board 34 and/or the antenna elements 12.

Figure 18:
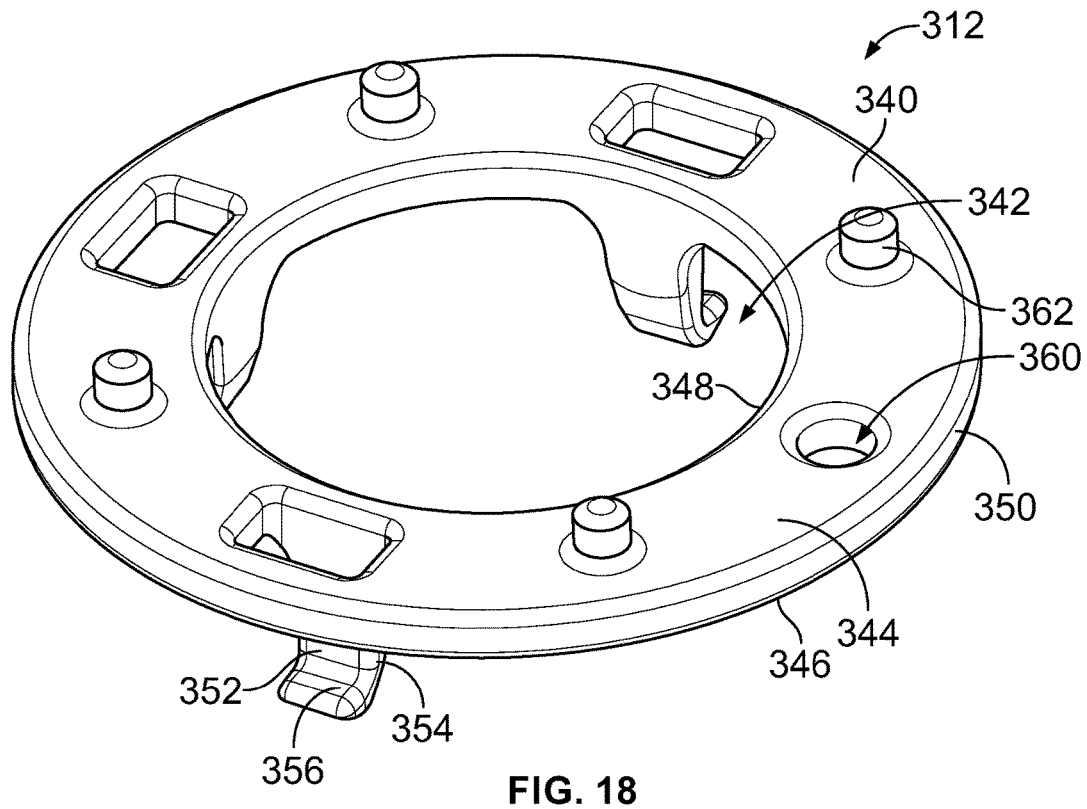
FIG. 18 is a top perspective view of the vehicle mounting bracket in accordance with an exemplary embodiment.
Figure 19:
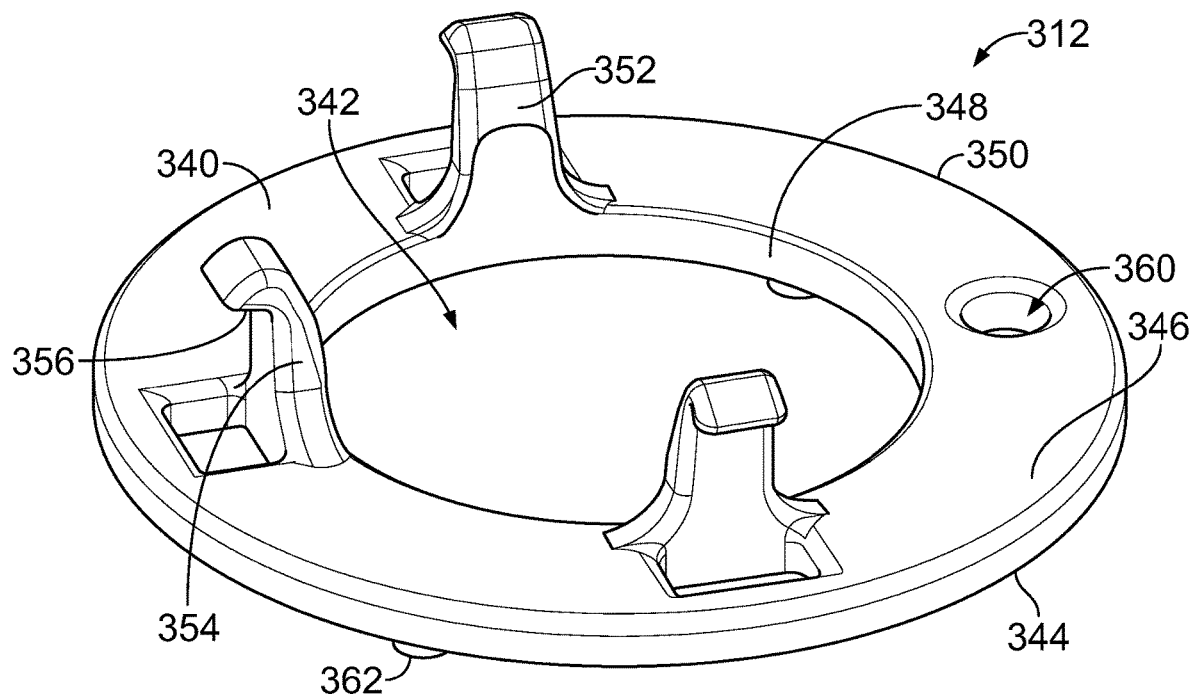
FIG. 19 is a bottom perspective view of the vehicle mounting bracket in accordance with an exemplary embodiment.

FIG. 18 is a top perspective view of the vehicle mounting bracket 312 in accordance with an exemplary embodiment. FIG. 19 is a bottom perspective view of the vehicle mounting bracket 312 in accordance with an exemplary embodiment. The vehicle mounting bracket 312 includes a ring 340 surrounding an opening 342. The ring 340 has an upper surface 344 and a lower surface 346. The ring 340 has an interior edge 348 forming the opening 342 and an exterior edge 350 opposite the interior edge 348 defining the outer perimeter of the ring 340. In an exemplary embodiment, the ring 340 is manufactured from a plastic material. For example, the ring 340 may be injection molded using plastic material.

The vehicle mounting bracket 312 includes a plurality of rooftop latches 352 extending from the lower surface 346. The rooftop latches 352 are configured to be latchably coupled to the rooftop 52. For example, during installation, as the antenna mount assembly 300 is lowered through the opening 54 and the rooftop 52, the rooftop latches 352 extend through the opening 54 in the rooftop 52 to engage the interior surface 56 of the rooftop 52. Each rooftop latch 352 includes a latch arm 354 having a latch surface 356 configured to engage the rooftop 52. When unlatched, the antenna mount assembly 300 is loosely coupled to the rooftop 52. Antenna mount assembly 300 is secured from incidental falling off for removal from the rooftop 52 while installation is completed and the antenna mount assembly 300 is locked onto the rooftop 52 (for example, using the lock assembly 315 (shown in FIGS. 16 and 17). Optionally, the latch arms 354 are deflectable. In the illustrated embodiment, the vehicle mounting bracket 312 includes three rooftop latches 352. Greater or fewer rooftop latches 352 may be provided in alternative embodiments. In the illustrated embodiment, the rooftop latches 352 are offset 90° from each other having one quadrant devoid of any rooftop latches 352. For example, the rooftop latches 352 are provided at north, south, and west orientations without a corresponding rooftop latch at the east orientation. The open area leaves space for other components of the vehicle mounting bracket 312, such as a locating feature.

In an exemplary embodiment, the vehicle mounting bracket 312 includes one or more locating features 360 used to locate the vehicle mounting bracket 312 relative to the baseplate 310 (shown in FIG. 4). In the illustrated embodiment, the locating feature 360 is an opening. Other types of locating features may be used in alternative embodiments, such as a slot, a groove, a channel, a tab, a rib, a post, and the like.

In an exemplary embodiment, the vehicle mounting bracket 312 includes one or more circuit board supports 362 extending from the upper surface 344. The circuit board supports 362 support the antenna circuit board 34 (shown in FIG. 1) relative to the antenna mount assembly 300. The circuit board supports 362 of the antenna circuit board 34 at an elevated position above the upper surface 344. The circuit board supports 362 elevate the antenna circuit board 34 to provide a space for routing the antenna cables 18. In the illustrated embodiment, the circuit board supports 362 are posts extending from the upper surface 344. Other structures may be used in alternative embodiments. In the illustrated embodiment, four circuit board supports 362 are provided at spaced apart locations. Greater or fewer circuit board supports 362 may be used in alternative embodiments.

Figure 20:
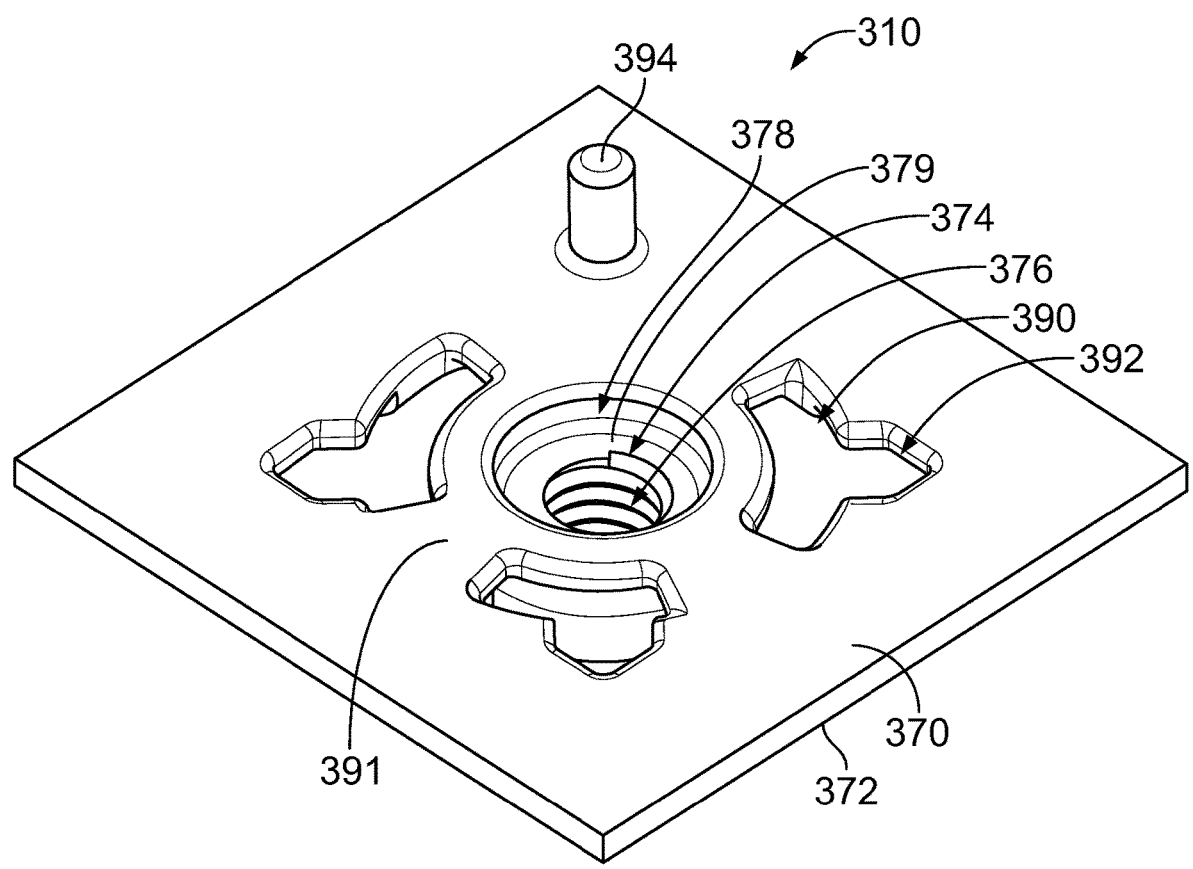
FIG. 20 is a top perspective view of the baseplate in accordance with an exemplary embodiment.
Figure 21:
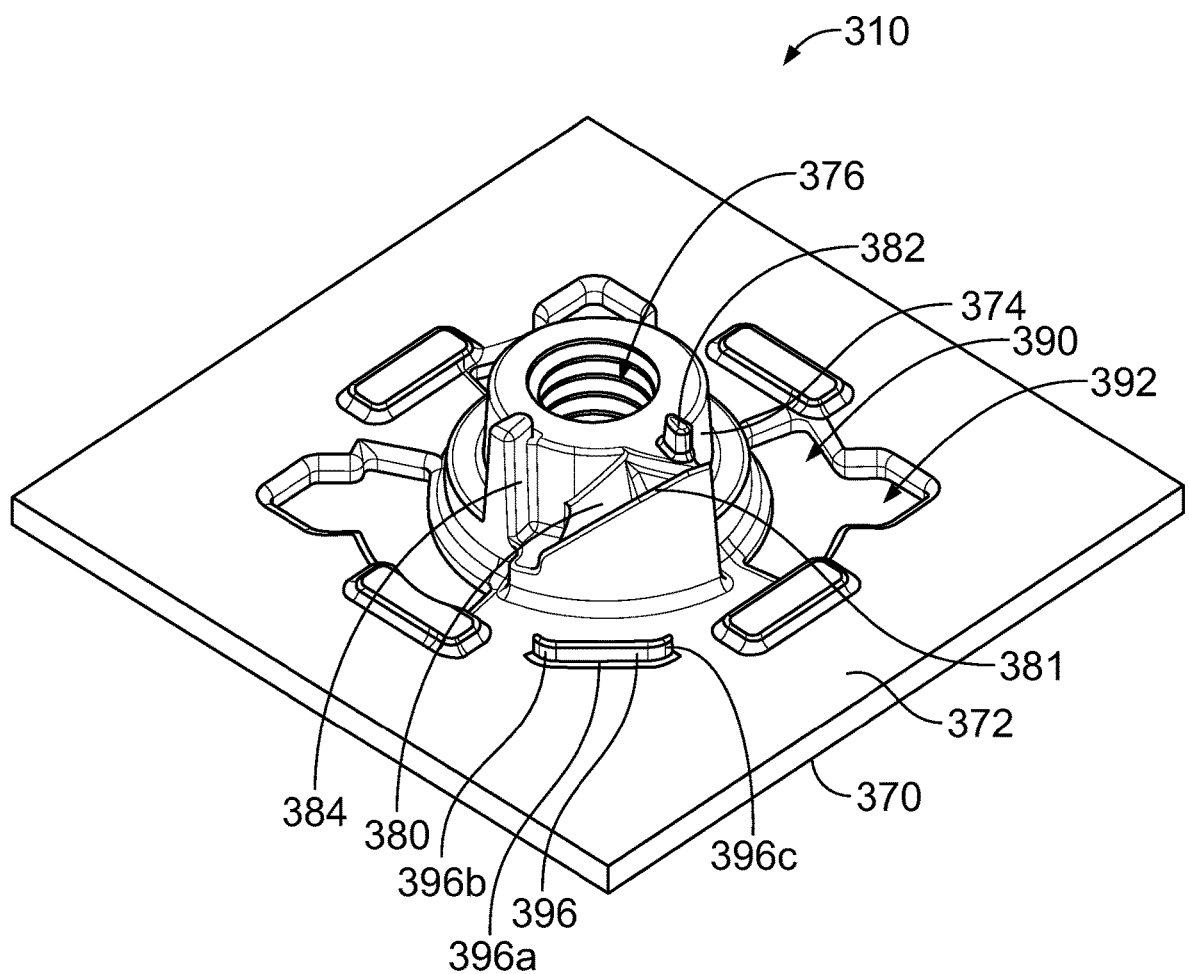
FIG. 21 is a bottom perspective view of the baseplate in accordance with an exemplary embodiment.

FIG. 20 is a top perspective view of the baseplate 310 in accordance with an exemplary embodiment. FIG. 21 is a bottom perspective view of the baseplate 310 in accordance with an exemplary embodiment. In an exemplary embodiment, the baseplate 310 is manufactured from a conductive material, such as a metal material. The baseplate 310 may be stamped and formed from a blank or sheet of metal material. Alternatively, the baseplate 310 may be diecast or manufactured as a plated plastic structure.

The baseplate 310 includes an upper surface 370 and a lower surface 372. The lower surface 372 faces the exterior surface 58 of the rooftop 52 (shown in FIG. 1). In an exemplary embodiment, a seal (not shown) may be provided at the lower surface 372. For example, the seal may be a perimeter seal or a gasket provided between the lower surface 372 and the exterior surface 58.

The baseplate 310 includes a bolt hub 374 configured to receive the bolt 318. In an exemplary embodiment, the bolt hub 374 extends from the lower surface 372. The bolt hub 374 includes a threaded bore 376 extending therethrough. The bolt 318 is configured to be threadably coupled to the bolt hub 374 at the threaded bore 376. In an exemplary embodiment, the bolt hub 374 includes a nut pocket 378 at the top of the bolt hub 374. The nut pocket 378 receives the threaded nut 326 (shown in FIG. 4). In an exemplary embodiment, the bolt hub 374 includes a shoulder 379 at the bottom of the nut pocket 378. The shoulder provides a stop surface for the threaded nut 326 to position and retain the threaded nut 326 in the nut pocket 378. For example, the shoulder prevents the bolt 318 from pulling the threaded nut 326 through the threaded bore 376.

In an exemplary embodiment, the baseplate 310 includes a slider ramp 380. The slider ramp 380 is configured to interface with the lock assembly 315 to position the lock assembly 315 relative to the baseplate 310. In the illustrated embodiment, the slider ramp 380 is provided at the exterior of the bolt hub 374. The slider ramp 380 may be provided at other locations in alternative embodiments. The slider ramp 380 is angled nonparallel to the upper surface 370 and the lower surface 372 of the baseplate 310. For example, the slider ramp 380 may wrap partially helically around the bolt hub 374. In various embodiments, the slider ramp 380 may wrap approximately 45° around the bolt hub 374. In an exemplary embodiment, the slider ramp 380 includes a lip 381 at a radially outer edge of the slider ramp 380. The lip 381 is flared to stand proud relative to the surface of the slider ramp 380. The slider ramp 380 may be a cupped surface. The lip 381 retains the guide post on the slider ramp 380. The lock assembly 315 is configured to slide along the slider ramp 380 during installation to position the lock assembly 315 relative to the baseplate 310.

In an exemplary embodiment, the baseplate 310 includes a first rotation stop element 382 and a second rotation stop element 384. The slider ramp 380 extends between the first and second rotation stop elements 382, 384. In the illustrated embodiment, the rotation stop elements 382, 384 are vertically extending walls. Other types of stop elements may be used in alternative embodiments. The rotation stop elements 382, 384 provide stop surfaces for the lock assembly 315. For example, the lock assembly 315 is unable to move along the slider ramp 380 past the first rotation stop element 382 or past the second rotation stop element 384. The movement of the lock assembly 315 is contained between the first rotation stop element 382 at the second rotation stop element 384. In an exemplary embodiment, the first and second rotation stop elements 382, 384 are radially offset from each other by between 30° and 60°. For example, the rotation stop elements 382, 384 may be radially offset from each other by approximately 45° in various embodiments. The slider ramp 380 and the rotation stop elements 382, 384 allow rotation movement of the lock assembly 315 by between 30° and 60°. For example, in the illustrated embodiment, the slider ramp 380 and the rotation stop elements 382, 384 may allow rotation of the lock assembly 315 by approximately 45°. In an exemplary embodiment, the first and second rotation stop elements 382, 384 may be vertically offset from each other. The slider ramp 380 may be angled between the rotation stop elements 382, 384 to allow vertical movement in addition to rotational movement of the lock assembly 315. In various embodiments, the first rotation stop element 382 and/or the second rotation stop element 384 may extend beyond the end of the bolt hub 374.

The baseplate 310 includes cable slots 390 extending therethrough. The cable slots 390 are configured to receive corresponding antenna cables 18 and allow the antenna cables 18 to pass through the baseplate 310. In the illustrated embodiment, the cable slots 390 are separated by separating walls 391. In an exemplary embodiment, the cable slots 390 are elongated to allow the antenna cables 18 to move within the cable slots 390. For example, the antenna cables 18 may be rotated with the cable frame 36 within the cable slots 390. In the illustrated embodiment, the cable slots 390 follow arcuate paths. The cable slots 390 may have other shapes in alternative embodiments. In the illustrated embodiment, three cable slots 390 are provided. Greater or fewer cable slots 390 may be provided in alternative embodiments. Optionally, each cable slot 390 may receive multiple antenna cables 18. For example, each cable slot 390 may receive a pair of the antenna cables 18.

The baseplate 310 includes latch pockets 392 extending therethrough. The latch pockets 392 receive corresponding rooftop latches 352 (shown in FIG. 5) of the vehicle mounting bracket 312. The rooftop latches 352 may extend through the baseplate 310 to interface with the rooftop 52. In the illustrated embodiment, the latch pockets 392 are open to the cable slots 390. Alternatively, the latch pockets 392 may be remote from the cable slots 390.

In an exemplary embodiment, the baseplate 310 includes a mounting bracket locating feature 394. The mounting bracket locating feature 394 is used to locate the vehicle mounting bracket 312 relative to the baseplate 310. In the illustrated embodiment, the mounting bracket locating feature 394 is a post extending from the upper surface 370 of the baseplate 310. Other types of locating features may be used in alternative embodiments, such as a rib, a tab, a rail, an opening, a channel, a slot, and the like. Optionally, multiple mounting bracket locating features 394 may be provided.

In an exemplary embodiment, the baseplate 310 includes a rooftop locating feature 396. The rooftop locating feature 396 is used to locate the baseplate 310 relative to the rooftop 52. In the illustrated embodiment, the rooftop locating feature 396 is a tab extending from the lower surface 372 of the baseplate 310. The tab includes a main wall 396a extending at an angle, such as at a 45° angle, relative to a pair of the end walls 396b, 396c. The walls of the tab may fit in the opening 54 in the rooftop 52 to orient the baseplate 310 relative to the rooftop 52. Other types of locating features may be used in alternative embodiments, such as a rib, a rail, a post, an opening, a channel, a slot, and the like. Optionally, multiple rooftop locating features 396 may be provided.

Figure 22:
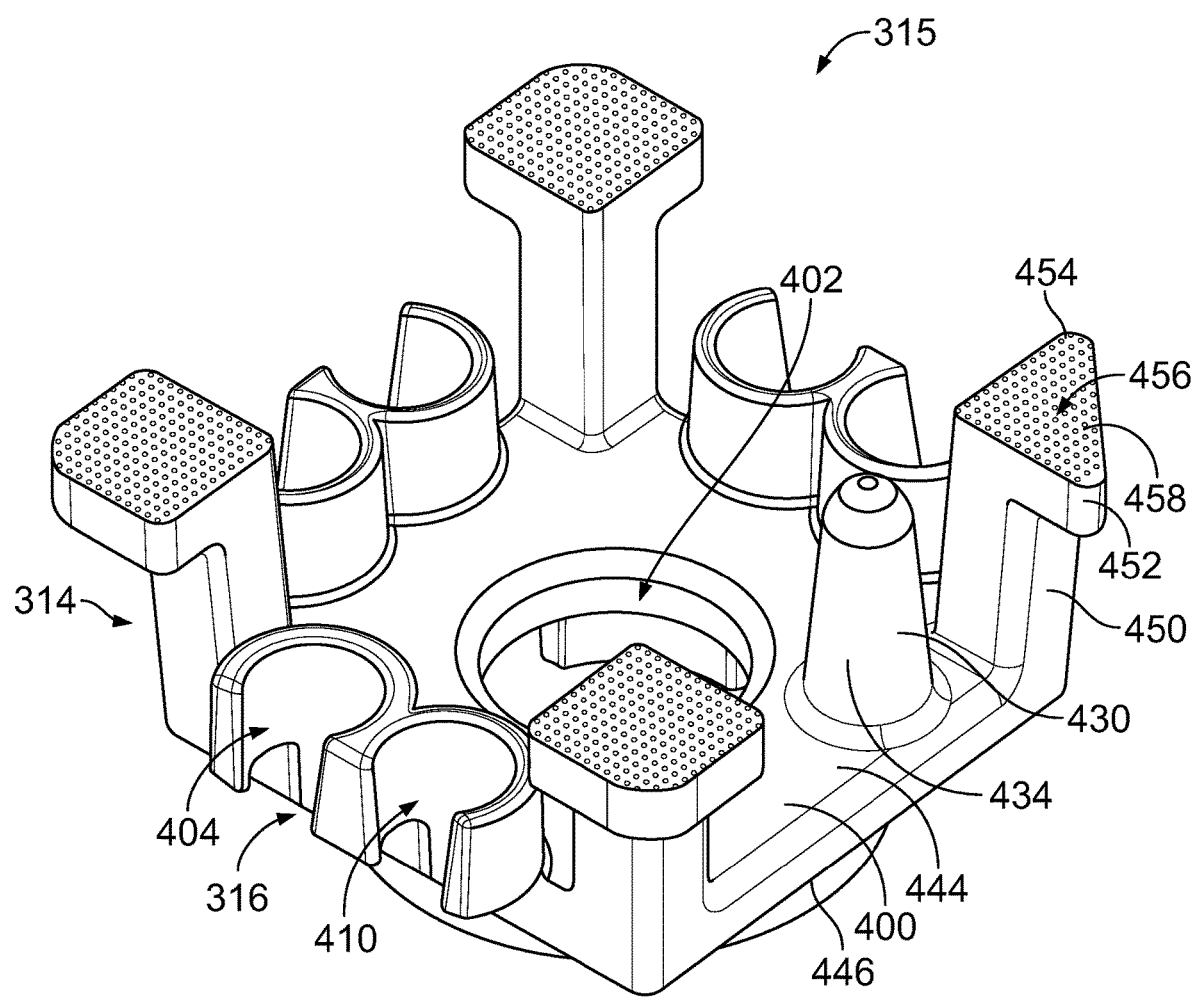
FIG. 22 is a top perspective view of the lock assembly in accordance with an exemplary embodiment.
Figure 23:
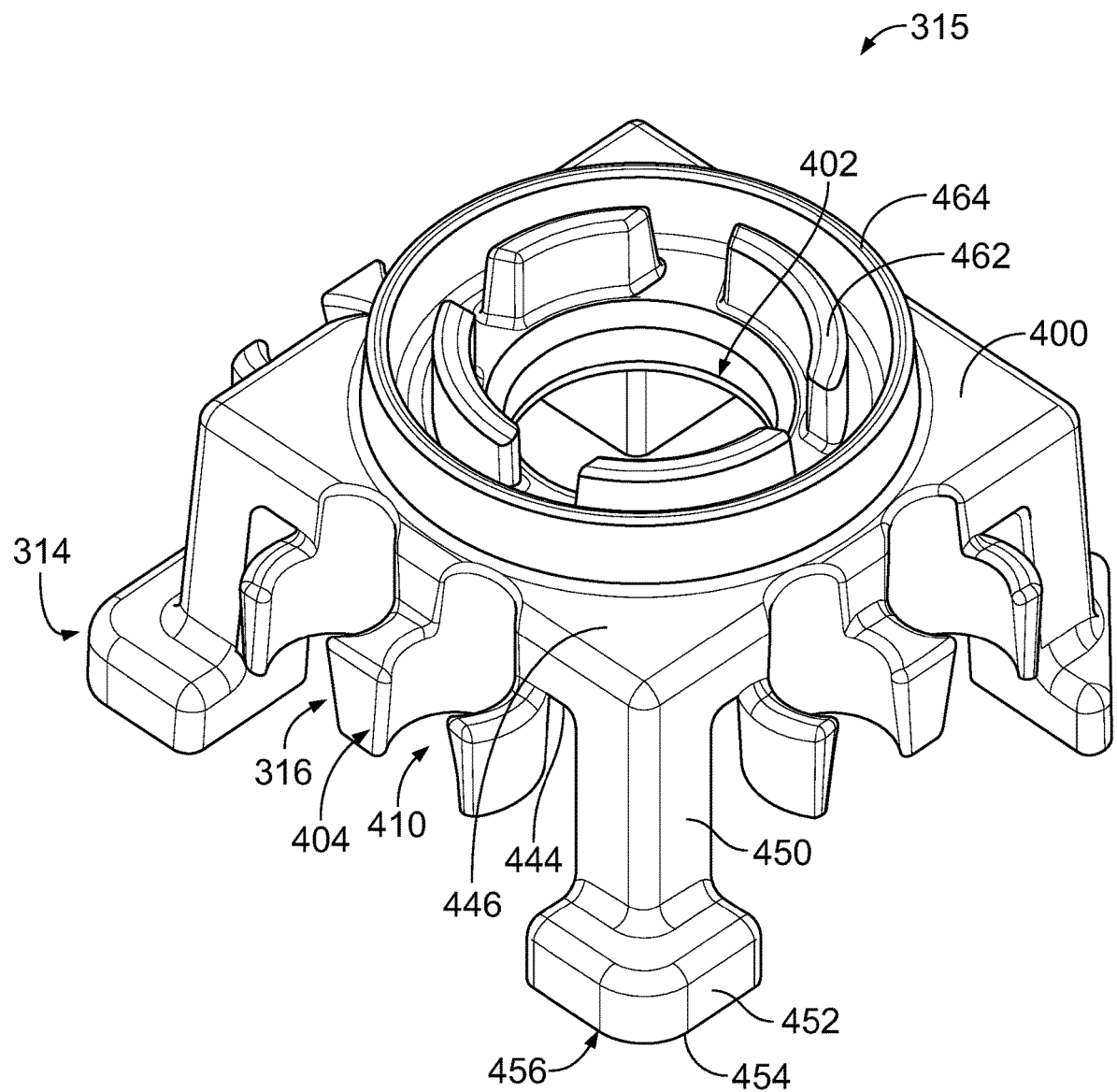
FIG. 23 is a bottom perspective view of the lock assembly in accordance with an exemplary embodiment.

FIG. 22 is a top perspective view of the lock assembly 315 in accordance with an exemplary embodiment. FIG. 23 is a bottom perspective view of the lock assembly 315 in accordance with an exemplary embodiment. The lock assembly 315 includes the mounting lock 314 and the cable frame 316. In an exemplary embodiment, the mounting lock 314 and the cable frame 316 are integrated into a unitary structure. The mounting lock 314 and the cable frame 316 are integrated as a single piece.

The lock assembly 315 includes a base 400 having an opening 402 therethrough configured to receive the bolt 318 (shown in FIG. 16). The opening 402 is provided at the interior of the lock assembly 315, such as approximately centered within the lock assembly 315. Optionally, the base 400 may be generally planar having an upper surface 444 and a lower surface 446. In the illustrated embodiment, the base 400 is generally rectangular, such as being square. The base 400 is sized and shaped to fit through the opening 54 in the rooftop 52 of the vehicle 50.

The cable frame 316 of the lock assembly 315 includes cable supports 404 extending from the base 400. The cable supports 404 are used to support corresponding antenna cables 18 (shown in FIG. 4). In an exemplary embodiment, multiple cable supports 404 are provided at least partially surrounding the opening 402. The cable supports 404 are provided at multiple sides of the base 400. For example, in the illustrated embodiment, the cable frame 316 includes cable supports 404 at three sides of the cable frame 316. The remaining fourth side is open, such as for other components of the cable frame 316. The cable supports 404 include cable openings 410 configured to receive corresponding antenna cables 18. The cable openings 410 are arranged around the cable frame 316 to position the antenna cables 18 relative to each other. In the illustrated embodiment, the cable openings 410 are open at outer sides thereof to be loaded into and removed from the cable openings 410 but are configured to clamp around the antenna cables 18. Alternatively, the cable openings 410 may be closed to completely surround the antenna cables 18.

In an exemplary embodiment, the lock assembly 315 includes a slider post 430 extending from the base 400. The slider post 430 extends from the upper surface 444 of the base 400. The slider post 430 is configured to interface with the baseplate 310 (shown in FIG. 20) to position the lock assembly 315 relative to the baseplate 310. In an exemplary embodiment, the slider post 430 is configured to interface with the slider ramp 380 (shown in FIG. 21) of the baseplate 310. The slider post 430 is movable along the slider ramp 380 to position the cable frame 316 relative to the baseplate 310. The slider post 430 is configured to slide along the slider ramp 380, which causes the lock assembly 315 to rotate during assembly of the antenna mount assembly 300. Other types of locating features may be used in alternative embodiments to locate the lock assembly 315 relative to the baseplate 310.

In an exemplary embodiment, the lock assembly 315 includes one or more stop features 434 used to position the lock assembly 315 relative to the baseplate 310. Optionally, a side edge of the slider post 430 may define one of the stop features 434. The stop features 434 engage the stop features of the baseplate 310 to limit movement of the lock assembly 315 relative to the baseplate 310. For example, the stop features 434 may limit vertical movement and/or horizontal movement and/or rotating movement of the lock assembly 315 relative to the baseplate 310.

The mounting lock 314 of the lock assembly 315 includes mounting legs 450 extending from the base 400. In an exemplary embodiment, the mounting legs 450 are integral with the base 400. For example, the mounting legs 450 are diecast with the base 400. In the illustrated embodiment, the mounting legs 450 extend upward from the upper surface 444. Optionally, the mounting legs 450 may be solid legs for rigidity and strength for mating with the rooftop 52 of the vehicle 50. The mounting legs 450 are provided in the four corners of the base 400 in the illustrated embodiment. However, other locations are possible in alternative embodiments. Greater or fewer than four mounting legs 450 may be used in alternative embodiments. Each mounting leg 450 includes a foot 452 at the distal end 454 thereof. The foot 452 has a greater cross-sectional area than the mounting leg 450. The foot 452 has an upward facing engagement surface 456 configured to engage the interior surface 56 of the rooftop 52 when the antenna mount assembly 300 is installed in the vehicle 50. In the illustrated embodiment, the foot 452 forms a generally rectangular pad for seating against the rooftop 52. Optionally, at least one of the feet 452 may have a different shape, such as for keying and orientation of the lock assembly 315 relative to the baseplate 310 and/or the rooftop 52. For example, the opening 54 in the rooftop 52 may have one or more corners that are shaped differently. The feet 452 are shaped to correspond with the shape of the opening 54 in the rooftop 52. In various embodiments, serrations 458 are provided at the engagement surface 456. The serrations 458 scour the metal surface of the rooftop 52 during assembly to wipe against the interior surface 56 and create a metal-to-metal interface between the mounting lock 314 and the rooftop 52.

In an exemplary embodiment, the base 400 includes stop tabs 462 extending from the lower surface 446 of the base 400. The stop tabs 462 surrounds the opening 402. The stop tabs 462 are configured to interface with the bolt 318 during assembly. For example, the bolt 318 may press against the stop tabs 462 as the bolt 318 is tightened. The stop tabs 462 hold the head 320 of the bolt 318 at a spaced apart location from the base 400. In an exemplary embodiment, the stop tabs 462 are integral with the base 400. For example, the stop tabs 462 are diecast with the base 400. The mounting lock 314 is configured to be electrically connected to the bolt 318 through the stop tabs 462. In various embodiments, an outer stop tab 464 surrounds the stop tabs 462. The outer stop tab 464 may be used to support the installation tool used to install the bolt 318.

Returning to FIGS. 16 and 17, the parts of the antenna mount assembly 300 are assembled together to form the assembled unit 302. The vehicle mounting bracket 312 is coupled to the upper surface 370 of the baseplate 310. The lock assembly 315 forms the lower portion 306. The lower portion 306 is coupled to the baseplate 310 using the bolt 318. The threaded nut 326 holds the bolt 318 in the bolt hub 374 of the baseplate 310. The bolt 318 is unable to be backed out of the bolt hub 374 by way of the nut 326 being held in the nut pocket 378. The head 320 of the bolt 318 is located below the lock assembly 315 to capture the lock assembly 315 between the head 320 and the baseplate 310. As such, the lower portion 306 of the antenna mount assembly 300 is unable to be inadvertently removed from the upper portion 304 of the antenna mount assembly 300. The assembled unit 302 remains an assembled unit without worry of the various pieces coming apart during installation. Additionally, the installer does not need to hold the various parts together during installation. Rather, the installer may simply use a drill or ratchet tool to tighten the bolt 318 to complete installation to the vehicle 50. As such, the antenna mount assembly 300 may be assembled with one hand by the installer.

When assembled, the antenna cables 18 are held in the cable supports 404. The antenna cables 18 pass through the opening 342 in the ring 340 of the vehicle mounting bracket 312 and pass through the cable slots 390 in the baseplate 310 to the lock assembly 315. In an exemplary embodiment, one or more cable retainers (not shown) may be used to secure the antenna cables 18 to the antenna mount assembly 300. In an exemplary embodiment, the cable retainer may be tape wrapped around the lock assembly 315 to retain the antenna cables 18 in the cable supports 404. Other types of cable retainers may be used in alternative embodiments, such as a zip tie. The cable retainers organize the antenna cables 18 and hold the antenna cables 18 as part of the lower portion 306 for ease of loading the antenna mount assembly 300 (with the antenna cables 18) through the opening 54 in the rooftop 52. In an exemplary embodiment, the cable retainers may be coupled to the lock assembly 315 after the antenna mount assembly 300 is assembled, such as at a final stage of assembly.

When assembled, the vehicle mounting bracket 312 is coupled to the baseplate 310. The mounting bracket locating feature 394 of the baseplate 310 interfaces with the locating feature 360 of the vehicle mounting bracket 312 to orient the vehicle mounting bracket 312 relative to the baseplate 310. For example, the post forming the mounting bracket locating feature 394 is received in the opening defining the locating feature 360. The rooftop latches 352 extend from the bottom of the vehicle mounting bracket 312 through the baseplate 310. The rooftop latches 352 are received in the rooftop locating features 396 and pass through the baseplate 310 to the bottom side of the baseplate 310 for interfacing with the rooftop 52 of the vehicle 50. The rooftop latches 352 are used during the initial installation to latchably couple the antenna mount assembly 300 to the rooftop 52. The rooftop latches 352 hold the position of the antenna mount assembly 300 on the rooftop while the installer tightens the bolt to lockably couple the antenna mount assembly 300 to the rooftop 52. The antenna mount assembly 300 is more securely coupled to the rooftop 52 when lockably coupled as compared to being latchably coupled.

When assembled, the feet 452 of the mounting legs 450 of the lock assembly 315 face the bottom side of the baseplate 310. The engagement surfaces 456 are spaced apart from the lower surface 372 of the baseplate 310. The gap or space between the engagement surfaces 456 and the lower surface 372 is wide enough to receive the rooftop 52 of the vehicle 50. After the antenna mount assembly 300 is loaded onto the rooftop 52 and in the latched position (rooftop latches 352 coupled to the lower surface 372), the bolt 318 is tightened to close the gap and force the lock assembly 315 to a locked position to secure the antenna mount assembly 300 to the rooftop 52 of the vehicle 50. The feet 452 are pressed into engagement with the baseplate 310 in the locked position. In an exemplary embodiment, the lock assembly 315 is rotated, while moved upward, to move the mounting legs 450 from clearance positions to engagement positions.

Figure 24:
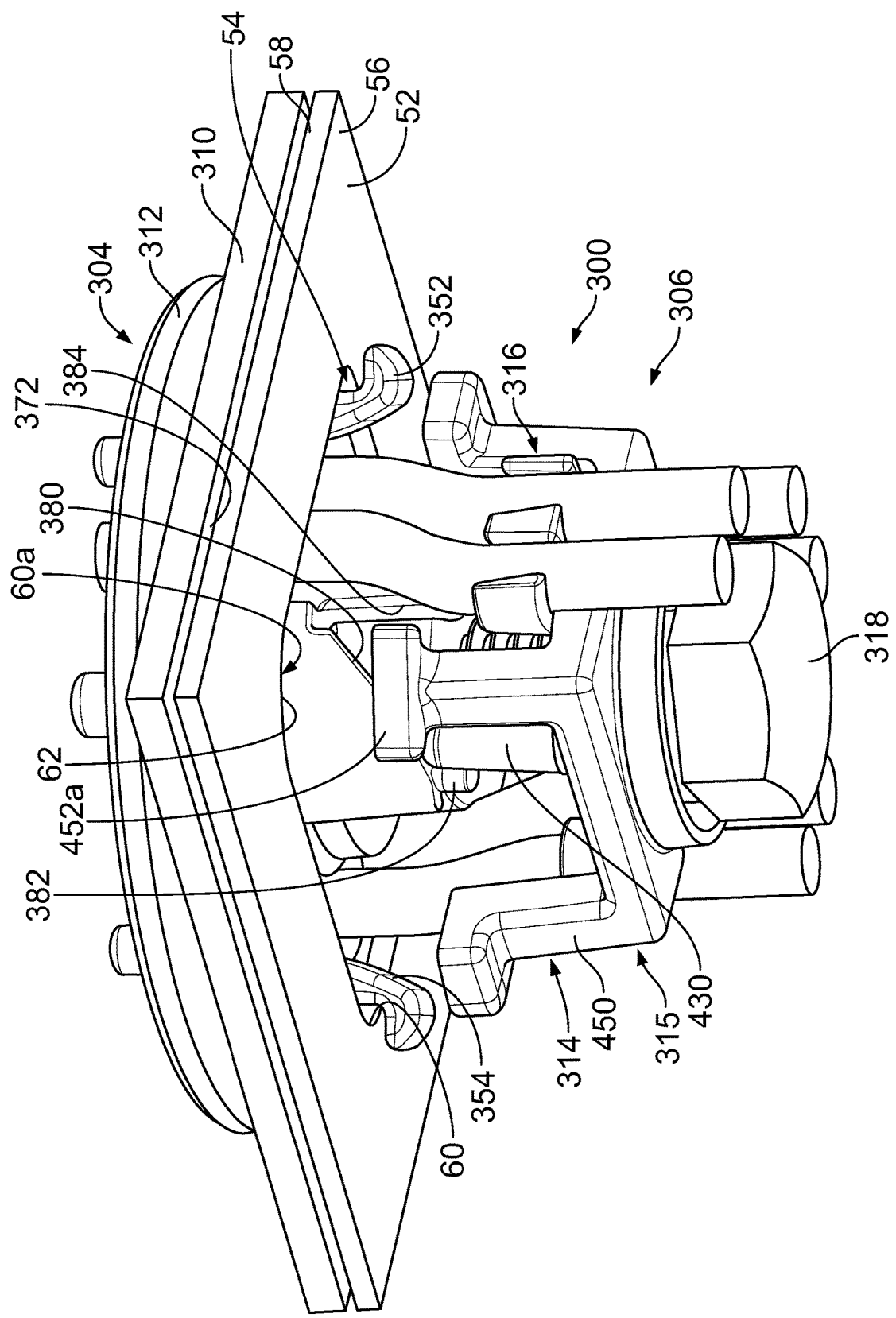
FIG. 24 is a bottom perspective view of the antenna mount assembly partially installed on the rooftop of the vehicle in accordance with an exemplary embodiment.
Figure 25:
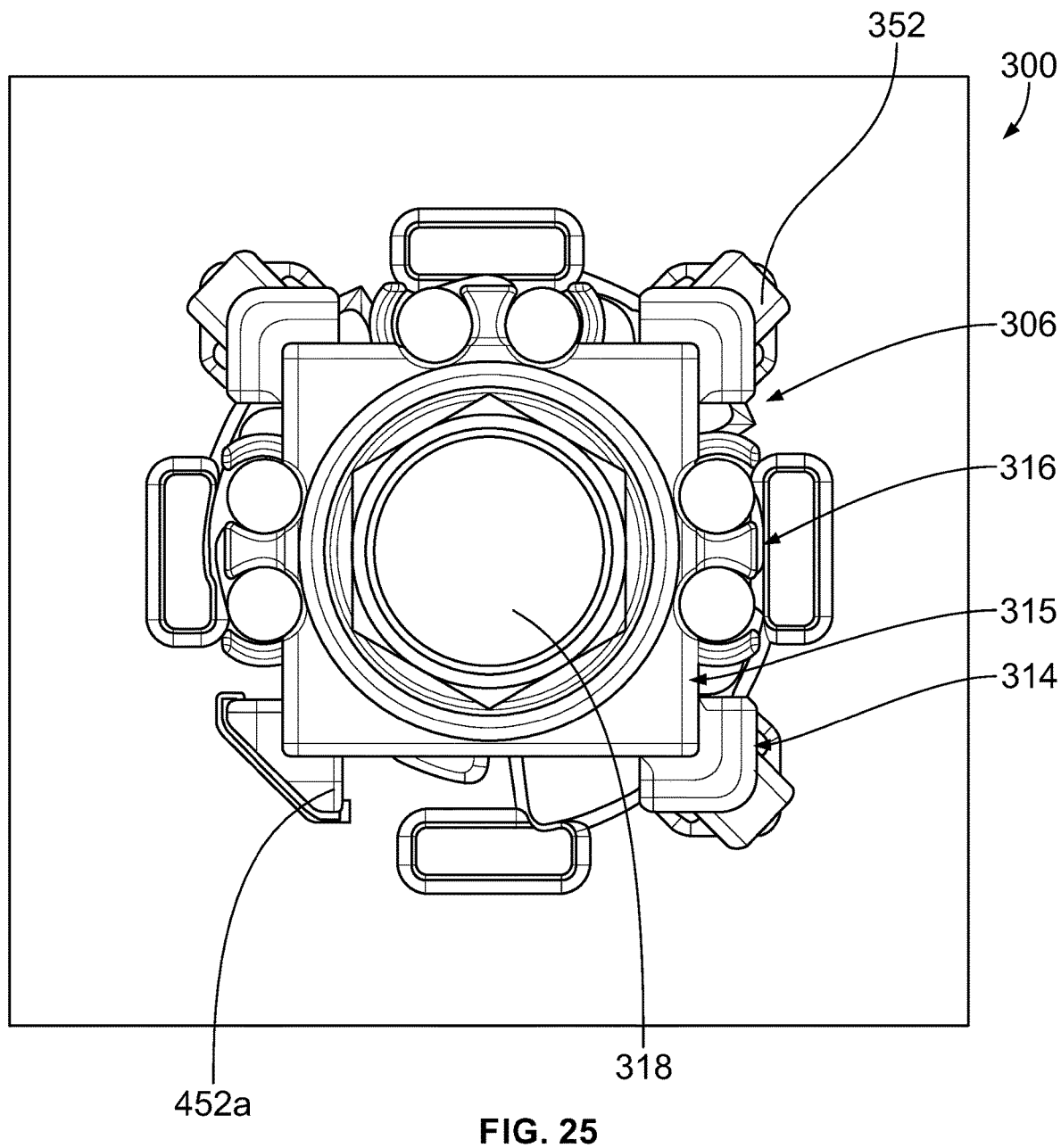
FIG. 25 is a bottom view of the antenna mount assembly partially installed on the rooftop of the vehicle in accordance with an exemplary embodiment.

FIG. 24 is a bottom perspective view of the antenna mount assembly 300 partially installed on the rooftop 52 of the vehicle 50 in accordance with an exemplary embodiment. FIG. 25 is a bottom view of the antenna mount assembly 300 partially installed on the rooftop of the vehicle 50 in accordance with an exemplary embodiment. The antenna mount assembly 300 is shown in a latched position (and unlocked position). In the illustrated embodiment, the vehicle mounting bracket 312 is latchably coupled to the rooftop 52. The rooftop latches 352 are coupled to the interior surface 56 of the rooftop 52.

During installation, the lower portion 306 of the antenna mount assembly 300 is loaded through the opening 54 in the rooftop 52 from above. The antenna mount assembly 300 is loaded until the lower surface 372 of the baseplate 310 bottoms out against the exterior surface 58 of the rooftop 52. A seal (not shown) may be positioned between the lower surface 372 and the exterior surface 58 defining a sealed interface between the antenna mount assembly 300 and the rooftop 52. The rooftop latches 352 are loaded through the opening 54 in the rooftop 52. The latch arms 354 are clipped onto (for example, snappably coupled to) the rooftop 52. In an exemplary embodiment, the rooftop latches 352 are located in corners 60 of the opening 54. The rooftop latches 352 resist rotation of the antenna mount assembly 300 relative to the rooftop 52 when the rooftop latches 352 are in the corners 60. The rooftop 52 is held between the rooftop latches 352 and the baseplate 310.

The lock assembly 315 is sized and shaped to fit through the opening 54 in the rooftop 52. For example, the cable frame 316 and the mounting lock 314 are sized and shaped to fit through the opening 54 in the rooftop 52. For example, the mounting legs 450 may be aligned with the corners 60 to pass through the opening 54. The lock assembly 315 is in a clearance position to pass through the opening 54. The lower portion 306 is able to drop through the opening 54 in the clearance position. Optionally, one of the corners 60 may have a chamfer 62. The chamfered corner 60*a* defines a keying feature for keyed mating of the antenna mount assembly 300 with the rooftop 52. The antenna mount assembly 300 can only be loaded through the opening 54 in a particular orientation. For example, the mounting leg 450 with the truncated foot 452*a* must be aligned with the chamfered corner 60*a* for clearance and loading through the opening 54. Additionally, the vehicle mounting bracket 312 is only able to couple with the rooftop 52 in a single orientation, such as with the three rooftop latches in the three non-chamfered corners. As such, the orientation of the baseplate 310 relative to the rooftop 52 is controlled by the keyed mating of the vehicle mounting bracket 312 with the rooftop 52. Other types of keying features may be used in alternative embodiments to orient the antenna mount assembly 300 with the rooftop 52. In other embodiments, the antenna mount assembly may be coupled to the rooftop 52 without keyed mating features.

In an exemplary embodiment, the lower portion 306 is oriented relative to the upper portion 304 using locating features, such as the slider post 430, the slider ramp 380, the rotation stop elements 382, 384, and the like. In the illustrated embodiment, in the clearance position (prior to torquing or tightening the bolt 318), the slider post 430 is at the top of the slider ramp 380. The slider post 430 engages the first rotation stop element 382 to locate the lock assembly 315 relative to the baseplate 310. The first rotation stop element 382 prevents rotation of the lock assembly 315 in one direction. As the bolt 318 is tightened, the slider post 430 is only able to slide along the slider ramp 380 in one direction away from the first rotation stop element 382. The lock assembly 315 is configured to be moved toward the rooftop 52, in a rotating direction, as the slider post 430 slides along the slider ramp 380. The lock assembly 315 is moved toward the rooftop 52 to close the gap between the mounting legs 450 and the rooftop 52. As the lock assembly 315 is rotated, the mounting legs 450 move from the clearance positions (aligned with the corners 60) to engagement positions (offset from the corners 60) The mounting legs 450 are aligned with the interior surface 56 of the rooftop 52 to engage the rooftop 52.

Figure 26:
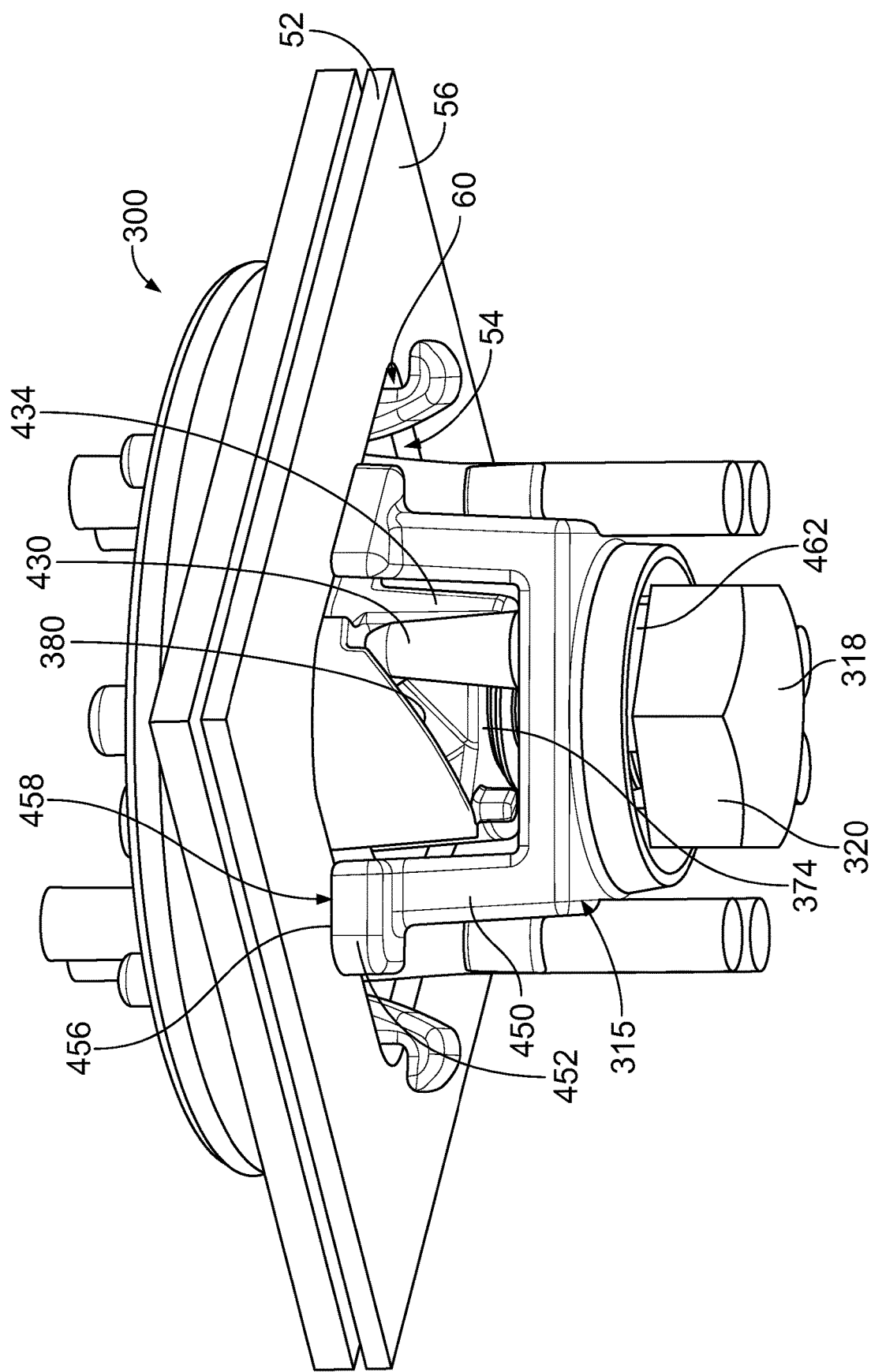
FIG. 26 is a bottom perspective view of the antenna mount assembly locked to the rooftop of the vehicle in accordance with an exemplary embodiment.
Figure 27:
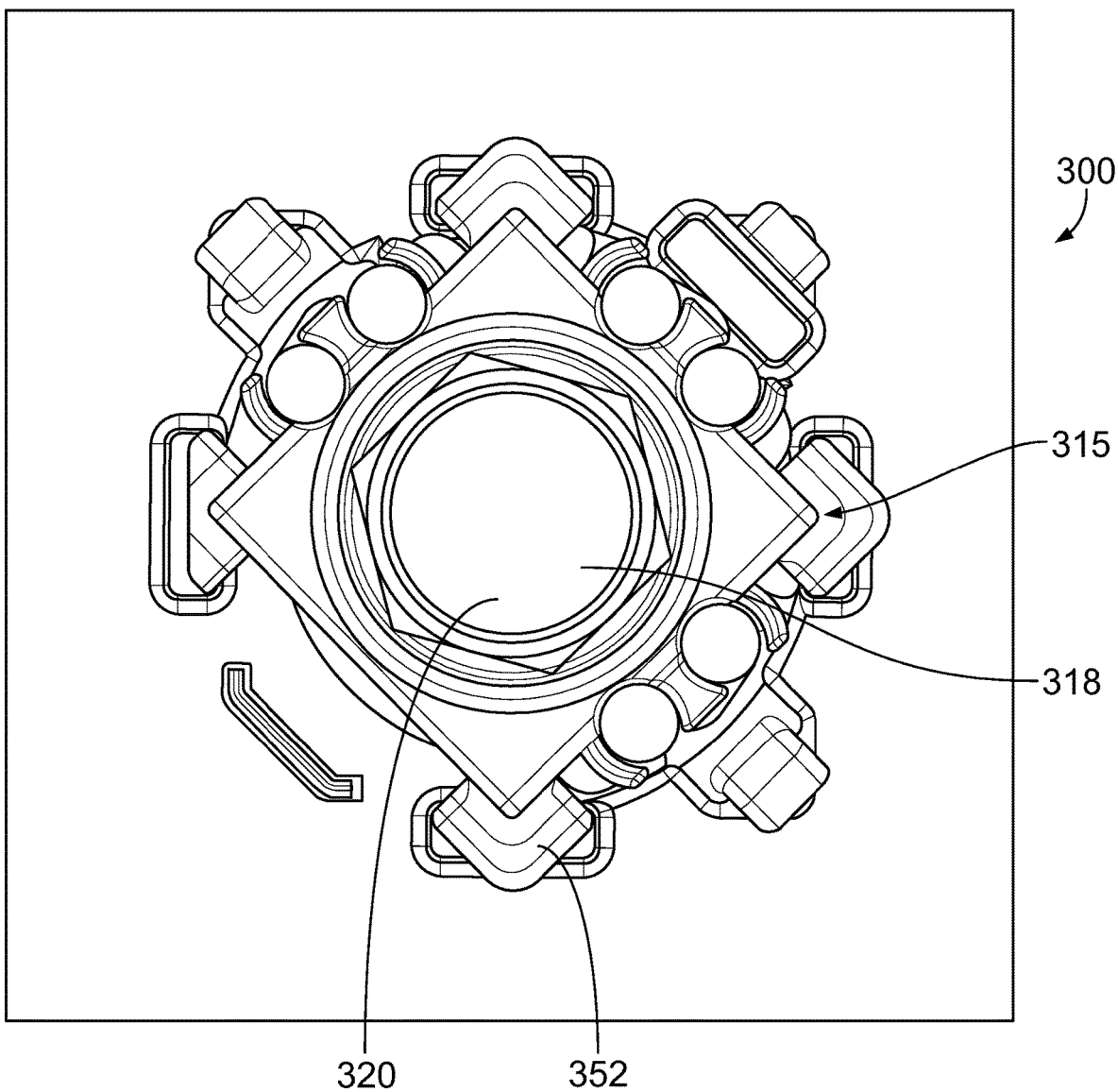
FIG. 27 is a bottom view of the antenna mount assembly locked to the rooftop of the vehicle in accordance with an exemplary embodiment.

FIG. 26 is a bottom perspective view of the antenna mount assembly 300 locked to the rooftop 52 of the vehicle 50 in accordance with an exemplary embodiment. FIG. 27 is a bottom view of the antenna mount assembly 300 locked to the rooftop of the vehicle 50 in accordance with an exemplary embodiment. The antenna mount assembly 300 is shown in the locked position.

During installation, the bolt 318 is tightened to lock the antenna mount assembly 300 to the rooftop 52. As the bolt 318 is tightened, the head 320 is driven into the stop tabs 462 of the lock assembly 315. As the lock assembly 315 is driven upward by the bolt 318, the lock assembly 315 is driven along the slider ramp 380. The slider post 430 rotates along the slider ramp 380 to rotate the lock assembly 315 and move the mounting legs 450 from the clearance position (FIGS. 24 and 25) to the engaging position (FIGS. 26 and 27). The mounting legs 450 are rotated to positions offset from the corners 60, such as along the edges of the opening 54 between the corners 60. In an exemplary embodiment, the lock assembly 315 is rotated approximately 45° to approximately center the feet 452 between the corners 60. The serrations 458 at the engagement surfaces 456 of the feet 452 engage the interior surface 56 of the rooftop 52. The serrations 458 may wipe along the interior surface 56 to create a metal to metal connection between the lock assembly 315 and the rooftop 52. The slider post 430 slides along the slider ramp 380 to the end. After the slider post 430 clears the end of the slider ramp 380, the lock assembly 315 is configured to be driven upward without rotating to drive the mounting legs 450 into the rooftop 52. The stop feature 434 may engage a stop wall of the bolt hub 374 to prevent further rotation of the lock assembly 315. The bolt 318 is tightened to lock the mounting legs 450 against the rooftop 52 and prevent movement of the antenna mount assembly 300 relative to the rooftop 52.

Figure 28:
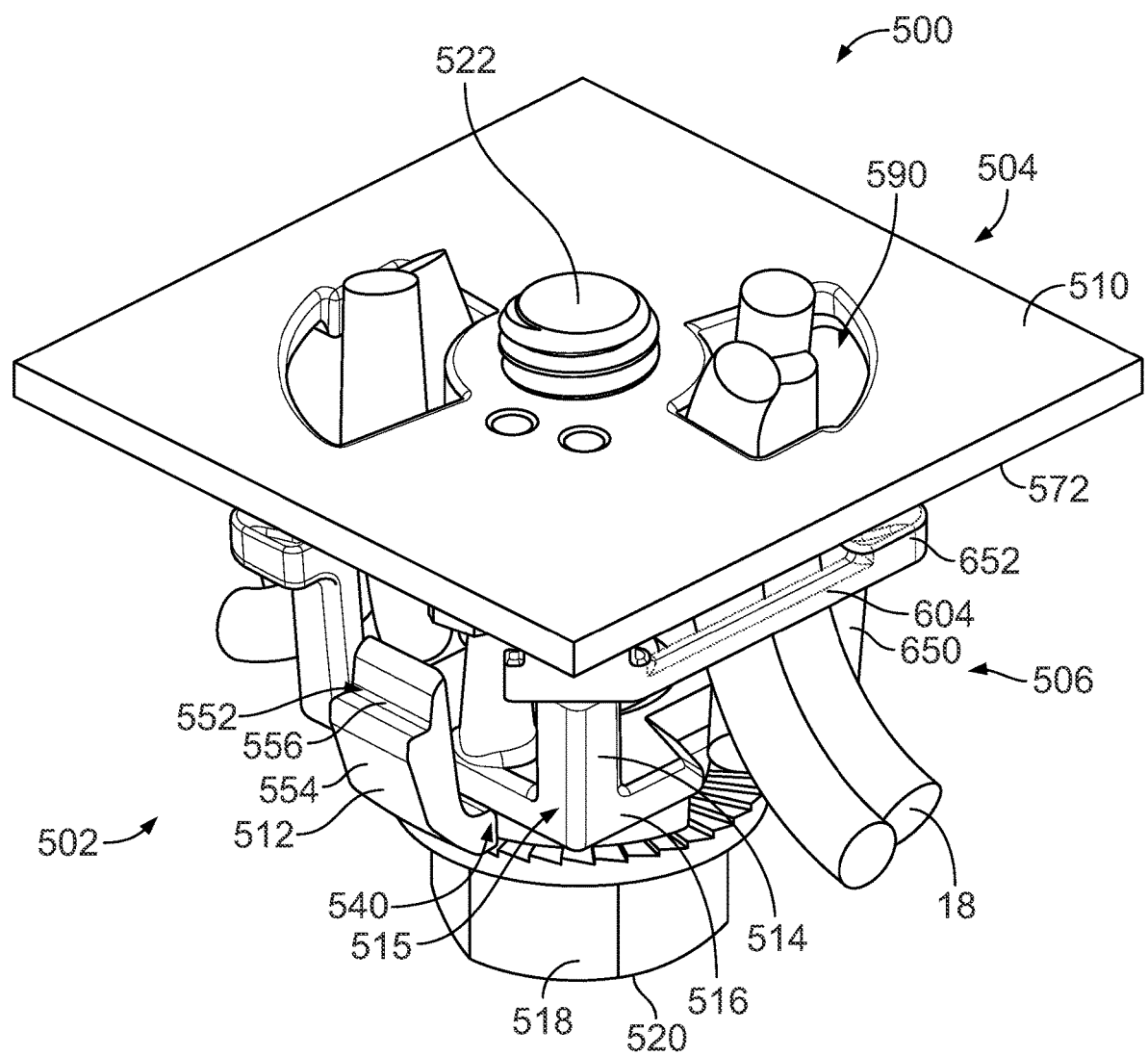
FIG. 28 is a top perspective view of an antenna mount assembly in accordance with an exemplary embodiment.
Figure 29:
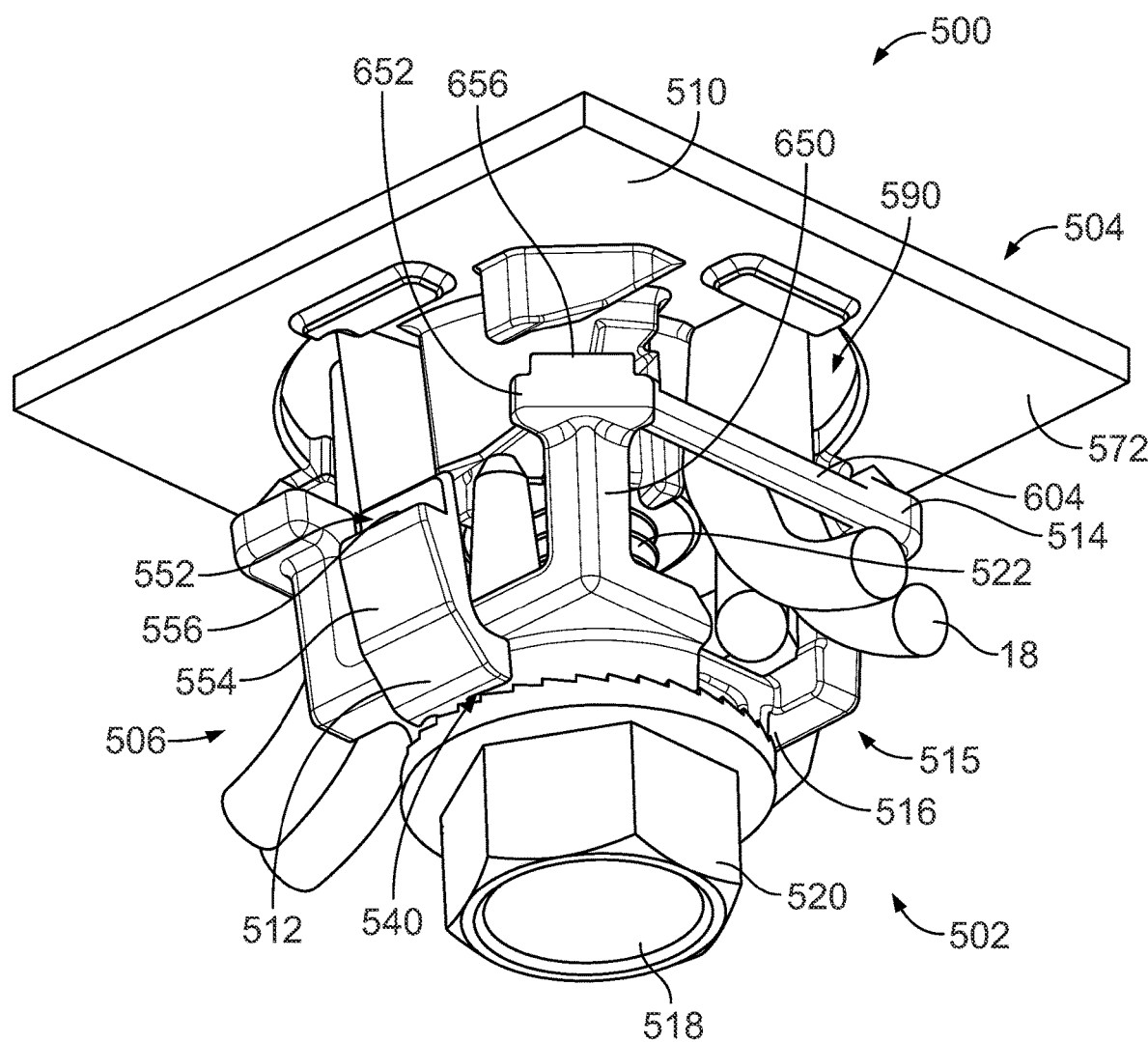
FIG. 29 is a bottom perspective view of the antenna mount assembly in accordance with an exemplary embodiment.

FIG. 28 is a top perspective view of an antenna mount assembly 500 in accordance with an exemplary embodiment. FIG. 29 is a bottom perspective view of the antenna mount assembly 500 in accordance with an exemplary embodiment. The antenna mount assembly 500 is similar to the antenna mount assemblies 100, 300 (shown in FIGS. 2-15 and 16-27, respectively) and may be used in place of the antenna mount assemblies 100, 300 in the vehicle 50 (shown in FIG. 1). FIGS. 28 and 29 illustrate the antenna mount assembly 500 as an assembled unit 502 with the individual pieces of the antenna mount assembly 500 loosely held together as the assembled unit 502. For example, the individual pieces of the antenna mount assembly 500 are unable to be separated or fall apart from the assembled unit 502 during the installation process. The individual pieces of the antenna mount assembly 500 are loosely held together by a bolt.

The assembled unit 502 includes an upper portion 504 and a lower portion 506. The lower portion 506 is coupled to the upper portion 504 to form the assembled unit 502. The upper portion 504 is configured to be located along the exterior of the vehicle 50 (shown in FIG. 1) while the lower portion 506 is configured to be located within the interior of the vehicle 50. During installation, the lower portion 506 may be lowered into the interior of the vehicle 50 through the opening 54 (shown in FIG. 1) from the exterior of the vehicle 50.

The antenna mount assembly 500 includes a baseplate 510, a vehicle mounting bracket 512, a lock assembly 515, and a bolt 518. The baseplate 510 forms the upper portion 504 of the assembled unit 502. The lock assembly 515 and the vehicle mounting bracket 512 form the lower portion 506 of the assembled unit 502. The bolt 518 extends through the antenna mount assembly 500 from the top to the bottom and thus forms part of the upper portion 504 and the lower portion 506.

In an exemplary embodiment, the lock assembly 515 includes a mounting lock 514 and a cable frame 516. In the illustrated embodiment, the mounting lock 514 and the cable frame 516 are integrated as a unitary, single piece structure. The mounting lock 514 is used to mount the lock assembly 515 to the rooftop 52 (shown in FIG. 1). The cable frame 516 is used to hold the cables 18. In an exemplary embodiment, the vehicle mounting bracket 512 is separate and discrete from the lock assembly 515. The vehicle mounting bracket 512 is coupled to the lock assembly 515. The vehicle mounting bracket 512 is used to initially or loosely mount the assembled unit 502 to the rooftop 52 of the vehicle 50. For example, the vehicle mounting bracket 512 may be latchably coupled to the rooftop 52. The lock assembly 515 is used to securely mount the antenna mount assembly 500 to the vehicle 50. For example, the rooftop 52 may be securely captured between the baseplate 510 and the mounting lock 514 of the lock assembly 515.

In an exemplary embodiment, the bolt 518 is a threaded fastener. The bolt 518 includes a head 520 and a threaded shank 522 extending from the head 520. In an exemplary embodiment, the bolt 518 is threadably coupled directly to the baseplate 510. However, in alternatively embodiments, the bolt 518 may include a retainer (not shown), such as a nut, to secure the bolt 518 to the baseplate 510. When assembled, the bolt 518 is unable to be inadvertently disassembled or removed from the baseplate 510. The bolt 518 may be initially installed in an untightened position, the bolt 518 is threadably coupled to the baseplate 510 (or the retainer) to prevent removal of the bolt 518 from the baseplate 510. The bolt 518 is used to secure the lock assembly 515 (for example, the mounting lock 514 and the cable frame 516) to the baseplate 510. The pieces form the assembled unit 502 may be installed on the vehicle 50 without losing any of the pieces during assembly. The installer does not need a separate bolt to securely lock the antenna mount assembly 500 to the vehicle 50 during installation. Rather, all of the components of the antenna mount assembly 500 may be installed onto the vehicle 50 from above as the assembled unit 502.

In an exemplary embodiment, the antenna mount assembly 500 is used to hold one or more antenna cables 18. For example, the cable frame 516 of the lock assembly 515 may hold the antenna cables 18. Optionally, a plurality of the antenna cables 18 may be held by the cable frame 516. For example, in the illustrated embodiment, the lock assembly 515 holds six of the antenna cables 18. The antenna cables 18 may be spaced apart around the cable frame 516. For example, the antenna cables 18 may be provided on multiple sides of the cable frame 516. The antenna cables 18 are configured to be electrically connected to corresponding antenna elements 12 of the antenna 10 (shown in FIG. 1). The antenna mount assembly 500 is used to route the cables through the rooftop 52 of the vehicle 50 (shown in FIG. 1) from the antenna 10 at the exterior of the vehicle to other components at the interior of the vehicle 50, such as the radio, the GPS, the navigation system, or other components of the vehicle 50.

The baseplate 510 is shown as a square; however, the baseplate 510 may have other shapes in alternative embodiments. The baseplate 510 is configured to be coupled to the antenna 10 (shown in FIG. 1) and is used to mount the antenna 10 to the vehicle 50 (shown in FIG. 1). The baseplate 510 may be used to support the antenna circuit board 14 and/or the cover 16 of the antenna 10. In various embodiments, the baseplate 510 has a complementary shape as the antenna circuit board 14 and/or the cover 16. For example, the baseplate 510 may form a receptacle or chamber that receives the antenna circuit board 14. The baseplate 510 may have walls forming the chamber that receives the antenna circuit board 14. The cover 16 may be coupled to the walls of the baseplate 510.

The vehicle mounting bracket 512 is coupled to the baseplate 510. The vehicle mounting bracket 512 is used to couple the antenna mount assembly 500 to the rooftop 52 of the vehicle 50. For example, during initial installation, the antenna mount assembly 500 is loaded through the opening 54 in the rooftop 52 and the vehicle mounting bracket 512 is configured to be snap coupled to the rooftop 52 to initially hold the antenna mount assembly 500 in place at the opening 54 of the rooftop 52. In a latched position, the latches of the vehicle mounting bracket 512 are latchably coupled to the rooftop 52 to generally hold the position of the antenna mount assembly 500 on the rooftop 52 until the antenna mount assembly 500 can be tightened and locked into position on the vehicle 50. The vehicle mounting bracket 512 holds the general orientation and position of the baseplate 510 on the rooftop 52 of the vehicle 50 during assembly. The latches of the vehicle mounting bracket 512 may be unlatched (backed-off) of the rooftop 52 as the antenna mount assembly 500 is tightened and secured using the mounting lock 514.

In an exemplary embodiment, the cable frame 516 is integral with the mounting lock 514. The bolt 518 is coupled to the mounting lock 514. The bolt 518 extends through the antenna mount assembly 500 from the top of the antenna mount assembly 500 to the bottom of the antenna mount assembly 500. The bolt 518 is coupled to the baseplate 510 to secure the lock assembly 515 to the baseplate 510.

In an exemplary embodiment, the lock assembly 515 is located below the baseplate 510. For example, the cable frame 516 and the mounting lock 514 of the lock assembly 515 are located below the baseplate 510. The bolt 518 also extends below the baseplate 510. The lock assembly 515 and a portion of the bolt 518 are configured to be lowered through the opening 54 in the rooftop 52 to the interior of the vehicle 50.

During installation, the lock assembly 515 may be rotated relative to the baseplate 510 to a locked position. For example, the cable frame 516 and the mounting lock 514 may be rotated relative to the baseplate 510 to a locked position. In the locked position, the mounting lock 514 engages the bottom side of the rooftop 52 to lock the antenna mount assembly 500 to the rooftop 52. In an exemplary embodiment, the mounting lock 514 is rotated to the locked position by tightening the bolt 518. In the illustrated embodiment, the bolt 518 is accessible from the bottom of the antenna mount assembly 500 and is thus accessible at the interior of the vehicle 50 during installation. The bolt 518 is tightened by rotating the bolt 518. As the bolt 518 is tightened, the lock assembly 515 is advanced toward the rooftop 52 and rotated to the locked position. The lock assembly 515 is configured to be securely couple to the rooftop 52 in the locked position.

In an exemplary embodiment, the lock assembly 515 is electrically conductive. For example, the lock assembly 515 is manufactured from a metal material. Optionally, the lock assembly 515 may be a diecast component. In an exemplary embodiment, the bolt 518 is electrically conductive. For example, the bolt 518 is manufactured from a metal material. In an exemplary embodiment, the baseplate 510 is electrically conductive. For example, the baseplate 510 may be manufactured from a metal material. Optionally, the baseplate 510 may be a stamped and formed part. When installed, the antenna mount assembly 500 is electrically grounded to the rooftop 52 of the vehicle 50. The lock assembly 515 engages and is electrically connected to the rooftop 52. The bolt 518 engages and is electrically connected to the lock assembly 515, such as to the mounting lock 514. The bolt 518 extends through the antenna mount assembly 500 and is coupled to the baseplate 510. The baseplate 510 is electrically grounded to the rooftop 52 through the bolt 518 and through the lock assembly 515. In an exemplary embodiment, the baseplate 510 forms a ground plane for the antenna 10. For example, the baseplate 510 may be electrically connected to the antenna circuit board 14 and/or the antenna elements 12.

In an exemplary embodiment, the vehicle mounting bracket 512 is separate and discrete from the lock assembly 515 and is coupled to the lock assembly 515. The vehicle mounting bracket 512 may be a molded part, such as an injection molded part. In an exemplary embodiment, the vehicle mounting bracket 512 may be manufactured from a different material than the material of the lock assembly 515. For example, the vehicle mounting bracket 512 may be manufactured from a plastic material. The vehicle mounting bracket 512 is configured to be deformed, such as deflecting the latches, during latching and unlatching.

In an exemplary embodiment, the vehicle mounting bracket 512 includes a base mount 540 and a rooftop latch 552 extending from the base mount 540. In various embodiments, multiple vehicle mounting brackets 512 may be provided, such as on opposite sides of the lock assembly 515. In other various embodiments, a single vehicle mounting bracket 512 is provided, which may include multiple rooftop latches 552. The rooftop latches 552 are configured to be latchably coupled to the rooftop 52. For example, during installation, as the antenna mount assembly 500 is lowered through the opening 54 and the rooftop 52, the rooftop latches 552 extend through the opening 54 in the rooftop 52 to engage the interior surface 56 of the rooftop 52.

Each rooftop latch 552 includes a latch arm 554 having a latch surface 556 configured to engage the rooftop 52. When latched, the antenna mount assembly 500 is loosely coupled to the rooftop 52. The antenna mount assembly 500 is secured from incidental falling off for removal from the rooftop 52 while installation is completed and the antenna mount assembly 500 is locked onto the rooftop 52 (for example, using the lock assembly 515. The latch arms 554 are deflectable. In an exemplary embodiment, the latch arms 554 may be deflected inward by a predetermined force. However, the latch arms 554 resist outward deflection and require a much higher force to deflect outward, such as greater than three times the inward deflection force, or more. As such the vehicle mounting bracket 512 may be easily pressed through the opening in the rooftop 52 to clip onto the rooftop 52 to the latched position. However, the amount of force needed to press the antenna mount assembly 500 back through the opening in the rooftop 52 is a much higher force.

Figure 30:
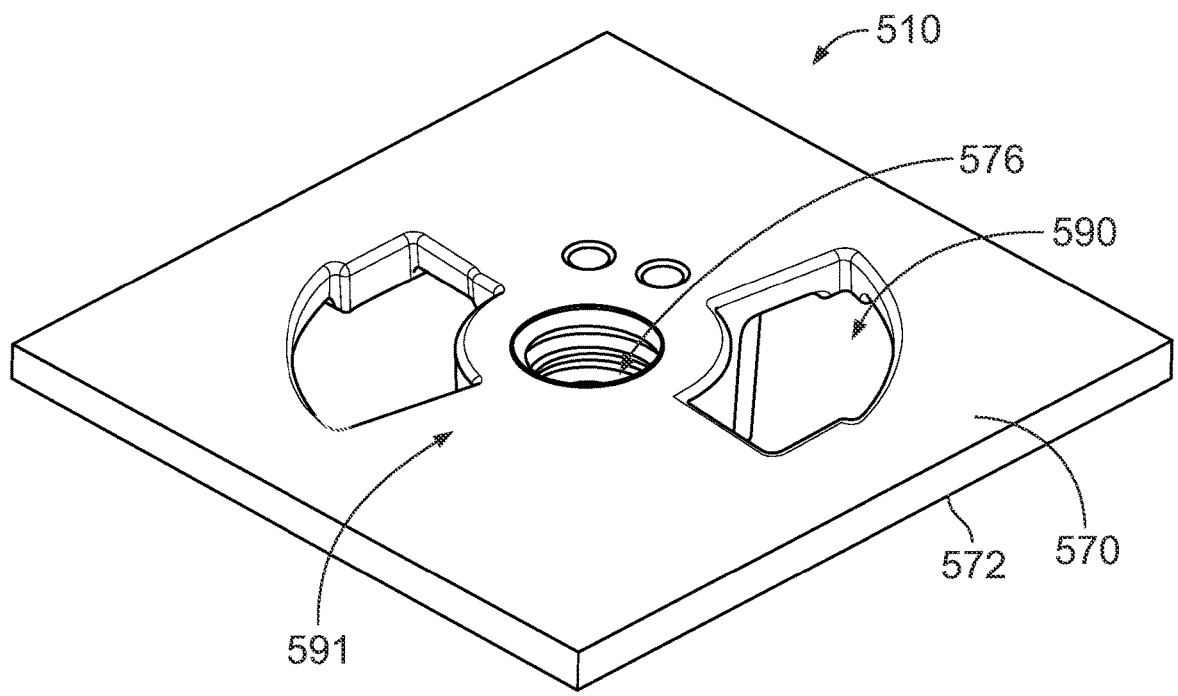
FIG. 30 is a top perspective view of the baseplate in accordance with an exemplary embodiment.
Figure 31:
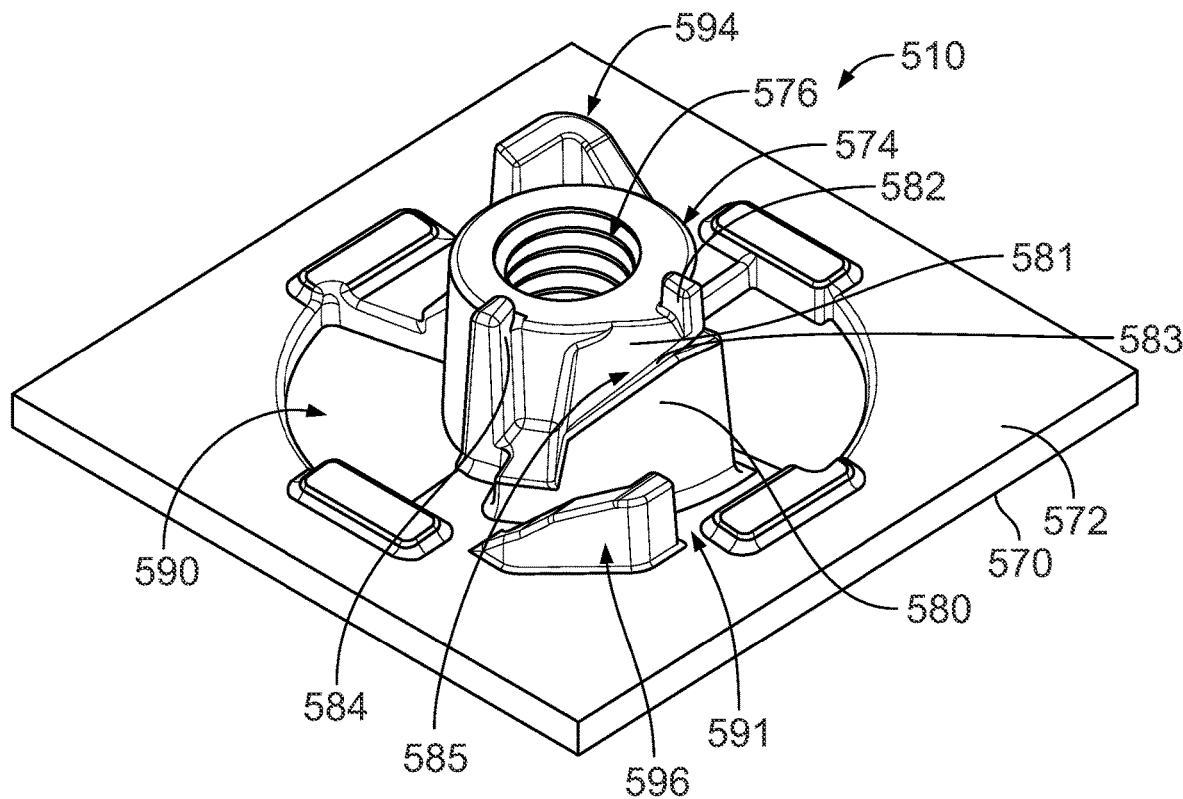
FIG. 31 is a bottom perspective view of the baseplate in accordance with an exemplary embodiment.

FIG. 30 is a top perspective view of the baseplate 510 in accordance with an exemplary embodiment. FIG. 31 is a bottom perspective view of the baseplate 510 in accordance with an exemplary embodiment. In an exemplary embodiment, the baseplate 510 is manufactured from a conductive material, such as a metal material. The baseplate 510 may be stamped and formed from a blank or sheet of metal material. Alternatively, the baseplate 510 may be diecast or manufactured as a plated plastic structure.

The baseplate 510 includes an upper surface 570 and a lower surface 572. The lower surface 572 faces the exterior surface 58 of the rooftop 52 (shown in FIG. 1). In an exemplary embodiment, a seal (not shown) may be provided at the lower surface 572. For example, the seal may be a perimeter seal or a gasket provided between the lower surface 572 and the exterior surface 58.

The baseplate 510 includes a bolt hub 574 configured to receive the bolt 518. In an exemplary embodiment, the bolt hub 574 extends from the lower surface 572. The bolt hub 574 includes a threaded bore 576 extending therethrough. The bolt 518 is configured to be threadably coupled to the bolt hub 574 at the threaded bore 576.

In an exemplary embodiment, the baseplate 510 includes a slider ramp 580. The slider ramp 580 is configured to interface with the lock assembly 515 to position the lock assembly 515 relative to the baseplate 510. In the illustrated embodiment, the slider ramp 580 is provided at the exterior of the bolt hub 574. The slider ramp 580 may be provided at other locations in alternative embodiments. The slider ramp 580 is angled nonparallel to the upper surface 570 and the lower surface 572 of the baseplate 510. For example, the slider ramp 580 may wrap partially helically around the bolt hub 574. In various embodiments, the slider ramp 580 may wrap approximately 65° around the bolt hub 574. In an exemplary embodiment, the slider ramp 580 includes an inner wall portion 581 and an outer wall portion 583 forming a ramp pocket 585. The slider post of the lock assembly 515 is configured to be received in the ramp pocket 585. The inner and outer wall portions 581, 583 guide the slider post in the slider ramp 580. The inner and outer wall portions 581, 583 retain the guide post on the slider ramp 580. The lock assembly 515 is configured to slide along the slider ramp 580 during installation to position the lock assembly 515 relative to the baseplate 510.

In an exemplary embodiment, the baseplate 510 includes a first rotation stop element 582 and a second rotation stop element 584. The slider ramp 580 extends between the first and second rotation stop elements 582, 584. In the illustrated embodiment, the rotation stop elements 582, 584 are vertically extending walls. Other types of stop elements may be used in alternative embodiments. The rotation stop elements 582, 584 provide stop surfaces for the lock assembly 515. For example, the lock assembly 515 is unable to move along the slider ramp 580 past the first rotation stop element 582 or past the second rotation stop element 584. The movement of the lock assembly 515 is contained between the first rotation stop element 582 and the second rotation stop element 584. In an exemplary embodiment, the first and second rotation stop elements 582, 584 are radially offset from each other by between 30° and 60°. For example, the rotation stop elements 582, 584 may be radially offset from each other by approximately 45° in various embodiments. The slider ramp 580 and the rotation stop elements 582, 584 allow rotation movement of the lock assembly 515 by between 30° and 60°. For example, in the illustrated embodiment, the slider ramp 580 and the rotation stop elements 582, 584 may allow rotation of the lock assembly 515 by approximately 45°. In an exemplary embodiment, the first and second rotation stop elements 582, 584 may be vertically offset from each other. The slider ramp 580 may be angled between the rotation stop elements 582, 584 to allow vertical movement in addition to rotational movement of the lock assembly 515. In various embodiments, the first rotation stop element 582 and/or the second rotation stop element 584 may extend beyond the end of the bolt hub 574.

The baseplate 510 includes cable slots 590 extending therethrough. The cable slots 590 are configured to receive corresponding antenna cables 18 and allow the antenna cables 18 to pass through the baseplate 510. In the illustrated embodiment, the cable slots 590 are separated by separating walls 591. In an exemplary embodiment, the cable slots 590 are elongated to allow the antenna cables 18 to move within the cable slots 590. For example, the antenna cables 18 may be rotated with the cable frame 516 within the cable slots 590. In the illustrated embodiment, the cable slots 590 follow arcuate paths. The cable slots 590 may have other shapes in alternative embodiments. In the illustrated embodiment, three cable slots 590 are provided. Greater or fewer cable slots 590 may be provided in alternative embodiments. Optionally, each cable slot 590 may receive multiple antenna cables 18. For example, each cable slot 590 may receive a pair of the antenna cables 18.

In an exemplary embodiment, the baseplate 510 includes a first rooftop locating feature 594 and a second rooftop locating feature 596. The rooftop locating features 594, 596 are used to locate the baseplate 510 relative to the rooftop 52. In various embodiments, the rooftop locating features 594, 596 include walls, tabs, posts or other types of projections having surfaces used to interface with the rooftop 52. The rooftop locating features 594, 596 extend from the lower surface 572 of the baseplate 510. In an exemplary embodiment, the rooftop locating features 594, 596 have different shapes. For example, the first rooftop locating feature 594 includes two walls oriented perpendicular to each other, whereas the second rooftop locating feature 596 includes three walls with a main wall extending at an angle, such as at a 45° angle, relative to the pair of the end walls. In various embodiments, the rooftop locating feature 596 is taller at one end and shorter at the opposite end. The edge of the rooftop locating feature 596 may be angled similar to the angle of the slider ramp 580. The walls of the rooftop locating features 594, 596 fit in the opening 54 in the rooftop 52 to orient the baseplate 510 relative to the rooftop 52. The rooftop locating features 594, 596 may fit in the corners of the opening 54. Other types of locating features may be used in alternative embodiments, such as a rib, a rail, a post, an opening, a channel, a slot, and the like.

Figure 32:
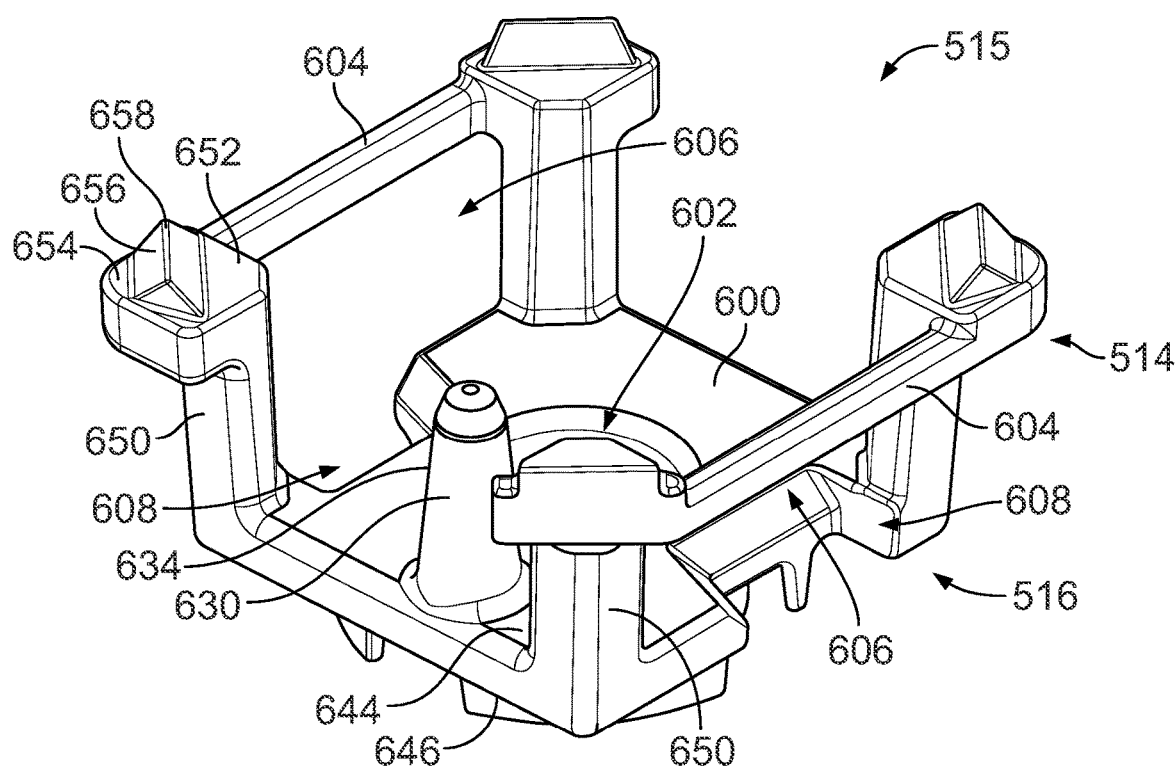
FIG. 32 is a top perspective view of the lock assembly in accordance with an exemplary embodiment.
Figure 33:
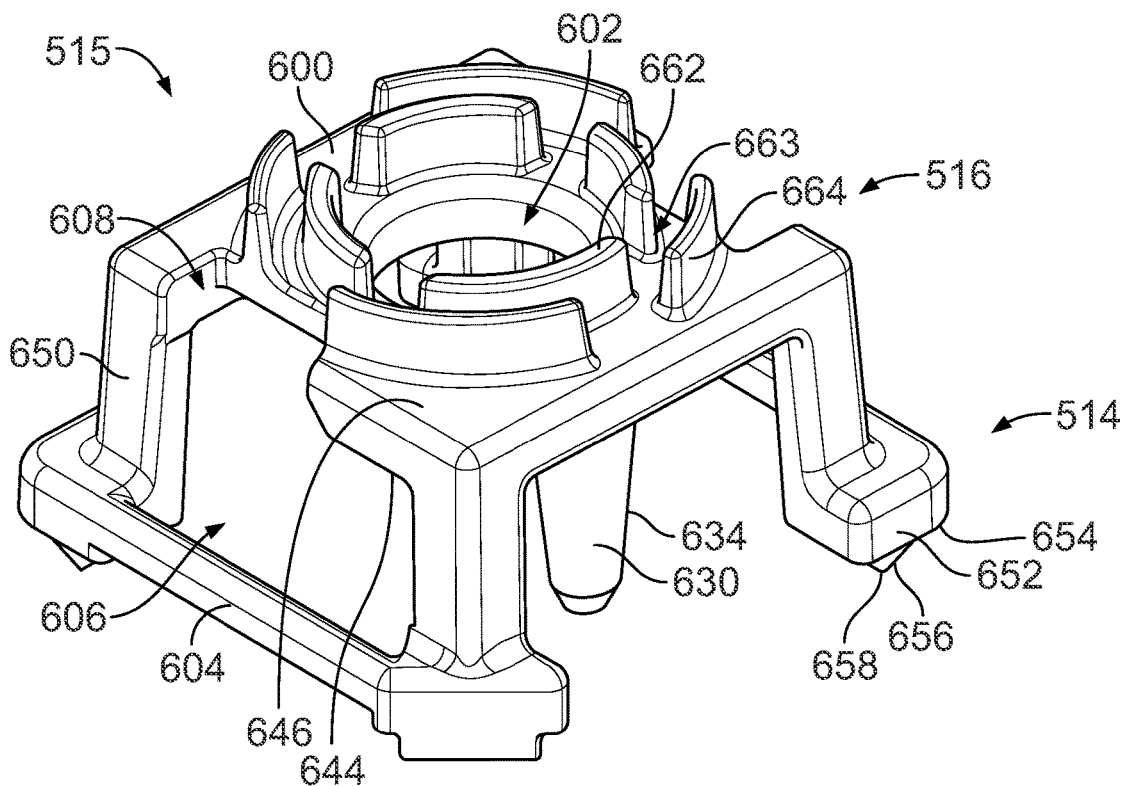
FIG. 33 is a bottom perspective view of the lock assembly in accordance with an exemplary embodiment.

FIG. 32 is a top perspective view of the lock assembly 515 in accordance with an exemplary embodiment. FIG. 33 is a bottom perspective view of the lock assembly 515 in accordance with an exemplary embodiment. The lock assembly 515 includes the mounting lock 514 and the cable frame 516. In an exemplary embodiment, the mounting lock 514 and the cable frame 516 are integrated into a unitary structure.

The lock assembly 515 includes a base 600 having an opening 602 therethrough configured to receive the bolt 518 (shown in FIG. 28). The opening 602 is provided at the interior of the lock assembly 515, such as approximately centered within the lock assembly 515. Optionally, the base 600 may be generally planar having an upper surface 644 and a lower surface 646. In the illustrated embodiment, the base 600 is generally rectangular, such as being square. The base 600 is sized and shaped to fit through the opening 54 in the rooftop 52 of the vehicle 50.

The cable frame 516 of the lock assembly 515 includes cable supports 604 for supporting the antenna cables 18. In the illustrated embodiment, the cable supports 604 extend between corresponding mounting legs 650. A cable window 606 is defined between the base 600 and the corresponding cable support 604 between the mounting legs 650. The antenna cables 18 are configured to pass through the cable window 606. The general positions of the antenna cables 18 are held by the cable supports 604. The cable supports 604 are provided at multiple sides of the base 600. For example, in the illustrated embodiment, the cable frame 516 includes cable supports 604 at two sides of the cable frame 516. The cable frame 516 may include cable openings 608 in the base 600 configured to receive corresponding antenna cables 18.

In an exemplary embodiment, the lock assembly 515 includes a slider post 630 extending from the base 600. The slider post 630 extends from the upper surface 644 of the base 600. The slider post 630 is configured to interface with the baseplate 510 (shown in FIG. 30) to position the lock assembly 515 relative to the baseplate 510. In an exemplary embodiment, the slider post 630 is configured to interface with the slider ramp 580 (shown in FIG. 31) of the baseplate 510. The slider post 630 is movable along the slider ramp 580 to position the cable frame 516 relative to the baseplate 510. The slider post 630 is configured to slide along the slider ramp 580, which causes the lock assembly 515 to rotate during assembly of the antenna mount assembly 500. Other types of locating features may be used in alternative embodiments to locate the lock assembly 515 relative to the baseplate 510.

In an exemplary embodiment, the lock assembly 515 includes one or more stop features 634 used to position the lock assembly 515 relative to the baseplate 510. Optionally, a side edge of the slider post 630 may define one of the stop features 634. The stop features 634 engage the stop features of the baseplate 510 to limit movement of the lock assembly 515 relative to the baseplate 510. For example, the stop features 634 may limit vertical movement and/or horizontal movement and/or rotating movement of the lock assembly 515 relative to the baseplate 510.

The mounting lock 514 of the lock assembly 515 includes a plurality of the mounting legs 650 extending from the base 600. In an exemplary embodiment, the mounting legs 650 are integral with the base 600. For example, the mounting legs 650 are diecast with the base 600. In the illustrated embodiment, the mounting legs 650 extend upward from the upper surface 644. Optionally, the mounting legs 650 may be solid legs for rigidity and strength for mating with the rooftop 52 of the vehicle 50. The mounting legs 650 are provided in the four corners of the base 600 in the illustrated embodiment. However, other locations are possible in alternative embodiments. Greater or fewer than four mounting legs 650 may be used in alternative embodiments. Each mounting leg 650 includes a foot 652 at the distal end 654 thereof. The foot 652 has a greater cross-sectional area than the mounting leg 650. The foot 652 has an upward facing engagement feature configured to engage the interior surface 56 of the rooftop 52 when the antenna mount assembly 500 is installed in the vehicle 50. In an exemplary embodiment, the engagement feature is a peaked rib 656 at the distal end 654 of the mounting leg 650. The peaked rib 656 has an edge 658 configured to interface with the rooftop 52. The edge 358 may scour the metal surface of the rooftop 52 during assembly to wipe against the interior surface 56 and create a metal-to-metal interface between the mounting lock 514 and the rooftop 52. Optionally, at least one of the feet 652 may have a different shape, such as for keying and orientation of the lock assembly 515 relative to the baseplate 510 and/or the rooftop 52. For example, the opening 54 in the rooftop 52 may have one or more corners that are shaped differently. The feet 652 are shaped to correspond with the shape of the opening 54 in the rooftop 52.

In an exemplary embodiment, the base 600 includes inner support flanges 662 and outer support flanges 664 radially outward of the inner support flanges 662. The support flanges 662, 664 form support surfaces for the head of the bolt 518. A space 663 is defined between the inner and outer support flanges 662, 664. The space 663 may be ring shaped in various embodiments. The space 663 is configured to receive the vehicle mounting brackets 512, such as the base mount 540. The inner and outer support flanges 662, 664 extend from the lower surface 646 of the base 600. The inner and outer support flanges 662, 664 surround the opening 602. The inner and outer support flanges 662, 664 are configured to interface with the bolt 518 during assembly. For example, the bolt 518 may press against the ends of the inner and outer support flanges 662, 664 as the bolt 518 is tightened. The inner and outer support flanges 662, 664 hold the head 520 of the bolt 518 at a spaced apart location from the base 600. In an exemplary embodiment, the inner and outer support flanges 662, 664 are integral with the base 600. For example, the inner and outer support flanges 662, 664 are diecast with the base 600. The mounting lock 514 is configured to be electrically connected to the bolt 518 through the inner and outer support flanges 662, 664. The outer support flanges 662, 664 may be used to support the installation tool used to install the bolt 518.

Returning to FIGS. 28 and 29, the parts of the antenna mount assembly 500 are assembled together to form the assembled unit 502. The lock assembly 515 forms the lower portion 506. The lower portion 506 is coupled to the baseplate 510 using the bolt 518. The bolt 518 is threadably coupled to the baseplate 510 to hold the lock assembly 515 in place relative to the baseplate 510. The head 520 of the bolt 518 is located below the lock assembly 515 to capture the lock assembly 515 between the head 520 and the baseplate 510. As such, the lower portion 506 of the antenna mount assembly 500 is unable to be inadvertently removed from the upper portion 504 of the antenna mount assembly 500. The assembled unit 502 remains an assembled unit without worry of the various pieces coming apart during installation. Additionally, the installer does not need to hold the various parts together during installation. Rather, the installer may simply use a drill or ratchet tool to tighten the bolt 518 to complete installation to the vehicle 50. As such, the antenna mount assembly 500 may be assembled with one hand by the installer.

When assembled, the antenna cables 18 are held in the cable supports 604. The antenna cables 18 pass through the cable slots 590 in the baseplate 510. In an exemplary embodiment, one or more cable retainers (not shown) may be used to secure the antenna cables 18 to the antenna mount assembly 500. In an exemplary embodiment, the cable retainer may be tape wrapped around the lock assembly 515 to retain the antenna cables 18 in the cable supports 604. Other types of cable retainers may be used in alternative embodiments, such as a zip tie. The cable retainers organize the antenna cables 18 and hold the antenna cables 18 as part of the lower portion 506 for ease of loading the antenna mount assembly 500 (with the antenna cables 18) through the opening 54 in the rooftop 52. In an exemplary embodiment, the cable retainers may be coupled to the lock assembly 515 after the antenna mount assembly 500 is assembled, such as at a final stage of assembly.

When assembled, the feet 652 of the mounting legs 650 of the lock assembly 515 face the bottom side of the baseplate 510. The engagement surfaces 656 are spaced apart from the lower surface 572 of the baseplate 510. The gap or space between the peaked ribs 656 and the lower surface 572 is wide enough to receive the rooftop 52 of the vehicle 50. The bolt 518 is long enough to accommodate rooftops of different thicknesses. After the antenna mount assembly 500 is loaded onto the rooftop 52 and in the latched position (rooftop latches 552 coupled to the lower surface 572), the bolt 518 is tightened to close the gap and force the lock assembly 515 to a locked position to secure the antenna mount assembly 500 to the rooftop 52 of the vehicle 50. The feet 652 are pressed into engagement with the baseplate 510 in the locked position. In an exemplary embodiment, the lock assembly 515 is rotated, while moved upward, to move the mounting legs 650 from clearance positions to engagement positions.

Figure 34:
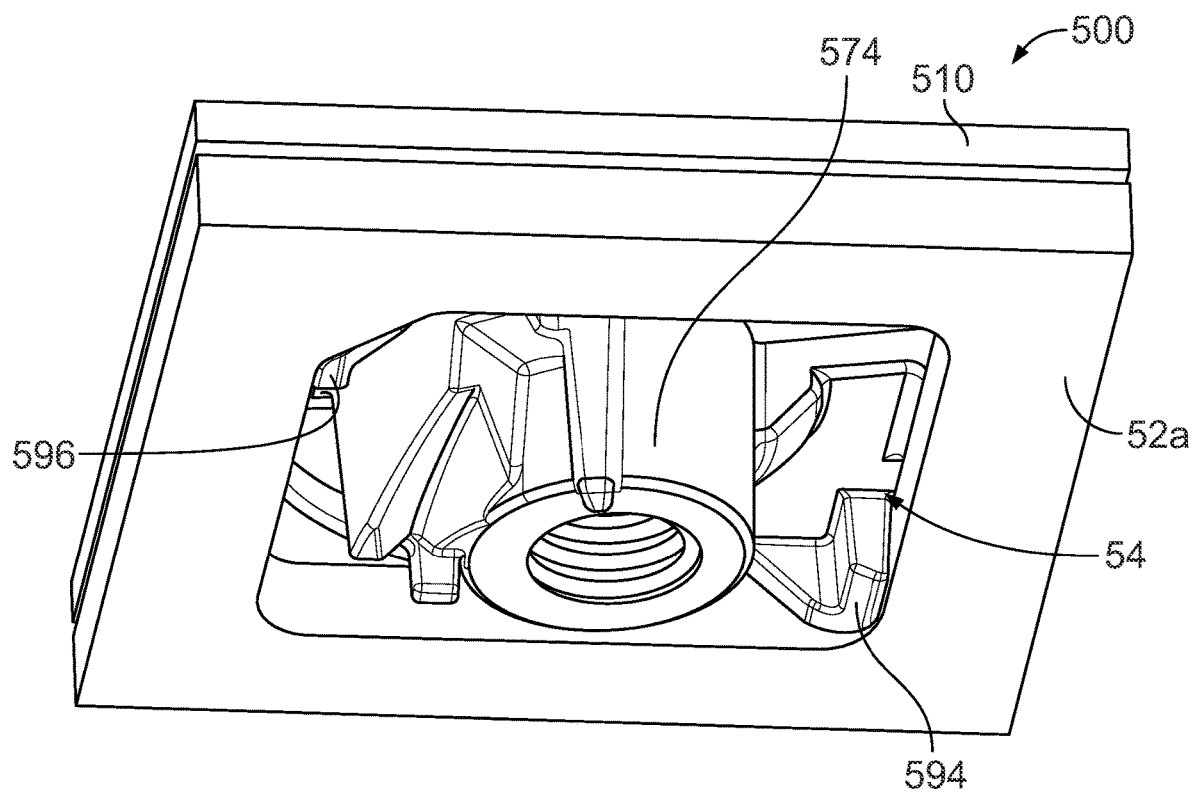
FIG. 34 is a bottom perspective view of a portion of the antenna mount assembly showing the baseplate coupled to a thick rooftop (as compared to the thin rooftop shown in FIG. 35) of the vehicle in accordance with an exemplary embodiment.
Figure 35:
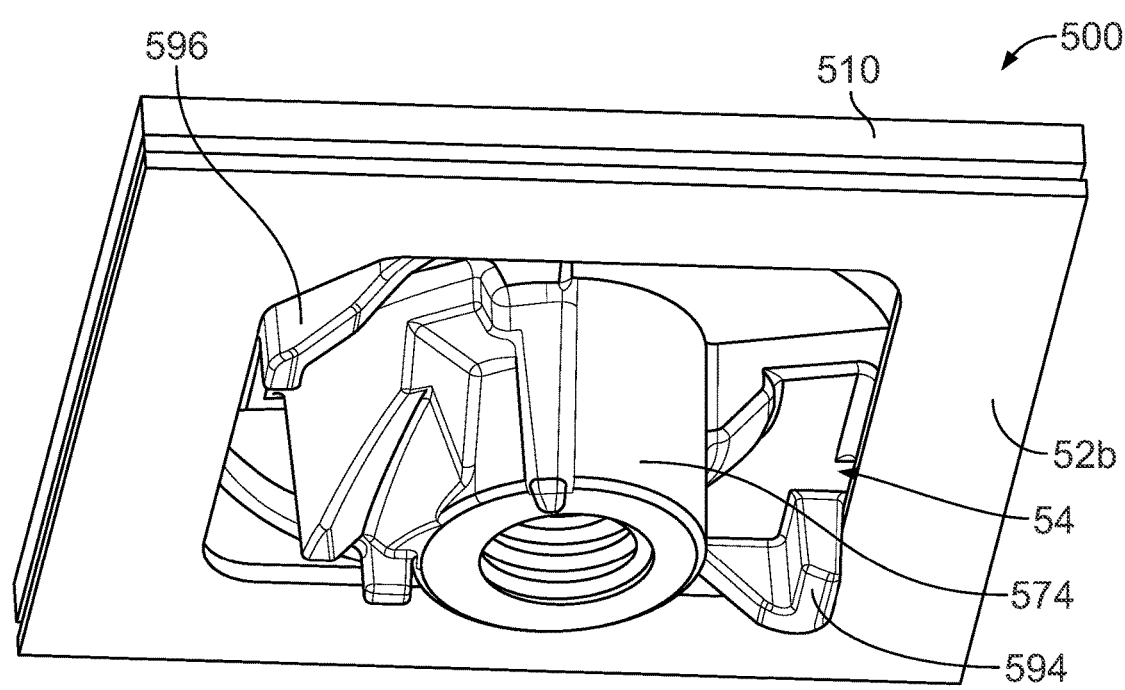
FIG. 35 is a bottom perspective view of a portion of the antenna mount assembly showing the baseplate coupled to a thin rooftop (as compared to the thick rooftop shown in FIG. 34) of the vehicle in accordance with an exemplary embodiment.

FIG. 34 is a bottom perspective view of a portion of the antenna mount assembly 500 showing the baseplate 510 coupled to a thick rooftop 52a (as compared to the thin rooftop 52b shown in FIG. 35) of the vehicle 50. FIG. 35 is a bottom perspective view of a portion of the antenna mount assembly 500 showing the baseplate 510 coupled to a thin rooftop 52*b* (as compared to the thick rooftop 52*a* shown in FIG. 34) of the vehicle 50. The bolt hub 574 extends through the opening 54 in the rooftop 52*a*, 52*b*. The rooftop locating features 594, 596 fit into the corners of the opening 54. The rooftop locating features 594, 596 position the baseplate 510 relative to the rooftop 52*a*, 52*b*. The rooftop locating features 594, 596 block rotation of the baseplate 510 relative to the rooftop 52*a*, 52*b*.

Figures 36, 37:
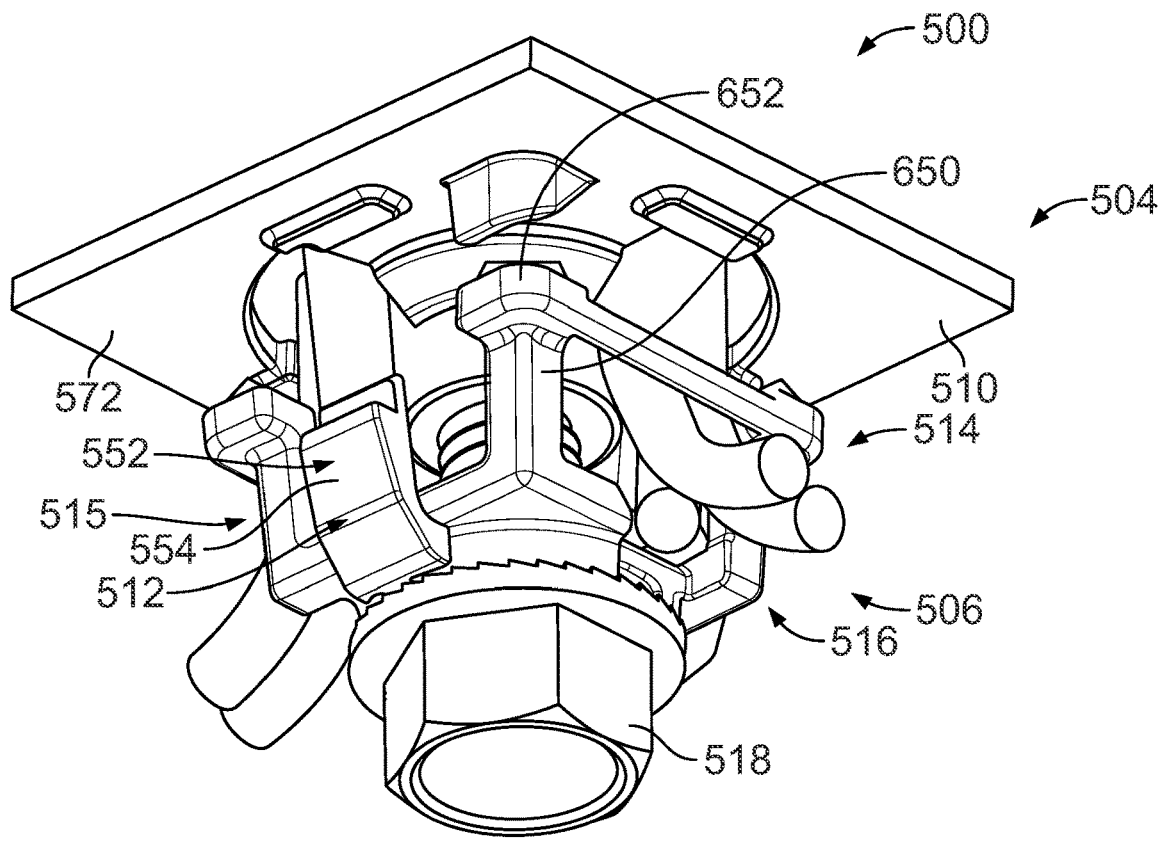
FIG. 36 is a bottom view of the antenna mount assembly in accordance with an exemplary embodiment showing the antenna mount assembly in a loading position.
FIG. 37 is a bottom view of the antenna mount assembly in accordance with an exemplary embodiment showing the antenna mount assembly in a locked position.

FIG. 36 is a bottom view of the antenna mount assembly 500 in accordance with an exemplary embodiment showing the antenna mount assembly 500 in a loading position. FIG. 37 is a bottom view of the antenna mount assembly 500 in accordance with an exemplary embodiment showing the antenna mount assembly 500 in a locked position. The lock assembly 515 is rotatable relative to the baseplate 510 from the loading position to the locked position, such as by tightening the bolt 518. In the loading position, the lock assembly 515 is aligned relative to the baseplate 510 for loading through the opening 54 in the rooftop 52 (for example, the mounting legs 650 are oriented to pass through the opening 54). In the locked position, the lock assembly 515 is rotated to move the mounting legs 650 to interface with and engage the rooftop 52.

In the latched position (FIG. 36), the vehicle mounting bracket(s) 512 are configured to be latchably coupled to the rooftop 52. The rooftop latches 552 are configured to be coupled to the interior surface 56 of the rooftop 52. During installation, the lower portion 506 of the antenna mount assembly 500 is configured to be loaded through the opening 54 in the rooftop 52 from above. The antenna mount assembly 500 is loaded until the lower surface 572 of the baseplate 510 bottoms out against the exterior surface 58 of the rooftop 52. A seal (not shown) may be positioned between the lower surface 572 and the exterior surface 58 defining a sealed interface between the antenna mount assembly 500 and the rooftop 52. The rooftop latches 552 are loaded through the opening 54 in the rooftop 52. The latch arms 554 are clipped onto (for example, snappably coupled to) the rooftop 52. In an exemplary embodiment, the rooftop latches 552 are deflected inward when passing through the opening 54 and then snap outward after passing through the opening 54 to interface with the rooftop 52. The rooftop latches 552 resist uncoupling of the antenna mount assembly 500 from the rooftop 52. For example, the rooftop latches 552 block pass-through of the vehicle mounting bracket(s) 512 back through the opening 54. The vehicle mounting bracket(s) 512 may resist rotation of the antenna mount assembly 500 relative to the rooftop 52 when the rooftop latches 552 are coupled to the rooftop 52.

The lock assembly 515 is sized and shaped to fit through the opening 54 in the rooftop 52. For example, the cable frame 516 and the mounting lock 514 are sized and shaped to fit through the opening 54 in the rooftop 52. For example, the mounting legs 650 may be aligned with the corners 60 to pass through the opening 54. The lock assembly 515 is in a clearance position to pass through the opening 54. The lower portion 506 is able to drop through the opening 54 in the clearance position. Optionally, one of the corners 60 may have a chamfer or other keying feature for keyed mating of the antenna mount assembly 500 with the rooftop 52. The antenna mount assembly 500 can only be loaded through the opening 54 in a particular orientation. For example, the mounting leg 650 with the truncated foot 652*a* must be aligned with the chamfered corner for clearance and loading through the opening 54. Additionally, the vehicle mounting bracket 512 is only able to couple with the rooftop 52 in a single orientation. As such, the orientation of the baseplate 510 relative to the rooftop 52 is controlled by the keyed mating of the vehicle mounting bracket 512 with the rooftop 52. Other types of keying features may be used in alternative embodiments to orient the antenna mount assembly 500 with the rooftop 52. In other embodiments, the antenna mount assembly may be coupled to the rooftop 52 without keyed mating features.

In an exemplary embodiment, the lower portion 506 is oriented relative to the upper portion 504 using locating features, such as the slider post 630, the slider ramp 580, the rotation stop elements 582, 584, and the like. In the illustrated embodiment, in the clearance position (prior to torquing or tightening the bolt 518), the slider post 630 is at the top of the slider ramp 580. The slider post 630 engages the first rotation stop element 582 to locate the lock assembly 515 relative to the baseplate 510. The first rotation stop element 582 prevents rotation of the lock assembly 515 in one direction. As the bolt 518 is tightened, the slider post 630 is only able to slide along the slider ramp 580 in one direction away from the first rotation stop element 582. The lock assembly 515 is configured to be moved toward the rooftop 52, in a rotating direction, as the slider post 630 slides along the slider ramp 580. The lock assembly 515 is moved toward the rooftop 52 to close the gap between the mounting legs 650 and the rooftop 52. As the lock assembly 515 is rotated, the mounting legs 650 move from the clearance positions (aligned with the corners 60) to engagement positions (offset from the corners 60) The mounting legs 650 are aligned with the interior surface 56 of the rooftop 52 to engage the rooftop 52.

Figure 38:
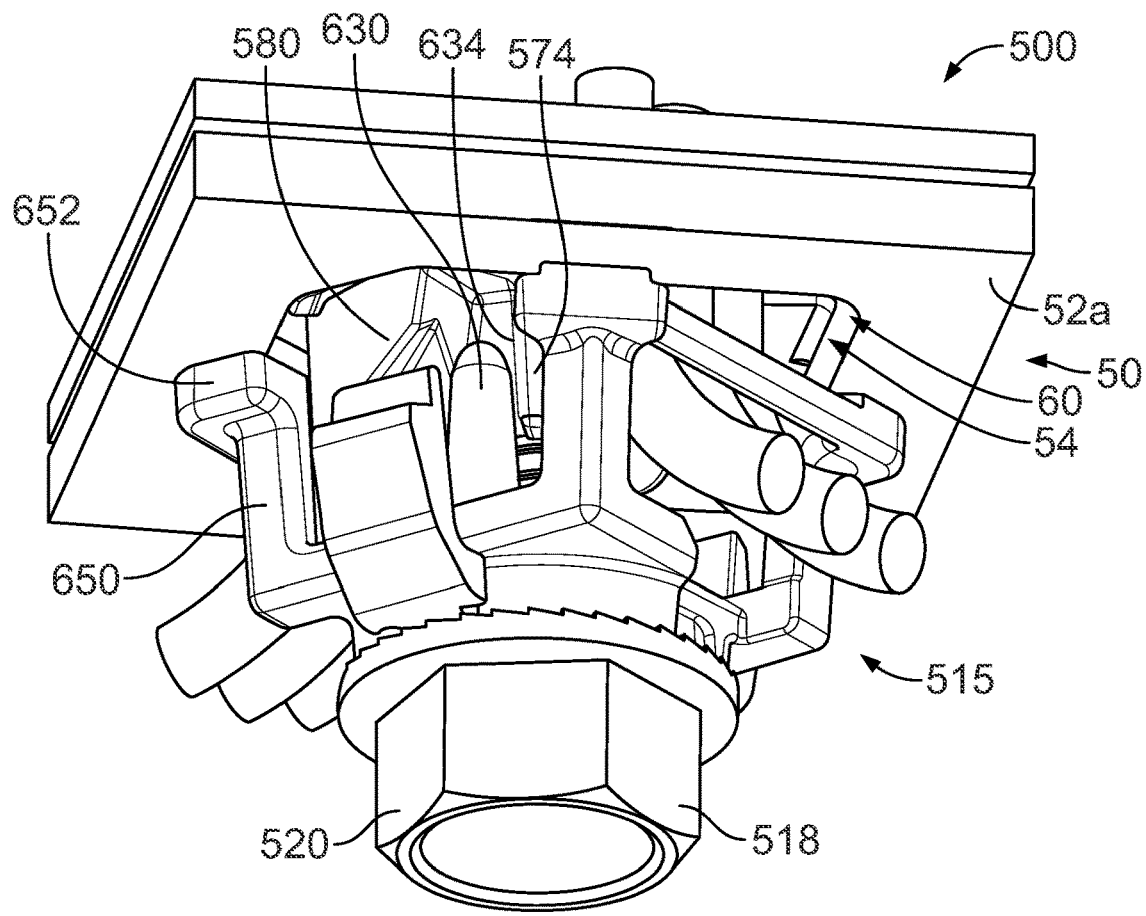
FIG. 38 is a bottom perspective view of the antenna mount assembly installed on the thick rooftop of the vehicle in the locked position in accordance with an exemplary embodiment.
Figure 39:
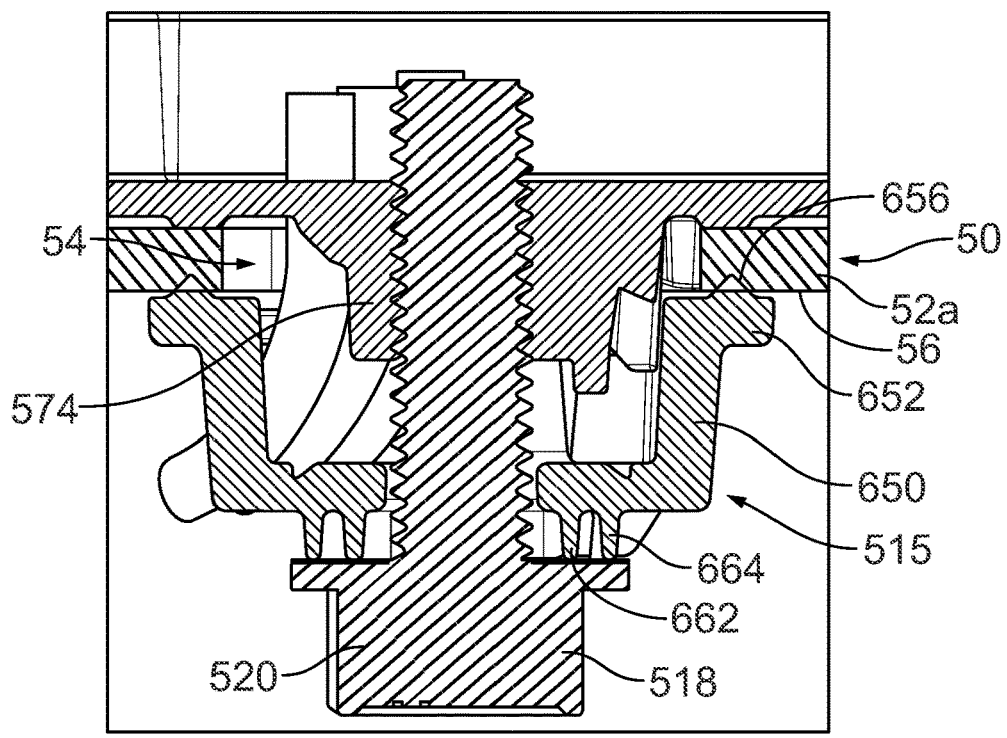
FIG. 39 is a cross sectional view of the antenna mount assembly installed on the thick rooftop of the vehicle in the locked position in accordance with an exemplary embodiment.
Figure 40:
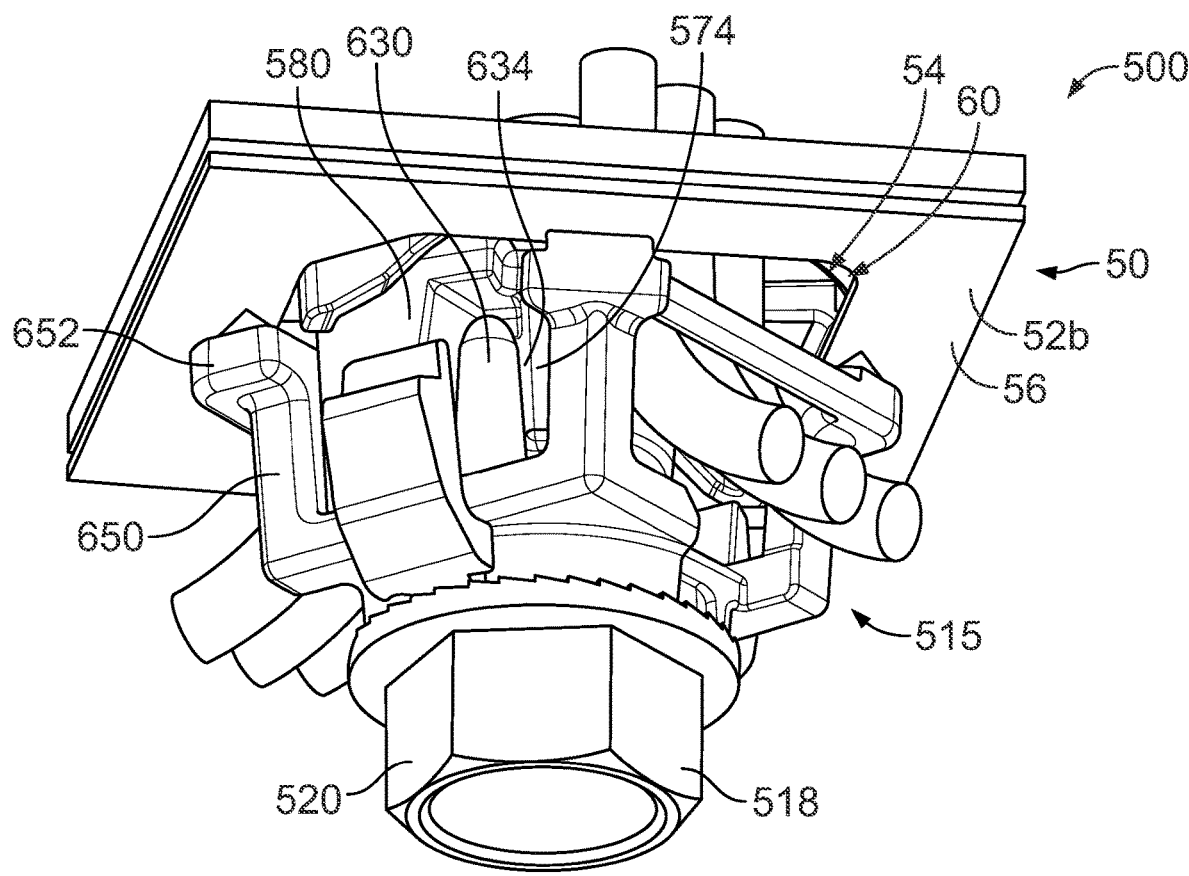
FIG. 40 is a bottom perspective view of the antenna mount assembly installed on the thin rooftop of the vehicle in the locked position in accordance with an exemplary embodiment.
Figure 41:
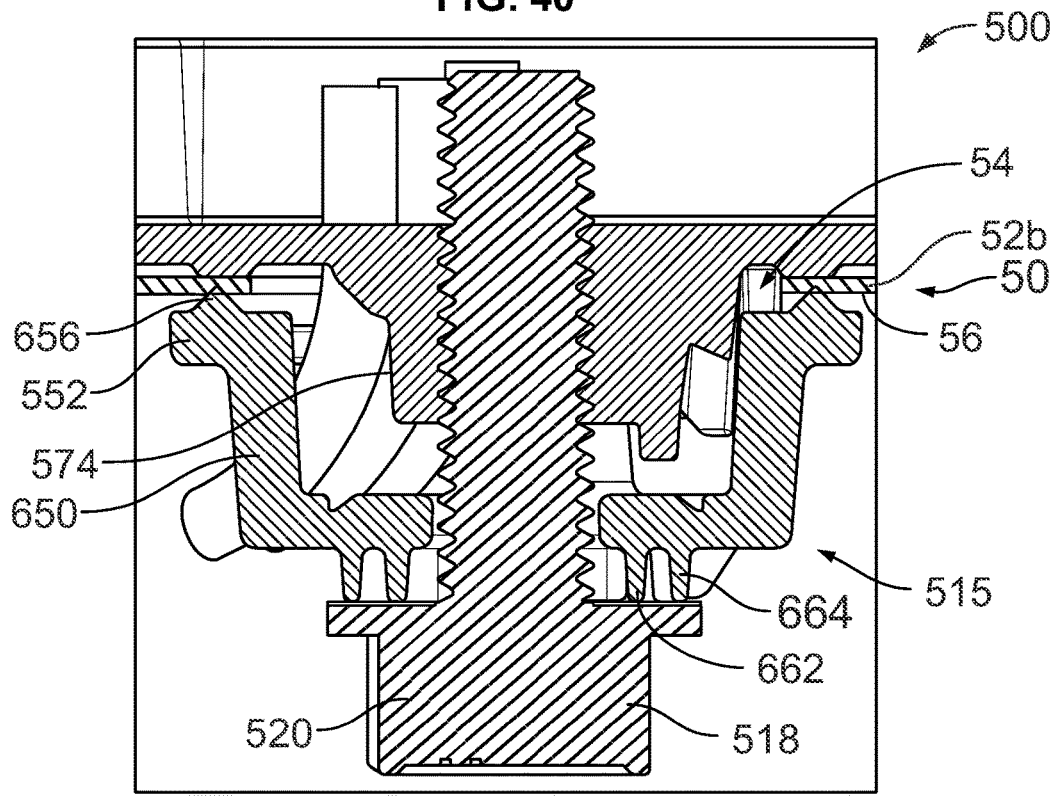
FIG. 41 is a cross sectional view of the antenna mount assembly installed on the thin rooftop of the vehicle in the locked position in accordance with an exemplary embodiment.

FIG. 38 is a bottom perspective view of the antenna mount assembly 500 installed on the thick rooftop 52*a* of the vehicle 50 in the locked position in accordance with an exemplary embodiment. FIG. 39 is a cross sectional view of the antenna mount assembly 500 installed on the thick rooftop 52*a* of the vehicle 50 in the locked position in accordance with an exemplary embodiment. FIG. 40 is a bottom perspective view of the antenna mount assembly 500 installed on the thin rooftop 52*b* of the vehicle 50 in the locked position in accordance with an exemplary embodiment. FIG. 41 is a cross sectional view of the antenna mount assembly 500 installed on the thin rooftop 52*b* of the vehicle 50 in the locked position in accordance with an exemplary embodiment.

During installation, the bolt 518 is tightened to lock the antenna mount assembly 500 to the rooftop 52. As the bolt 518 is tightened, the head 520 is driven into the support flanges 662, 664 of the lock assembly 515. As the lock assembly 515 is driven upward by the bolt 518, the slider post 630 of the lock assembly 515 is driven along the slider ramp 580. The slider post 630 rotates along the slider ramp 580 to rotate the lock assembly 515 and move the mounting legs 650 from the clearance position (FIG. 36) to the engaging position (FIG. 37). The mounting legs 650 are rotated to positions offset from the corners 60, such as along the edges of the opening 54 between the corners 60. In an exemplary embodiment, the lock assembly 515 is rotated approximately 45° to approximately center the feet 652 between the corners 60. The peaked rib 656 at the engagement surfaces of the feet 652 engage the interior surface 56 of the rooftop 52. The peaked rib 656 may wipe along the interior surface 56 to create a metal to metal connection between the lock assembly 515 and the rooftop 52. The slider post 630 slides along the slider ramp 580 to the end. After the slider post 630 clears the end of the slider ramp 580, the lock assembly 515 is configured to be driven upward without rotating to drive the mounting legs 650 into the rooftop 52. The stop feature 634 may engage a stop wall of the bolt hub 574 to prevent further rotation of the lock assembly 515. The bolt 518 is tightened to lock the mounting legs 650 against the rooftop 52 and prevent movement of the antenna mount assembly 500 relative to the rooftop 52. The shank of the bolt 518 is long enough to accommodate the thick rooftop 52a and the thin rooftop 52b. The bolt 518 is rotated further to bottom out the peaked ribs 656 against the rooftop 52.

Figure 42:
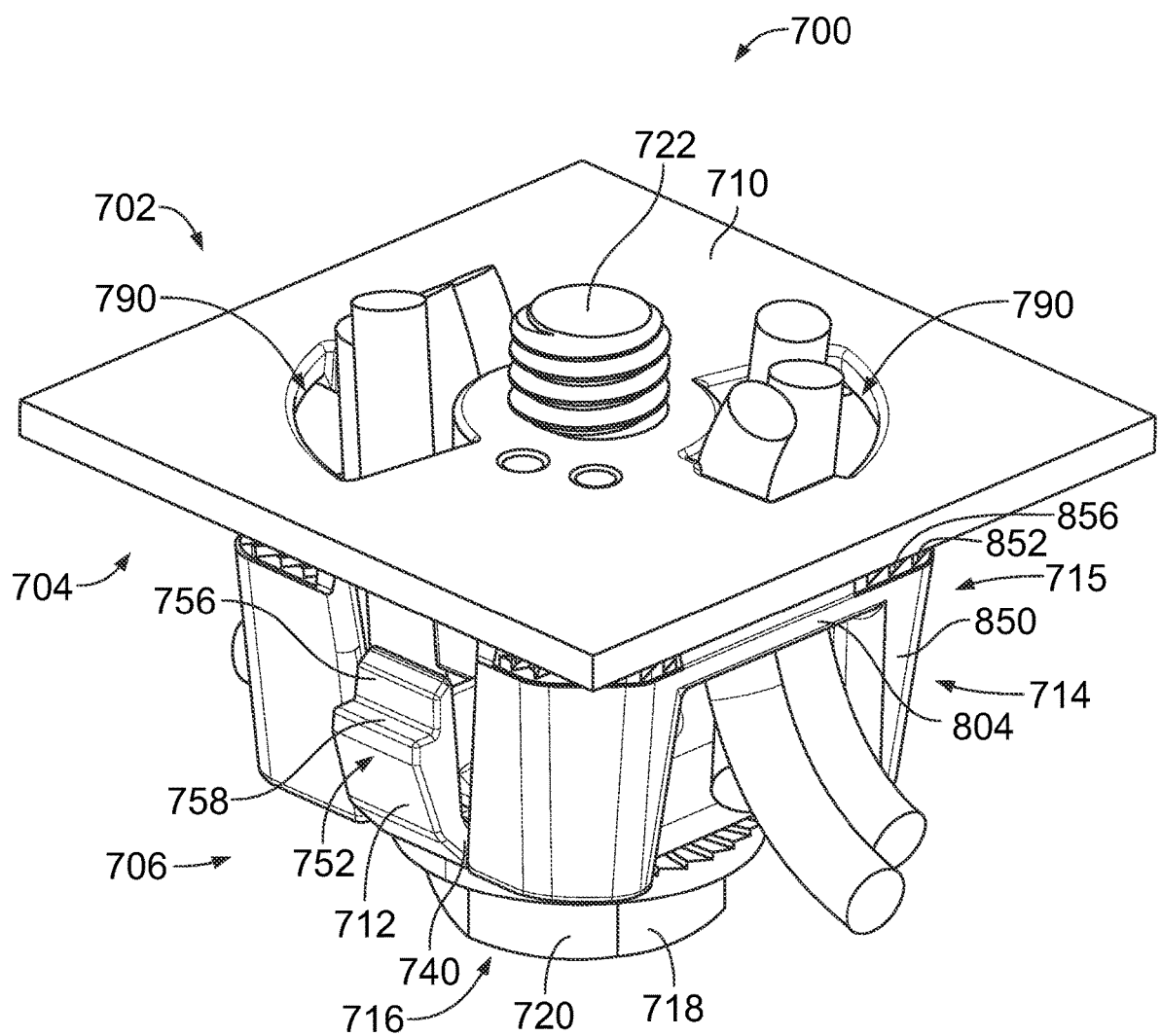
FIG. 42 is a top perspective view of an antenna mount assembly in accordance with an exemplary embodiment.
Figure 43:
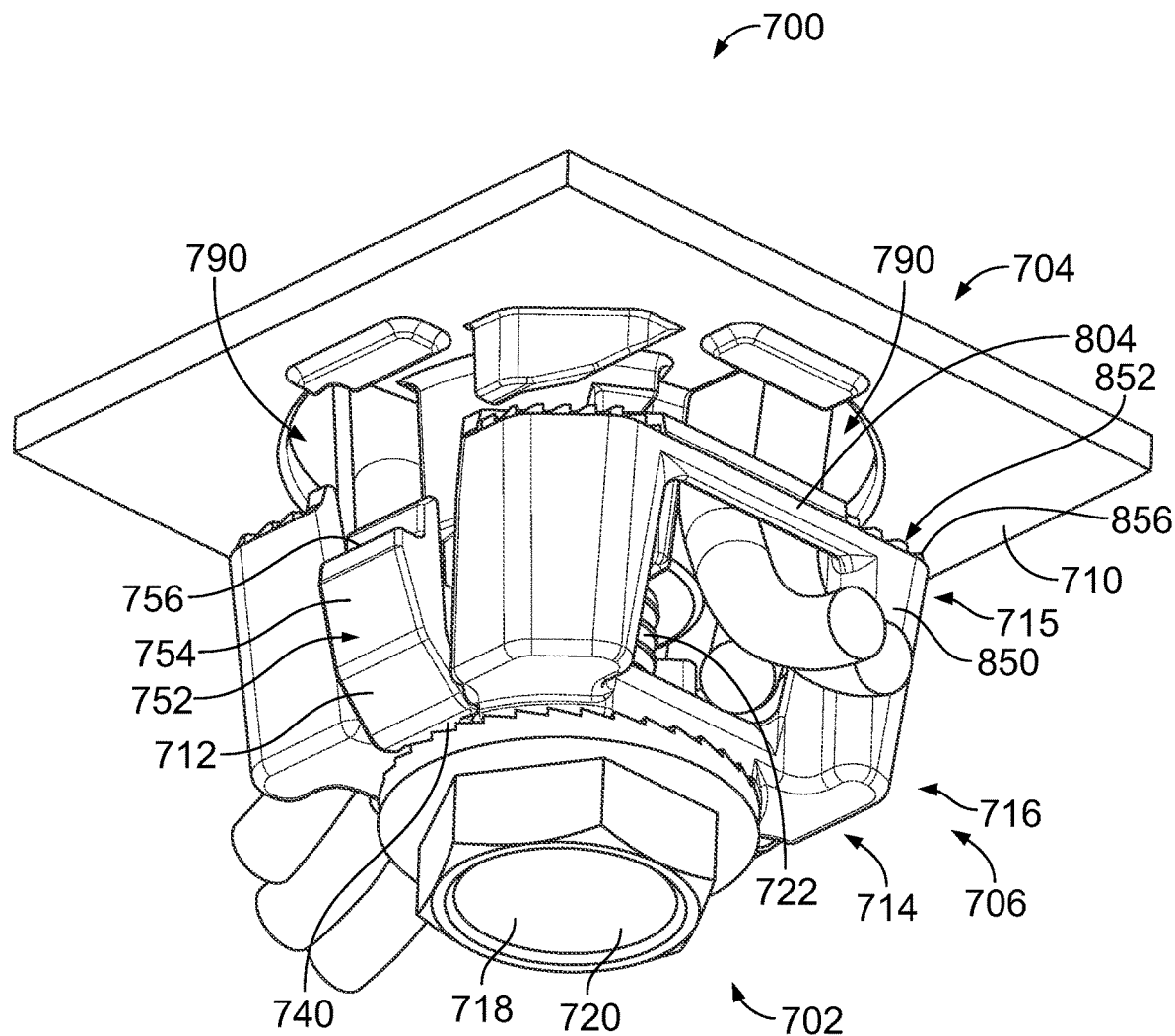
FIG. 43 is a bottom perspective view of the antenna mount assembly in accordance with an exemplary embodiment.

FIG. 42 is a top perspective view of an antenna mount assembly 700 in accordance with an exemplary embodiment. FIG. 43 is a bottom perspective view of the antenna mount assembly 700 in accordance with an exemplary embodiment. The antenna mount assembly 700 is similar to the antenna mount assemblies 100, 300, 500 (shown in FIGS. 2-15, 16-27, and 28-41, respectively) and may be used in place of the antenna mount assemblies 100, 300, 500 in the vehicle 50 (shown in FIG. 1). FIGS. 42 and 43 illustrate the antenna mount assembly 700 as an assembled unit 702 with the individual pieces of the antenna mount assembly 700 loosely held together as the assembled unit 702. For example, the individual pieces of the antenna mount assembly 700 are unable to be separated or fall apart from the assembled unit 702 during the installation process. The individual pieces of the antenna mount assembly 700 are loosely held together by a bolt.

The assembled unit 702 includes an upper portion 704 and a lower portion 706. The lower portion 706 is coupled to the upper portion 704 to form the assembled unit 702. The upper portion 704 is configured to be located along the exterior of the vehicle 50 (shown in FIG. 1) while the lower portion 706 is configured to be located within the interior of the vehicle 50. During installation, the lower portion 706 may be lowered into the interior of the vehicle 50 through the opening 54 (shown in FIG. 1) from the exterior of the vehicle 50.

The antenna mount assembly 700 includes a baseplate 710, a vehicle mounting bracket 712, a lock assembly 715, and a bolt 718. The baseplate 710 forms the upper portion 704 of the assembled unit 702. The lock assembly 715 and the vehicle mounting bracket 712 form the lower portion 706 of the assembled unit 702. The bolt 718 extends through the antenna mount assembly 700 from the top to the bottom and thus forms part of the upper portion 704 and the lower portion 706.

In an exemplary embodiment, the lock assembly 715 includes a mounting lock 714 and a cable frame 716. In the illustrated embodiment, the mounting lock 714 and the cable frame 716 are integrated as a unitary, single piece structure. The mounting lock 714 is used to mount the lock assembly 715 to the rooftop 52 (shown in FIG. 1). The cable frame 716 is used to hold the cables 18. In the illustrated embodiment, the cable frame 716 holds seven cables 18, with three cables 18 grouped together on one side and four cables 18 grouped together on the opposite side. The cable frame 716 may hold greater or fewer cables 18 in alternative embodiments. In an exemplary embodiment, the vehicle mounting bracket 712 is separate and discrete from the lock assembly 715. The vehicle mounting bracket 712 is coupled to the lock assembly 715. The vehicle mounting bracket 712 is used to initially or loosely mount the assembled unit 702 to the rooftop 52 of the vehicle 50. For example, the vehicle mounting bracket 712 may be latchably coupled to the rooftop 52. The lock assembly 715 is used to securely mount the antenna mount assembly 700 to the vehicle 50. For example, the rooftop 52 may be securely captured between the baseplate 710 and the mounting lock 714 of the lock assembly 715.

In an exemplary embodiment, the bolt 718 is a threaded fastener. The bolt 718 includes a head 720 and a threaded shank 722 extending from the head 720. In an exemplary embodiment, the bolt 718 is threadably coupled directly to the baseplate 710. However, in alternatively embodiments, the bolt 718 may include a retainer (not shown), such as a nut, to secure the bolt 718 to the baseplate 710. When assembled, the bolt 718 is unable to be inadvertently disassembled or removed from the baseplate 710. The bolt 718 may be initially installed in an untightened position, the bolt 718 is threadably coupled to the baseplate 710 (or the retainer) to prevent removal of the bolt 718 from the baseplate 710. The bolt 718 is used to secure the lock assembly 715 (for example, the mounting lock 714 and the cable frame 716) to the baseplate 710. The pieces form the assembled unit 702 may be installed on the vehicle 50 without losing any of the pieces during assembly. The installer does not need a separate bolt to securely lock the antenna mount assembly 700 to the vehicle 50 during installation. Rather, all of the components of the antenna mount assembly 700 may be installed onto the vehicle 50 from above as the assembled unit 702.

In an exemplary embodiment, the antenna mount assembly 700 is used to hold one or more antenna cables 18. For example, the cable frame 716 of the lock assembly 715 may hold seven of the antenna cables 18. Optionally, a plurality of the antenna cables 18 may be held by the cable frame 716. The antenna cables 18 may be spaced apart around the cable frame 716. For example, the antenna cables 18 may be provided on multiple sides of the cable frame 716. The antenna cables 18 are configured to be electrically connected to corresponding antenna elements 12 of the antenna 10 (shown in FIG. 1). The antenna mount assembly 700 is used to route the cables through the rooftop 52 of the vehicle 50 (shown in FIG. 1) from the antenna 10 at the exterior of the vehicle to other components at the interior of the vehicle 50, such as the radio, the GPS, the navigation system, or other components of the vehicle 50.

The baseplate 710 is shown as a square; however, the baseplate 710 may have other shapes in alternative embodiments. The baseplate 710 is configured to be coupled to the antenna 10 (shown in FIG. 1) and is used to mount the antenna 10 to the vehicle 50 (shown in FIG. 1). The baseplate 710 may be used to support the antenna circuit board 14 and/or the cover 16 of the antenna 10. In various embodiments, the baseplate 710 has a complementary shape as the antenna circuit board 14 and/or the cover 16. For example, the baseplate 710 may form a receptacle or chamber that receives the antenna circuit board 14. The baseplate 710 may have walls forming the chamber that receives the antenna circuit board 14. The cover 16 may be coupled to the walls of the baseplate 710.

The vehicle mounting bracket 712 is coupled to the baseplate 710. The vehicle mounting bracket 712 is used to couple the antenna mount assembly 700 to the rooftop 52 of the vehicle 50. For example, during initial installation, the antenna mount assembly 700 is loaded through the opening 54 in the rooftop 52 and the vehicle mounting bracket 712 is configured to be snap coupled to the rooftop 52 to initially hold the antenna mount assembly 700 in place at the opening 54 of the rooftop 52. In a latched position, the latches of the vehicle mounting bracket 712 are latchably coupled to the rooftop 52 to generally hold the position of the antenna mount assembly 700 on the rooftop 52 until the antenna mount assembly 700 can be tightened and locked into position on the vehicle 50. The vehicle mounting bracket 712 holds the general orientation and position of the baseplate 710 on the rooftop 52 of the vehicle 50 during assembly. The latches of the vehicle mounting bracket 712 may be unlatched (backed-off) of the rooftop 52 as the antenna mount assembly 700 is tightened and secured using the mounting lock 714.

In an exemplary embodiment, the cable frame 716 is integral with the mounting lock 714. The bolt 718 is coupled to the mounting lock 714. The bolt 718 extends through the antenna mount assembly 700 from the top of the antenna mount assembly 700 to the bottom of the antenna mount assembly 700. The bolt 718 is coupled to the baseplate 710 to secure the lock assembly 715 to the baseplate 710.

In an exemplary embodiment, the lock assembly 715 is located below the baseplate 710. For example, the cable frame 716 and the mounting lock 714 of the lock assembly 715 are located below the baseplate 710. The bolt 718 also extends below the baseplate 710. The lock assembly 715 and a portion of the bolt 718 are configured to be lowered through the opening 54 in the rooftop 52 to the interior of the vehicle 50.

During installation, the lock assembly 715 may be rotated relative to the baseplate 710 to a locked position. For example, the cable frame 716 and the mounting lock 714 may be rotated relative to the baseplate 710 to a locked position. In the locked position, the mounting lock 714 engages the bottom side of the rooftop 52 to lock the antenna mount assembly 700 to the rooftop 52. In an exemplary embodiment, the mounting lock 714 is rotated to the locked position by tightening the bolt 718. In the illustrated embodiment, the bolt 718 is accessible from the bottom of the antenna mount assembly 700 and is thus accessible at the interior of the vehicle 50 during installation. The bolt 718 is tightened by rotating the bolt 718. As the bolt 718 is tightened, the lock assembly 715 is advanced toward the rooftop 52 and rotated to the locked position. The lock assembly 715 is configured to be securely couple to the rooftop 52 in the locked position.

In an exemplary embodiment, the lock assembly 715 is electrically conductive. For example, the lock assembly 715 is manufactured from a metal material. Optionally, the lock assembly 715 may be a diecast component. In an exemplary embodiment, the bolt 718 is electrically conductive. For example, the bolt 718 is manufactured from a metal material. In an exemplary embodiment, the baseplate 710 is electrically conductive. For example, the baseplate 710 may be manufactured from a metal material. Optionally, the baseplate 710 may be a stamped and formed part. When installed, the antenna mount assembly 700 is electrically grounded to the rooftop 52 of the vehicle 50. The lock assembly 715 engages and is electrically connected to the rooftop 52. The bolt 718 engages and is electrically connected to the lock assembly 715, such as to the mounting lock 714. The bolt 718 extends through the antenna mount assembly 700 and is coupled to the baseplate 710. The baseplate 710 is electrically grounded to the rooftop 52 through the bolt 718 and through the lock assembly 715. In an exemplary embodiment, the baseplate 710 forms a ground plane for the antenna 10. For example, the baseplate 710 may be electrically connected to the antenna circuit board 14 and/or the antenna elements 12.

In an exemplary embodiment, the vehicle mounting bracket 712 is separate and discrete from the lock assembly 715 and is coupled to the lock assembly 715. The vehicle mounting bracket 712 may be a molded part, such as an injection molded part. In an exemplary embodiment, the vehicle mounting bracket 712 may be manufactured from a different material than the material of the lock assembly 715. For example, the vehicle mounting bracket 712 may be manufactured from a plastic material. The vehicle mounting bracket 712 is configured to be deformed, such as deflecting the latches, during latching and unlatching.

In an exemplary embodiment, the vehicle mounting bracket 712 includes a base mount 740 and a rooftop latch 752 extending from the base mount 740. In various embodiments, multiple vehicle mounting brackets 712 may be provided, such as on opposite sides of the lock assembly 715. In other various embodiments, a single vehicle mounting bracket 712 is provided, which may include multiple rooftop latches 752. The rooftop latches 752 are configured to be latchably coupled to the rooftop 52. For example, during installation, as the antenna mount assembly 700 is lowered through the opening 54 and the rooftop 52, the rooftop latches 752 extend through the opening 54 in the rooftop 52 to engage the interior surface 56 of the rooftop 52.

Each rooftop latch 752 includes a latch arm 754 having a latch surface 756 configured to engage the rooftop 52. When latched, the antenna mount assembly 700 is loosely coupled to the rooftop 52. The antenna mount assembly 700 is secured from incidental falling off for removal from the rooftop 52 while installation is completed and the antenna mount assembly 700 is locked onto the rooftop 52 (for example, using the lock assembly 715. The latch arms 754 are deflectable. In an exemplary embodiment, the latch arms 754 may be deflected inward by a predetermined force. However, the latch arms 754 resist outward deflection and require a much higher force to deflect outward, such as greater than three times the inward deflection force, or more. As such the vehicle mounting bracket 712 may be easily pressed through the opening in the rooftop 52 to clip onto the rooftop 52 to the latched position. However, the amount of force needed to press the antenna mount assembly 700 back through the opening in the rooftop 52 is a much higher force.

Figure 44:
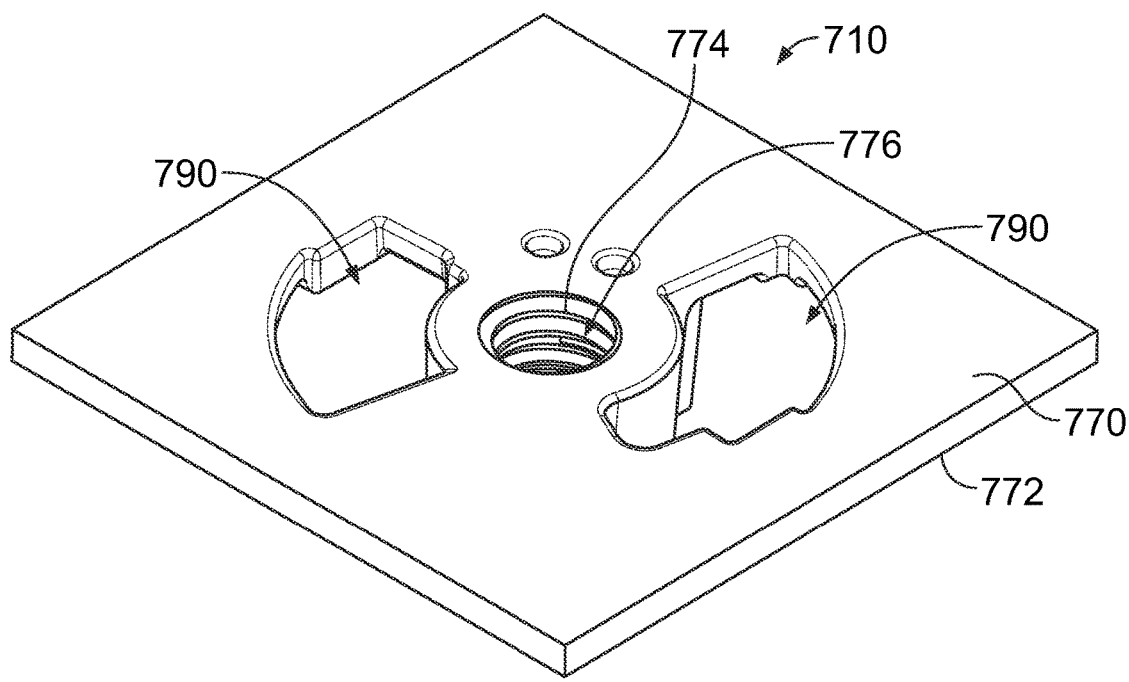
FIG. 44 is a top perspective view of the baseplate in accordance with an exemplary embodiment.
Figure 45:
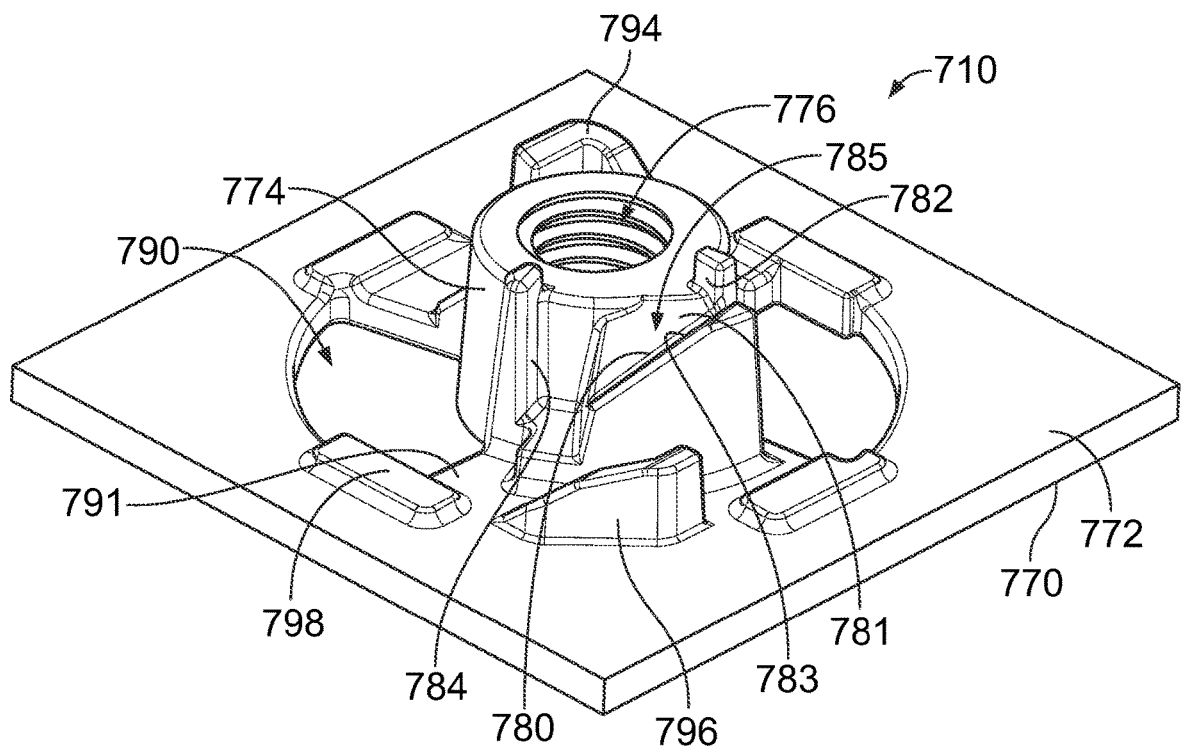
FIG. 45 is a bottom perspective view of the baseplate in accordance with an exemplary embodiment.

FIG. 44 is a top perspective view of the baseplate 710 in accordance with an exemplary embodiment. FIG. 45 is a bottom perspective view of the baseplate 710 in accordance with an exemplary embodiment. In an exemplary embodiment, the baseplate 710 is manufactured from a conductive material, such as a metal material. The baseplate 710 may be stamped and formed from a blank or sheet of metal material. Alternatively, the baseplate 710 may be diecast or manufactured as a plated plastic structure.

The baseplate 710 includes an upper surface 770 and a lower surface 772. The lower surface 772 faces the exterior surface 58 of the rooftop 52 (shown in FIG. 1). In an exemplary embodiment, a seal (not shown) may be provided at the lower surface 772. For example, the seal may be a perimeter seal or a gasket provided between the lower surface 772 and the exterior surface 58.

The baseplate 710 includes a bolt hub 774 configured to receive the bolt 718. In an exemplary embodiment, the bolt hub 774 extends from the lower surface 772. The bolt hub 774 includes a threaded bore 776 extending therethrough. The bolt 718 is configured to be threadably coupled to the bolt hub 774 at the threaded bore 776.

In an exemplary embodiment, the baseplate 710 includes a slider ramp 780. The slider ramp 780 is configured to interface with the lock assembly 715 to position the lock assembly 715 relative to the baseplate 710. In the illustrated embodiment, the slider ramp 780 is provided at the exterior of the bolt hub 774. The slider ramp 780 may be provided at other locations in alternative embodiments. The slider ramp 780 is angled nonparallel to the upper surface 770 and the lower surface 772 of the baseplate 710. For example, the slider ramp 780 may wrap partially helically around the bolt hub 774. In various embodiments, the slider ramp 780 may wrap approximately 85° around the bolt hub 774. In an exemplary embodiment, the slider ramp 780 includes an inner wall portion 781 and an outer wall portion 783 forming a ramp pocket 785. The slider post of the lock assembly 715 is configured to be received in the ramp pocket 785. The inner and outer wall portions 781, 783 guide the slider post in the slider ramp 780. The inner and outer wall portions 781, 783 retain the guide post on the slider ramp 780. The lock assembly 715 is configured to slide along the slider ramp 780 during installation to position the lock assembly 715 relative to the baseplate 710.

In an exemplary embodiment, the baseplate 710 includes a first rotation stop element 782 and a second rotation stop element 784. The slider ramp 780 extends between the first and second rotation stop elements 782, 784. In the illustrated embodiment, the rotation stop elements 782, 784 are vertically extending walls. Other types of stop elements may be used in alternative embodiments. The rotation stop elements 782, 784 provide stop surfaces for the lock assembly 715. For example, the lock assembly 715 is unable to move along the slider ramp 780 past the first rotation stop element 782 or past the second rotation stop element 784. The movement of the lock assembly 715 is contained between the first rotation stop element 782 and the second rotation stop element 784. In an exemplary embodiment, the first and second rotation stop elements 782, 784 are radially offset from each other by between 30° and 60°. For example, the rotation stop elements 782, 784 may be radially offset from each other by approximately 45° in various embodiments. The slider ramp 780 and the rotation stop elements 782, 784 allow rotation movement of the lock assembly 715 by between 30° and 60°. For example, in the illustrated embodiment, the slider ramp 780 and the rotation stop elements 782, 784 may allow rotation of the lock assembly 715 by approximately 45°. In an exemplary embodiment, the first and second rotation stop elements 782, 784 may be vertically offset from each other. The slider ramp 780 may be angled between the rotation stop elements 782, 784 to allow vertical movement in addition to rotational movement of the lock assembly 715. In various embodiments, the first rotation stop element 782 and/or the second rotation stop element 784 may extend beyond the end of the bolt hub 774.

The baseplate 710 includes cable slots 790 extending therethrough. The cable slots 790 are configured to receive corresponding antenna cables 18 and allow the antenna cables 18 to pass through the baseplate 710. Optionally, the cable slots 790 may be sized/shaped differently to hold different numbers of the antenna cables 18 (for example, three cables 18 and four cables 18). For example, one of the cable slots 790 may include an extra cutout to receive an extra cable 18. In the illustrated embodiment, the cable slots 790 are separated by separating walls 791. In an exemplary embodiment, the cable slots 790 are elongated to allow the antenna cables 18 to move within the cable slots 790. For example, the antenna cables 18 may be rotated with the cable frame 716 within the cable slots 790. In the illustrated embodiment, the cable slots 790 follow arcuate paths. The cable slots 790 may have other shapes in alternative embodiments. In the illustrated embodiment, three cable slots 790 are provided. Greater or fewer cable slots 790 may be provided in alternative embodiments. Optionally, each cable slot 790 may receive multiple antenna cables 18. For example, each cable slot 790 may receive a pair of the antenna cables 18.

In an exemplary embodiment, the baseplate 710 includes pressure pads 798 on the upper surface 770. The pressure pads 798 may abut against the rooftop 52 to support the rooftop 52 during connection of the antenna mount assembly 700 to the rooftop 52. In the illustrated embodiment, four of the pressure pads 798 are provided spaced roughly evenly apart. Greater or fewer pressure pads 798 may be provided in alternative embodiments.

In an exemplary embodiment, the baseplate 710 includes a first rooftop locating feature 794 and a second rooftop locating feature 796. The rooftop locating features 794, 796 are used to locate the baseplate 710 relative to the rooftop 52. In various embodiments, the rooftop locating features 794, 796 include walls, tabs, posts or other types of projections having surfaces used to interface with the rooftop 52. The rooftop locating features 794, 796 extend from the lower surface 772 of the baseplate 710. In an exemplary embodiment, the rooftop locating features 794, 796 have different shapes. For example, the first rooftop locating feature 794 includes two walls oriented perpendicular to each other, whereas the second rooftop locating feature 796 includes three walls with a main wall extending at an angle, such as at a 45° angle, relative to the pair of the end walls. In various embodiments, the rooftop locating feature 796 is taller at one end and shorter at the opposite end. The edge of the rooftop locating feature 796 may be angled similar to the angle of the slider ramp 780. The walls of the rooftop locating features 794, 796 fit in the opening 54 in the rooftop 52 to orient the baseplate 710 relative to the rooftop 52. The rooftop locating features 794, 796 may fit in the corners of the opening 54. Other types of locating features may be used in alternative embodiments, such as a rib, a rail, a post, an opening, a channel, a slot, and the like.

Figure 46:
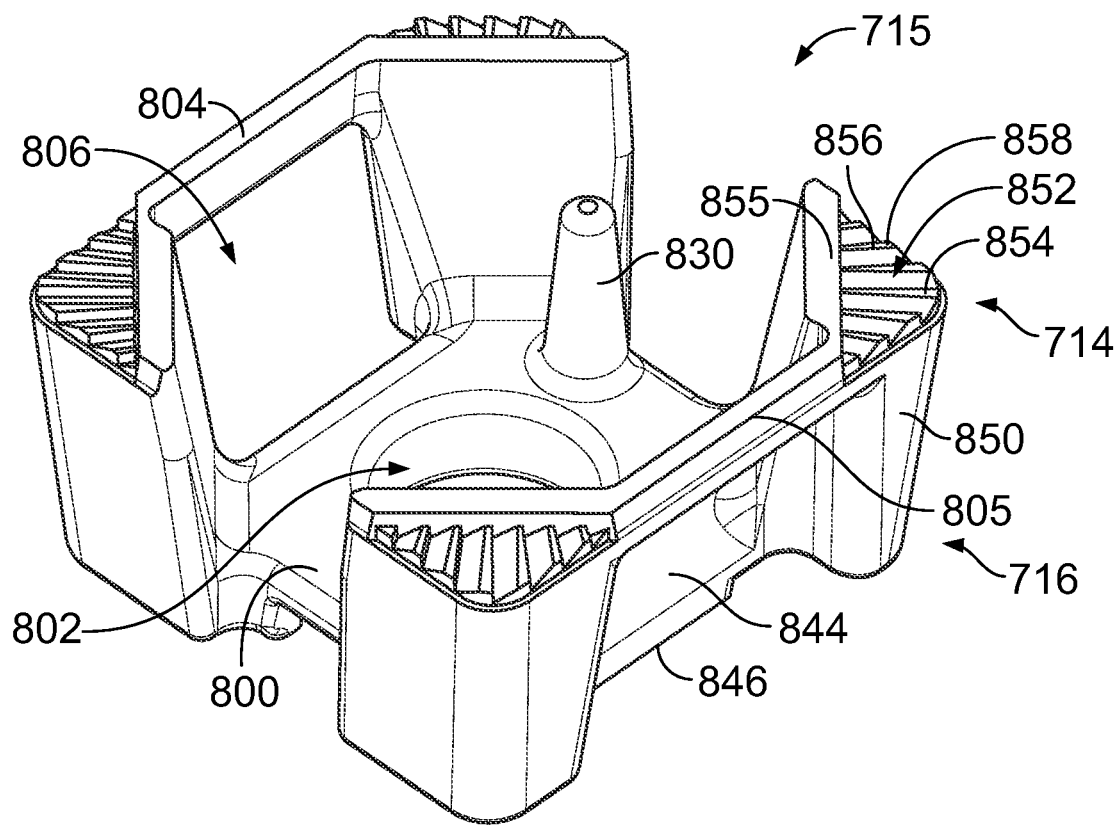
FIG. 46 is a top perspective view of the lock assembly in accordance with an exemplary embodiment.
Figure 47:
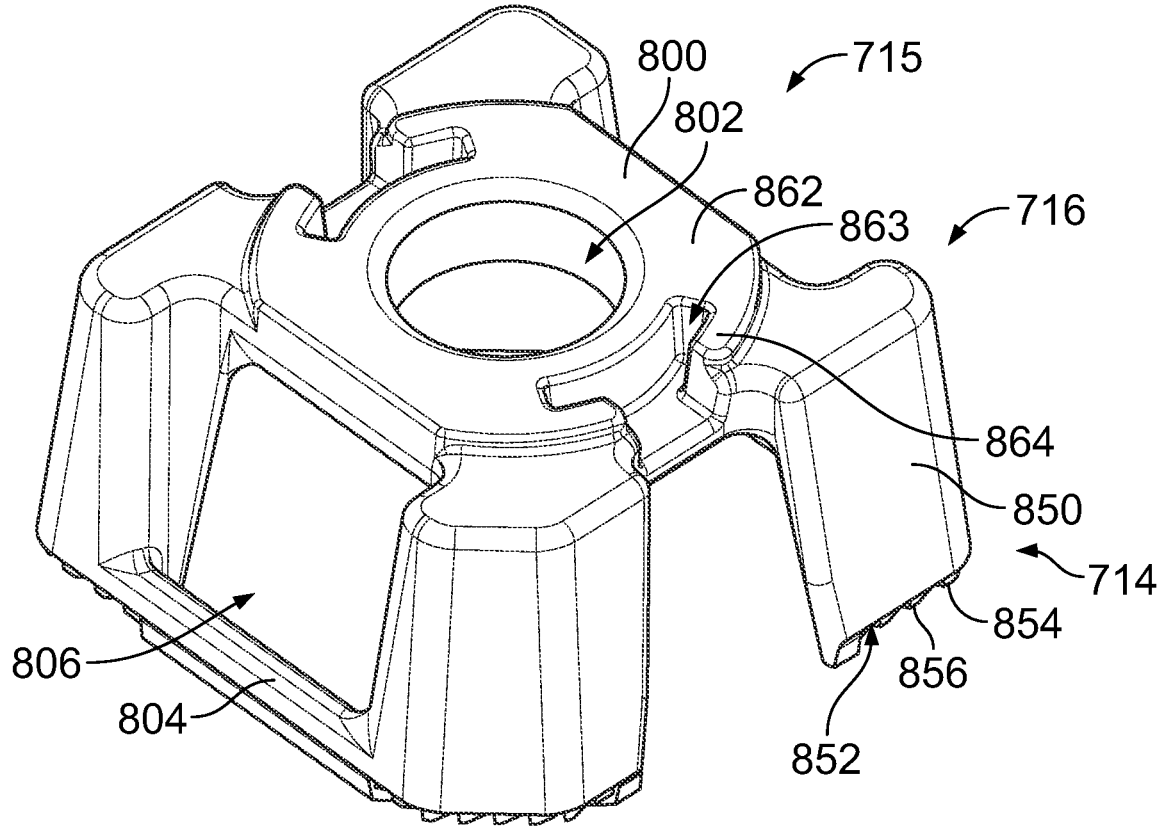
FIG. 47 is a bottom perspective view of the lock assembly in accordance with an exemplary embodiment.

FIG. 46 is a top perspective view of the lock assembly 715 in accordance with an exemplary embodiment. FIG. 47 is a bottom perspective view of the lock assembly 715 in accordance with an exemplary embodiment. The lock assembly 715 includes the mounting lock 714 and the cable frame 716. In an exemplary embodiment, the mounting lock 714 and the cable frame 716 are integrated into a unitary structure.

The lock assembly 715 includes a base 800 having an opening 802 therethrough configured to receive the bolt 718 (shown in FIG. 28). The opening 802 is provided at the interior of the lock assembly 715, such as approximately centered within the lock assembly 715. Optionally, the base 800 may be generally planar having an upper surface 844 and a lower surface 846. In the illustrated embodiment, the base 800 is generally rectangular, such as being square. The base 800 is sized and shaped to fit through the opening 54 in the rooftop 52 of the vehicle 50.

The cable frame 716 of the lock assembly 715 includes cable supports 804 for supporting the antenna cables 18. In the illustrated embodiment, the cable supports 804 extend between corresponding mounting legs 850. A cable window 806 is defined between the base 800 and the corresponding cable support 804 between the mounting legs 850. The antenna cables 18 are configured to pass through the cable window 806. The general positions of the antenna cables 18 are held by the cable supports 804. The cable supports 804 are provided at multiple sides of the base 800. For example, in the illustrated embodiment, the cable frame 716 includes cable supports 804 at two sides of the cable frame 716. The cable supports 804 may include support rails 805 configured to support the cable frame 716 relative to the rooftop. The support rails 805 may engage the rooftop 52 within the opening, such as to rotatably locate the cable frame 716 relative to the rooftop 52. The cable frame 716 may include cable openings 808 in the base 800 configured to receive corresponding antenna cables 18.

In an exemplary embodiment, the lock assembly 715 includes a slider post 830 extending from the base 800. The slider post 830 extends from the upper surface 844 of the base 800. The slider post 830 is configured to interface with the baseplate 710 (shown in FIG. 44) to position the lock assembly 715 relative to the baseplate 710. In an exemplary embodiment, the slider post 830 is configured to interface with the slider ramp 780 (shown in FIG. 45) of the baseplate 710. The slider post 830 is movable along the slider ramp 780 to position the cable frame 716 relative to the baseplate 710. The slider post 830 is configured to slide along the slider ramp 780, which causes the lock assembly 715 to rotate during assembly of the antenna mount assembly 700. Other types of locating features may be used in alternative embodiments to locate the lock assembly 715 relative to the baseplate 710.

In an exemplary embodiment, the lock assembly 715 includes one or more stop features 834 used to position the lock assembly 715 relative to the baseplate 710. Optionally, a side edge of the slider post 830 may define one of the stop features 834. The stop features 834 engage the stop features of the baseplate 710 to limit movement of the lock assembly 715 relative to the baseplate 710. For example, the stop features 834 may limit vertical movement and/or horizontal movement and/or rotating movement of the lock assembly 715 relative to the baseplate 710.

The mounting lock 714 of the lock assembly 715 includes a plurality of the mounting legs 850 extending from the base 800. In an exemplary embodiment, the mounting legs 850 are integral with the base 800. For example, the mounting legs 850 are diecast with the base 800. In the illustrated embodiment, the mounting legs 850 extend upward from the upper surface 844. Optionally, the mounting legs 850 may be solid legs for rigidity and strength for mating with the rooftop 52 of the vehicle 50. The mounting legs 850 are provided in the four corners of the base 800 in the illustrated embodiment. However, other locations are possible in alternative embodiments. Greater or fewer than four mounting legs 850 may be used in alternative embodiments. Each mounting leg 850 includes a foot 852 at the distal end 854 thereof. The foot 852 has a greater cross-sectional area than the mounting leg 850. The foot 852 includes support rails 855 extending along the inner end of the foot 852. The support rails 855 may extend from the support rails 805. The support rails 855 extend upward from the top of the foot 852. The support rails 855 are configured to support the cable frame 716 relative to the rooftop 52. The support rails 805 may engage the rooftop 52 within the opening, such as to rotatably locate the cable frame 716 relative to the rooftop 52.

The foot 852 has an upward facing engagement feature configured to engage the interior surface 56 of the rooftop 52 when the antenna mount assembly 700 is installed in the vehicle 50. In an exemplary embodiment, the engagement feature is serrated ribs 856 at the distal end 854 of the mounting leg 850. The serrated ribs 856 have edges 858 configured to interface with the rooftop 52. The edges 858 may scour or scrape the metal surface of the rooftop 52 during assembly to wipe against the interior surface 56 and create a metal-to-metal interface between the mounting lock 714 and the rooftop 52. For example, the edges 858 may remove the paint or plating on the rooftop 52 to engage the inner or base metal of the rooftop 52. Optionally, at least one of the feet 852 may have a different shape, such as for keying and orientation of the lock assembly 715 relative to the baseplate 710 and/or the rooftop 52. For example, the opening 54 in the rooftop 52 may have one or more corners that are shaped differently. The feet 852 are shaped to correspond with the shape of the opening 54 in the rooftop 52.

In an exemplary embodiment, the base 800 includes a bolt support seat 862 and support flanges 864. The support seat 862 and support flanges 864 form support surfaces for the head of the bolt 718. A space 863 is defined between the support seat 862 and the support flanges 864. The space 863 may be T-shaped. The space 863 may be curved in various embodiments. The space 863 is configured to receive the vehicle mounting brackets 712, such as the base mount 740. The bolt support seat 862 surrounds the opening 802. The bolt support seat 862 is configured to interface with the bolt 718 during assembly. For example, the bolt 718 may press against the bolt support seat 862 as the bolt 718 is tightened. The bolt 718 may scour or scrape the bolt support seat 862 when tightened to create an electrical connection between the bolt 718 and the base 800. The mounting lock 714 is configured to be electrically connected to the bolt 718 through the bolt support seat 862.

Figure 49:
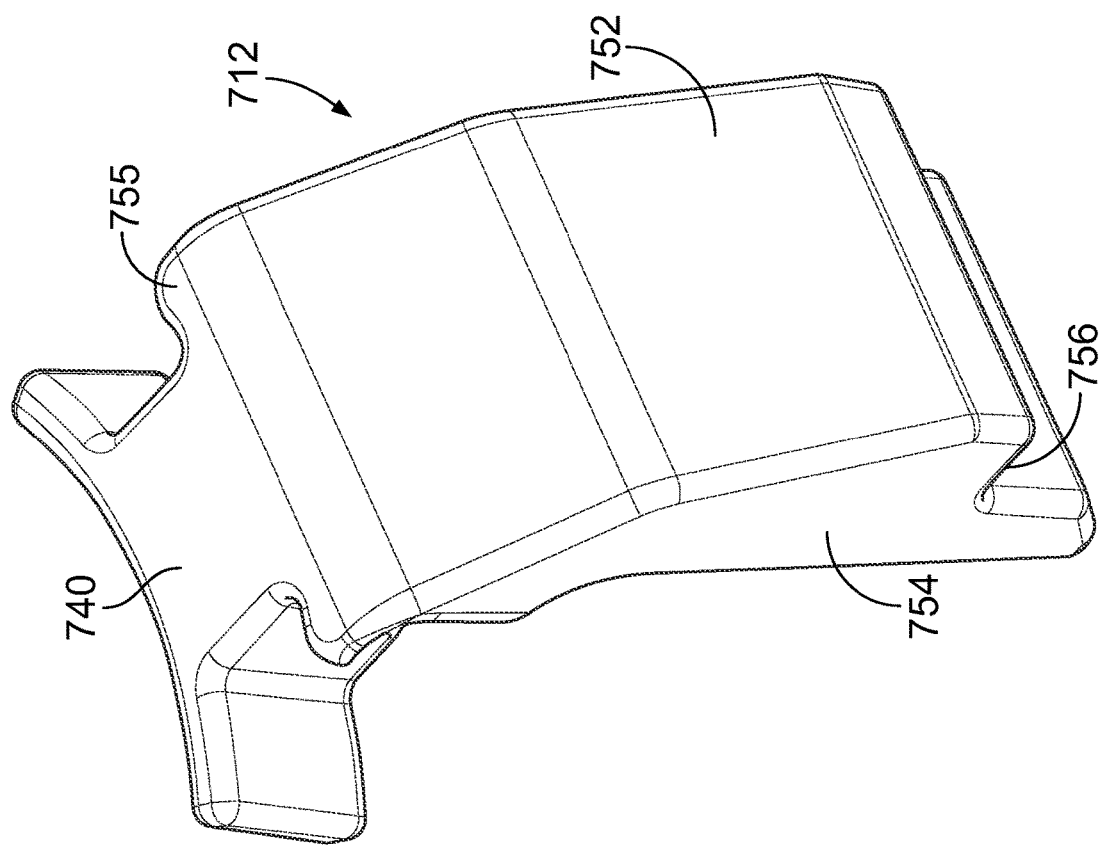
FIG. 49 is a bottom perspective view of the vehicle mounting bracket in accordance with an exemplary embodiment.
Figure 48:
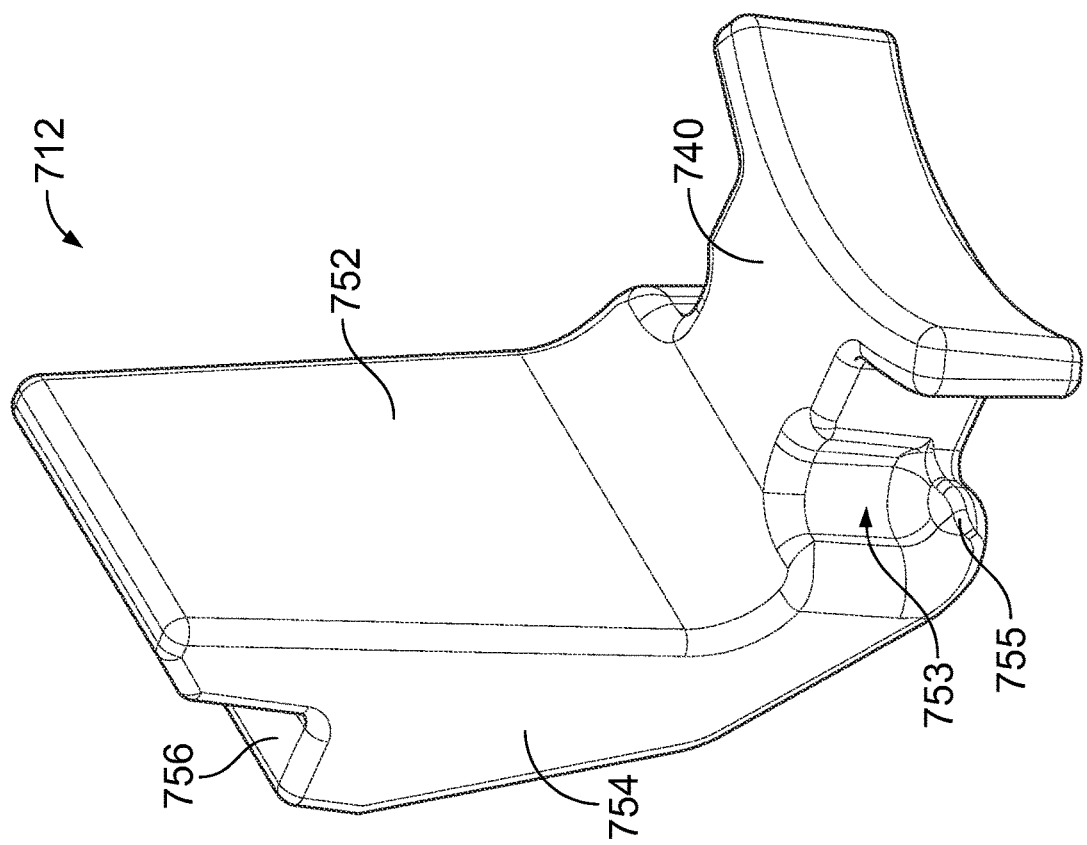
FIG. 48 is a top perspective view of the vehicle mounting bracket in accordance with an exemplary embodiment.

FIG. 48 is a top perspective view of the vehicle mounting bracket 712 in accordance with an exemplary embodiment. FIG. 49 is a bottom perspective view of the vehicle mounting bracket 712 in accordance with an exemplary embodiment. The vehicle mounting bracket 712 includes the base mount 740 and the rooftop latch 752 extending from the base mount 740. The rooftop latches 752 are configured to be latchably coupled to the rooftop 52.

The rooftop latch 752 includes the latch arm 754 extending from the base mount 740. The rooftop latch 752 may include pockets 753 between the latch arm 754 and the base mount 740. The pockets 753 reduce the width of the rooftop latch 752 to provide flexibility and allow the latch arm 754 to flex during assembly. The rooftop latch 752 includes support tabs 755 between the latch arm 754 and the base mount 740 adjacent the pockets 753. The support tabs 755 provide additional support and rigidity for the rooftop latch 752. The support tabs 755 may support the rooftop latch 752 relative to the cable frame 716. The latch arm 754 has a latch surface 756 at the distal end thereof configured to engage the rooftop 52. The latch arms 754 are deflectable. In an exemplary embodiment, the latch arms 754 may be deflected inward by a predetermined force. However, the latch arms 754 resist outward deflection and require a much higher force to deflect outward, such as greater than three times the inward deflection force, or more. As such the vehicle mounting bracket 712 may be easily pressed through the opening in the rooftop 52 to clip onto the rooftop 52 to the latched position. However, the amount of force needed to press the antenna mount assembly 700 back through the opening in the rooftop 52 is a much higher force.

Returning to FIGS. 42 and 43, the parts of the antenna mount assembly 700 are assembled together to form the assembled unit 702. The lock assembly 715 forms the lower portion 706. The lower portion 706 is coupled to the baseplate 710 using the bolt 718. The bolt 718 is threadably coupled to the baseplate 710 to hold the lock assembly 715 in place relative to the baseplate 710. The head 720 of the bolt 718 is located below the lock assembly 715 to capture the lock assembly 715 between the head 720 and the baseplate 710. As such, the lower portion 706 of the antenna mount assembly 700 is unable to be inadvertently removed from the upper portion 704 of the antenna mount assembly 700. The assembled unit 702 remains an assembled unit without worry of the various pieces coming apart during installation. Additionally, the installer does not need to hold the various parts together during installation. Rather, the installer may simply use a drill or ratchet tool to tighten the bolt 718 to complete installation to the vehicle 50. As such, the antenna mount assembly 700 may be assembled with one hand by the installer.

When assembled, the antenna cables 18 are held in the cable supports 804. The antenna cables 18 pass through the cable slots 790 in the baseplate 710. In an exemplary embodiment, one or more cable retainers (not shown) may be used to secure the antenna cables 18 to the antenna mount assembly 700. In an exemplary embodiment, the cable retainer may be tape wrapped around the lock assembly 715 to retain the antenna cables 18 in the cable supports 804. Other types of cable retainers may be used in alternative embodiments, such as a zip tie. The cable retainers organize the antenna cables 18 and hold the antenna cables 18 as part of the lower portion 706 for ease of loading the antenna mount assembly 700 (with the antenna cables 18) through the opening 54 in the rooftop 52. In an exemplary embodiment, the cable retainers may be coupled to the lock assembly 715 after the antenna mount assembly 700 is assembled, such as at a final stage of assembly.

When assembled, the feet 852 of the mounting legs 850 of the lock assembly 715 face the bottom side of the baseplate 710. The engagement surfaces 856 are spaced apart from the lower surface 772 of the baseplate 710. The gap or space between the peaked ribs 856 and the lower surface 772 is wide enough to receive the rooftop 52 of the vehicle 50. The bolt 718 is long enough to accommodate rooftops of different thicknesses. After the antenna mount assembly 700 is loaded onto the rooftop 52 and in the latched position (rooftop latches 752 coupled to the lower surface 772), the bolt 718 is tightened to close the gap and force the lock assembly 715 to a locked position to secure the antenna mount assembly 700 to the rooftop 52 of the vehicle 50. The feet 852 are pressed into engagement with the baseplate 710 in the locked position. In an exemplary embodiment, the lock assembly 715 is rotated, while moved upward, to move the mounting legs 850 from clearance positions to engagement positions.

Figure 50:
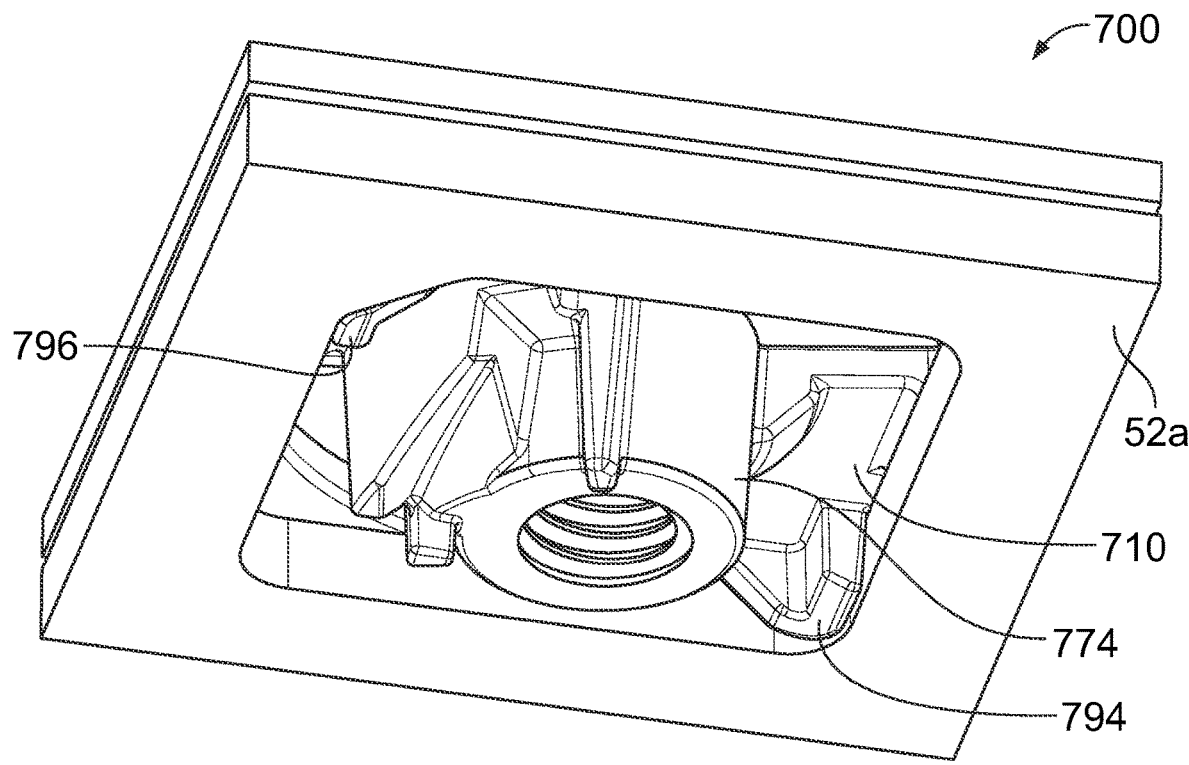
FIG. 50 is a bottom perspective view of a portion of the antenna mount assembly showing the baseplate coupled to a thick rooftop (as compared to the thin rooftop shown in FIG. 51) of the vehicle in accordance with an exemplary embodiment.
Figure 51:
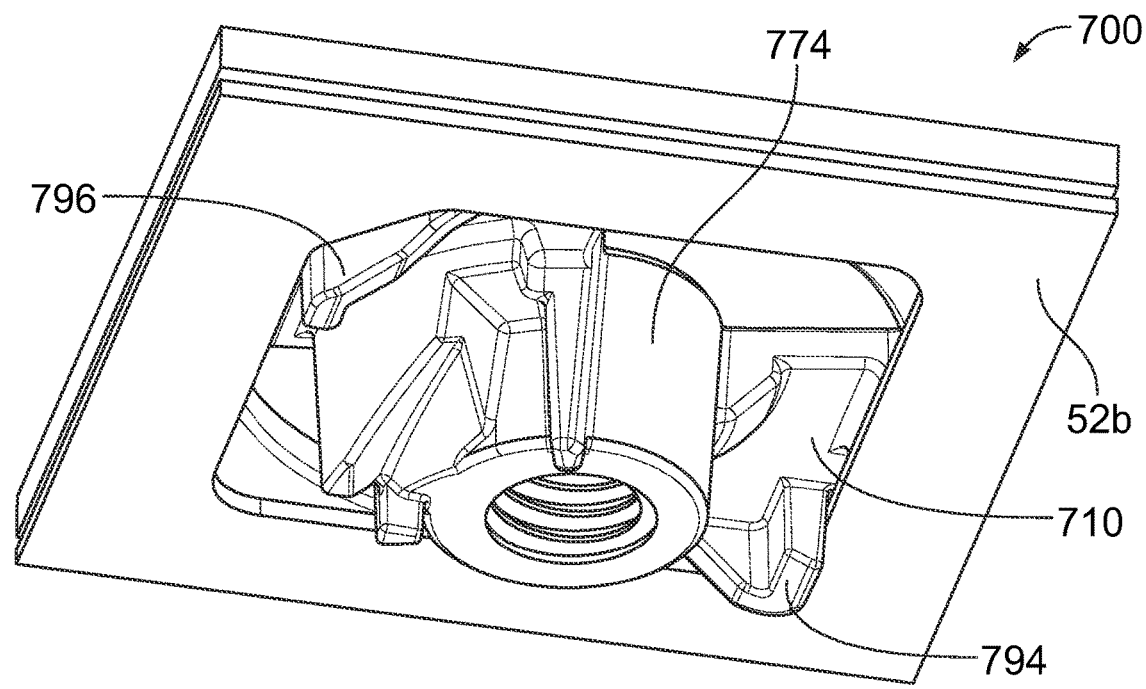
FIG. 51 is a bottom perspective view of a portion of the antenna mount assembly showing the baseplate coupled to a thin rooftop (as compared to the thick rooftop shown in FIG. 50) of the vehicle in accordance with an exemplary embodiment.

FIG. 50 is a bottom perspective view of a portion of the antenna mount assembly 700 showing the baseplate 710 coupled to a thick rooftop 52a (as compared to the thin rooftop 52b shown in FIG. 51) of the vehicle 50. FIG. 51 is a bottom perspective view of a portion of the antenna mount assembly 700 showing the baseplate 710 coupled to a thin rooftop 52b (as compared to the thick rooftop 52a shown in FIG. 50) of the vehicle 50. The bolt hub 774 extends through the opening 54 in the rooftop 52a, 52b. The rooftop locating features 794, 796 fit into the corners of the opening 54. The rooftop locating features 794, 796 position the baseplate 710 relative to the rooftop 52a, 52b. The rooftop locating features 794, 796 block rotation of the baseplate 710 relative to the rooftop 52a, 52b.

Figure 52:
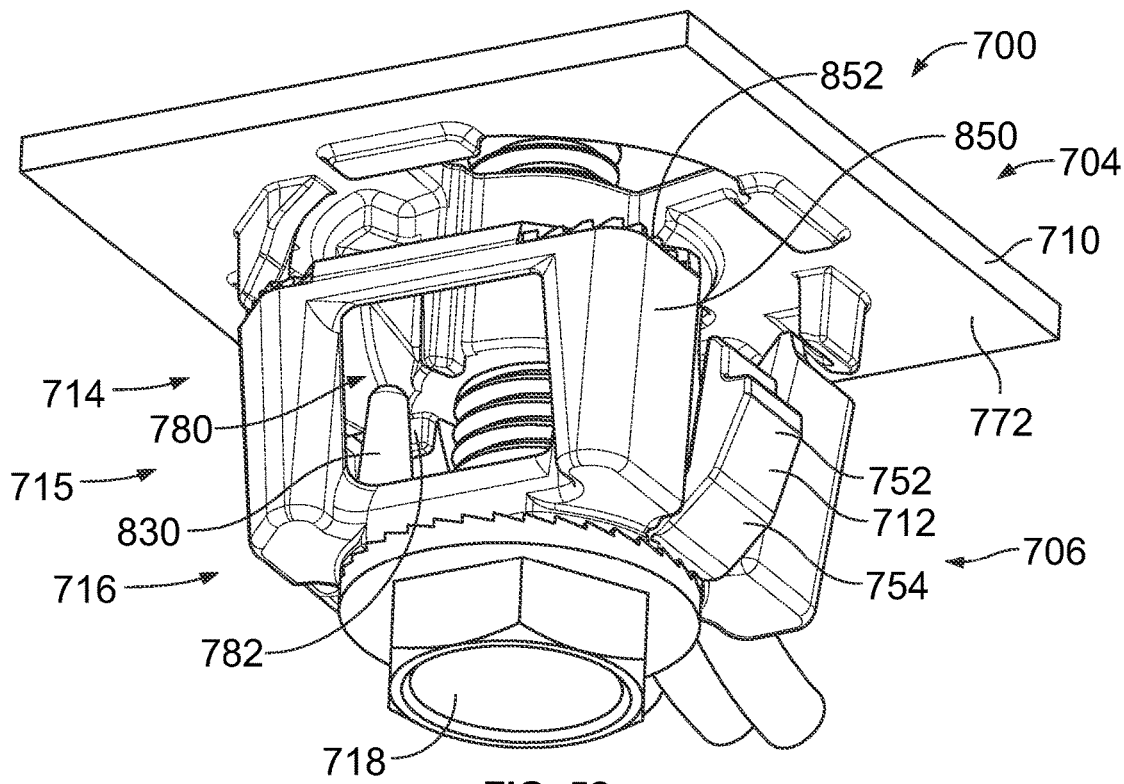
FIG. 52 is a bottom view of the antenna mount assembly in accordance with an exemplary embodiment showing the antenna mount assembly in a loading position.
Figure 53:
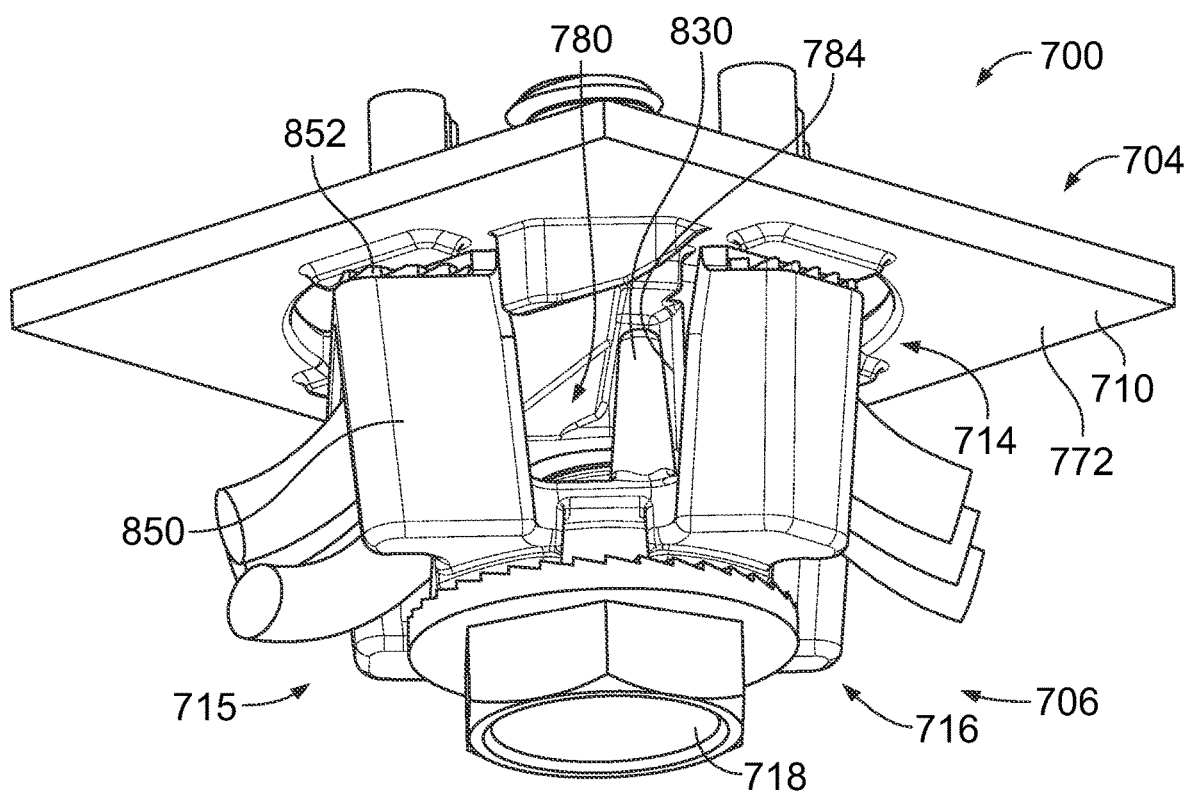
FIG. 53 is a bottom view of the antenna mount assembly in accordance with an exemplary embodiment showing the antenna mount assembly in a locked position.

FIG. 52 is a bottom view of the antenna mount assembly 700 in accordance with an exemplary embodiment showing the antenna mount assembly 700 in a loading position. FIG. 53 is a bottom view of the antenna mount assembly 700 in accordance with an exemplary embodiment showing the antenna mount assembly 700 in a locked position. The lock assembly 715 is rotatable relative to the baseplate 710 from the loading position to the locked position, such as by tightening the bolt 718. In the loading position, the lock assembly 715 is aligned relative to the baseplate 710 for loading through the opening 54 in the rooftop 52 (for example, the mounting legs 850 are oriented to pass through the opening 54). In the locked position, the lock assembly 715 is rotated to move the mounting legs 850 to interface with and engage the rooftop 52.

In the latched position (FIG. 53), the vehicle mounting bracket(s) 712 are configured to be latchably coupled to the rooftop 52. The rooftop latches 752 are configured to be coupled to the interior surface 56 of the rooftop 52. During installation, the lower portion 706 of the antenna mount assembly 700 is configured to be loaded through the opening 54 in the rooftop 52 from above. The antenna mount assembly 700 is loaded until the lower surface 772 of the baseplate 710 bottoms out against the exterior surface 58 of the rooftop 52. A seal (not shown) may be positioned between the lower surface 772 and the exterior surface 58 defining a sealed interface between the antenna mount assembly 700 and the rooftop 52. The rooftop latches 752 are loaded through the opening 54 in the rooftop 52. The latch arms 754 are clipped onto (for example, snappably coupled to) the rooftop 52. In an exemplary embodiment, the rooftop latches 752 are deflected inward when passing through the opening 54 and then snap outward after passing through the opening 54 to interface with the rooftop 52. The rooftop latches 752 resist uncoupling of the antenna mount assembly 700 from the rooftop 52. For example, the rooftop latches 752 block pass-through of the vehicle mounting bracket(s) 712 back through the opening 54. The vehicle mounting bracket(s) 712 may resist rotation of the antenna mount assembly 700 relative to the rooftop 52 when the rooftop latches 752 are coupled to the rooftop 52.

The lock assembly 715 is sized and shaped to fit through the opening 54 in the rooftop 52. For example, the cable frame 716 and the mounting lock 714 are sized and shaped to fit through the opening 54 in the rooftop 52. For example, the mounting legs 850 may be aligned with the corners 60 to pass through the opening 54. The lock assembly 715 is in a clearance position to pass through the opening 54. The lower portion 706 is able to drop through the opening 54 in the clearance position. Optionally, one of the corners 60 may have a chamfer or other keying feature for keyed mating of the antenna mount assembly 700 with the rooftop 52. The antenna mount assembly 700 can only be loaded through the opening 54 in a particular orientation. For example, the mounting leg 850 with the truncated foot 852a must be aligned with the chamfered corner for clearance and loading through the opening 54. Additionally, the vehicle mounting bracket 712 is only able to couple with the rooftop 52 in a single orientation. As such, the orientation of the baseplate 710 relative to the rooftop 52 is controlled by the keyed mating of the vehicle mounting bracket 712 with the rooftop 52. Other types of keying features may be used in alternative embodiments to orient the antenna mount assembly 700 with the rooftop 52. In other embodiments, the antenna mount assembly may be coupled to the rooftop 52 without keyed mating features.

In an exemplary embodiment, the lower portion 706 is oriented relative to the upper portion 704 using locating features, such as the slider post 830, the slider ramp 780, the rotation stop elements 782, 784, and the like. In the illustrated embodiment, in the clearance position (prior to torquing or tightening the bolt 718), the slider post 830 is at the top of the slider ramp 780. The slider post 830 engages the first rotation stop element 782 to locate the lock assembly 715 relative to the baseplate 710. The first rotation stop element 782 prevents rotation of the lock assembly 715 in one direction. As the bolt 718 is tightened, the slider post 830 is only able to slide along the slider ramp 780 in one direction away from the first rotation stop element 782. The lock assembly 715 is configured to be moved toward the rooftop 52, in a rotating direction, as the slider post 830 slides along the slider ramp 780. The lock assembly 715 is moved toward the rooftop 52 to close the gap between the mounting legs 850 and the rooftop 52. As the lock assembly 715 is rotated, the mounting legs 850 move from the clearance positions (aligned with the corners 60) to engagement positions (offset from the corners 60) The mounting legs 850 are aligned with the interior surface 56 of the rooftop 52 to engage the rooftop 52. The second rotation stop element 784 prevents over-rotation of the lock assembly 715 relative to the baseplate 710. A well may be provided at the second rotation stop element 784 that allows the slider post 830 to move vertically relative to the baseplate 710 at the second rotation stop element 784.

Figure 54:
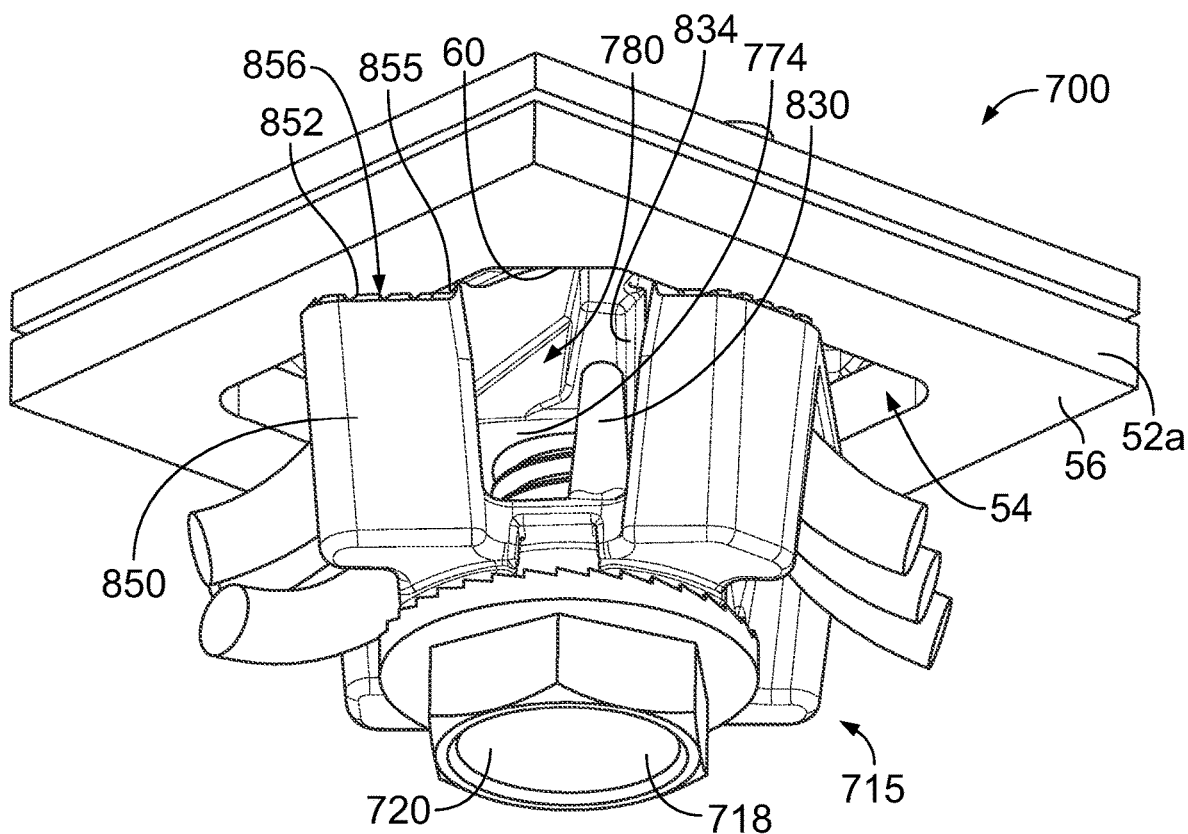
FIG. 54 is a bottom perspective view of the antenna mount assembly installed on the thick rooftop of the vehicle in the locked position in accordance with an exemplary embodiment.
Figure 55:
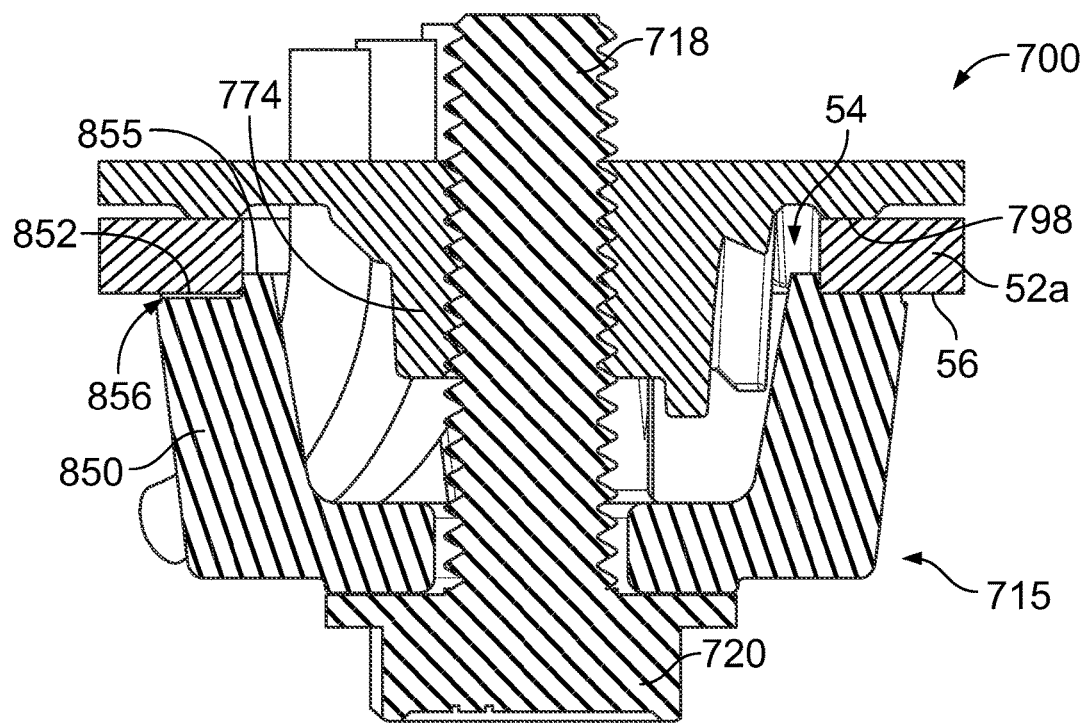
FIG. 55 is a cross sectional view of the antenna mount assembly installed on the thick rooftop of the vehicle in the locked position in accordance with an exemplary embodiment.
Figure 56:
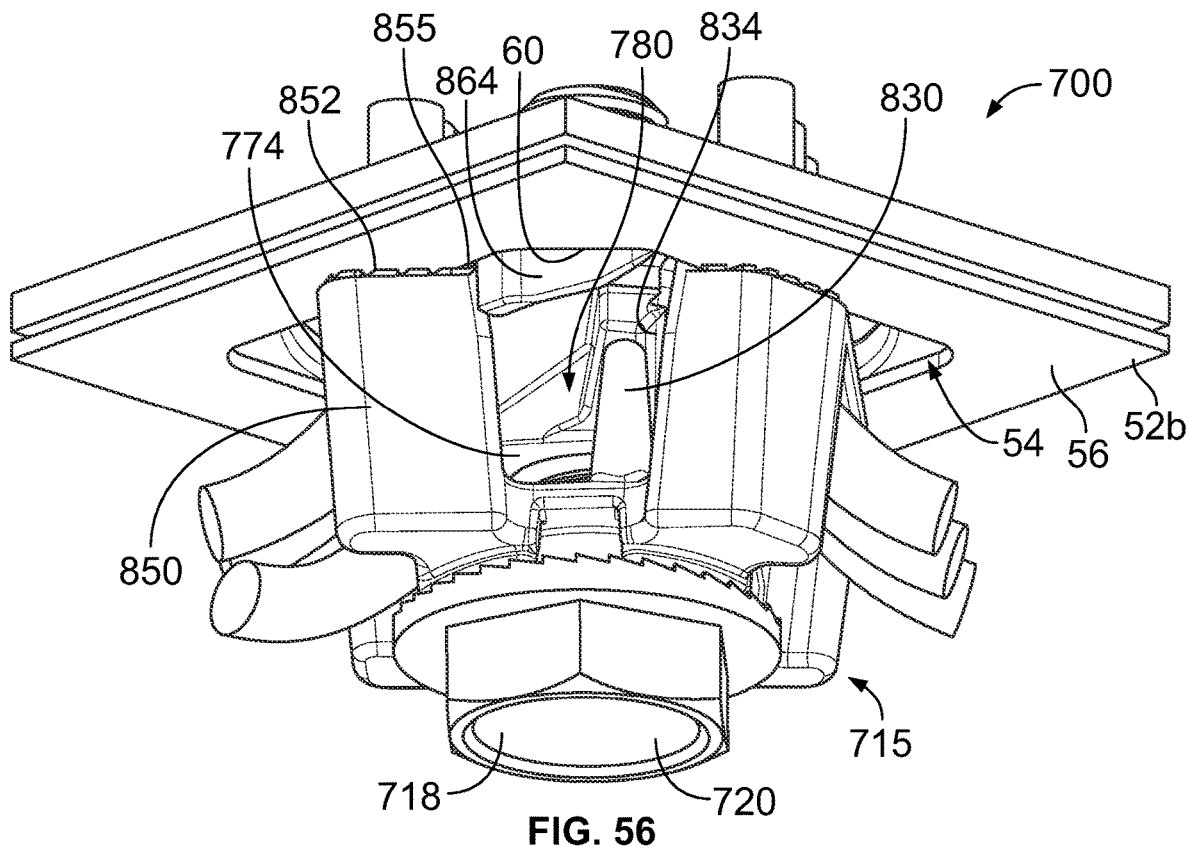
FIG. 56 is a bottom perspective view of the antenna mount assembly installed on the thin rooftop of the vehicle in the locked position in accordance with an exemplary embodiment.
Figure 57:
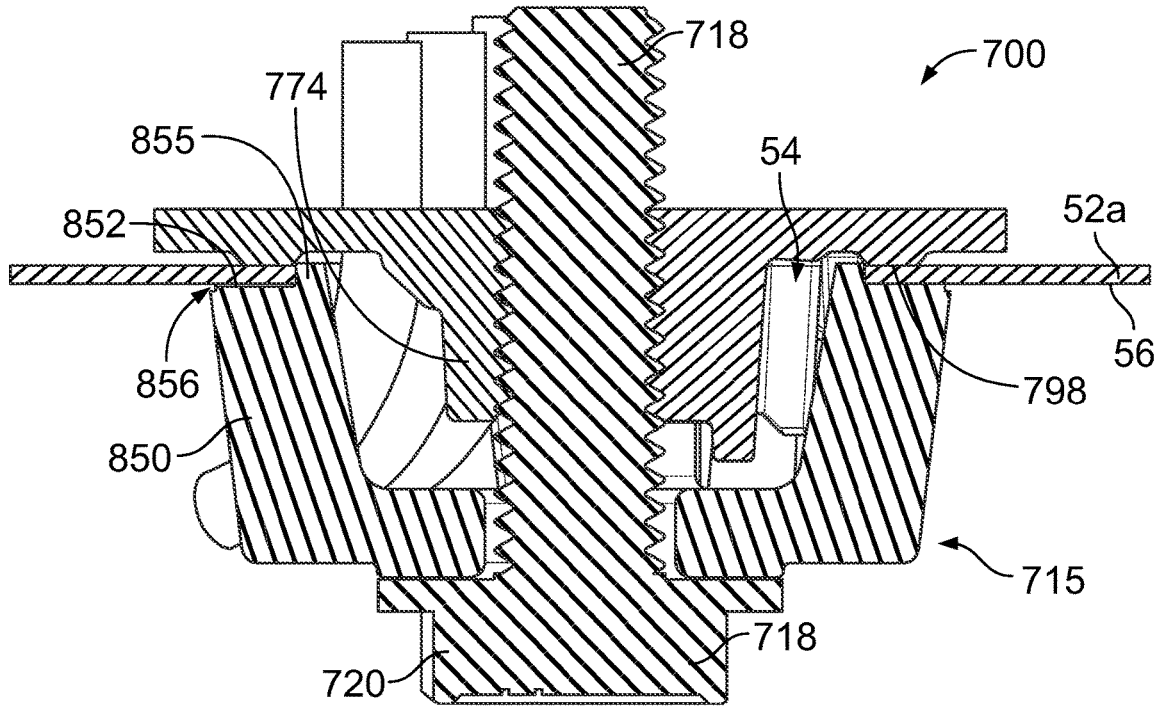
FIG. 57 is a cross sectional view of the antenna mount assembly installed on the thin rooftop of the vehicle in the locked position in accordance with an exemplary embodiment.

FIG. 54 is a bottom perspective view of the antenna mount assembly 700 installed on the thick rooftop 52a of the vehicle 50 in the locked position in accordance with an exemplary embodiment. FIG. 55 is a cross sectional view of the antenna mount assembly 700 installed on the thick rooftop 52a of the vehicle 50 in the locked position in accordance with an exemplary embodiment. FIG. 56 is a bottom perspective view of the antenna mount assembly 700 installed on the thin rooftop 52b of the vehicle 50 in the locked position in accordance with an exemplary embodiment. FIG. 57 is a cross sectional view of the antenna mount assembly 700 installed on the thin rooftop 52b of the vehicle 50 in the locked position in accordance with an exemplary embodiment.

During installation, the bolt 718 is tightened to lock the antenna mount assembly 700 to the rooftop 52. As the bolt 718 is tightened, the head 720 is driven into the support seat 862 of the lock assembly 715. As the lock assembly 715 is driven upward by the bolt 718, the slider post 830 of the lock assembly 715 is driven along the slider ramp 780. The slider post 830 rotates along the slider ramp 780 to rotate the lock assembly 715 and move the mounting legs 850 from the clearance position (FIG. 52) to the engaging position (FIG. 53). The mounting legs 850 are rotated to positions offset from the corners 60, such as along the edges of the opening 54 between the corners 60. In an exemplary embodiment, the lock assembly 715 is rotated approximately 45° to approximately center the feet 852 between the corners 60. The pressure pads 798 on the upper surface 770 of the baseplate 710 are aligned with the mounting legs 850. The rooftop 52 is captured between the pressure pads 798 and the mounting legs 850.

The serrated ribs 856 at the engagement surfaces of the feet 852 engage the interior surface 56 of the rooftop 52. The serrated rib 856 may wipe along the interior surface 56 to create a metal to metal connection between the lock assembly 715 and the rooftop 52. The support rails 855 engage the edges of the rooftop 52 forming the opening 54. The support rails 855 lock the lock assembly 715 to the rooftop 52. The support rails 855 may compress against the edges of the rooftop 52, such as to compress and/or crush the inner edge of the rooftop 52 and create a mechanical and electrical connection with the rooftop 52. The support rails 855 may scrape or scour the metal of the rooftop 52 to create a metal-to-metal connection with the rooftop 52.

The slider post 830 slides along the slider ramp 780 to the end. After the slider post 830 clears the end of the slider ramp 780, the lock assembly 715 is configured to be driven upward without rotating to drive the mounting legs 850 into the rooftop 52. The stop feature 834 may engage a stop wall of the bolt hub 774 to prevent further rotation of the lock assembly 715.

The bolt 718 is tightened to lock the mounting legs 850 against the rooftop 52 and prevent movement of the antenna mount assembly 700 relative to the rooftop 52. The shank of the bolt 718 is long enough to accommodate the thick rooftop 52a and the thin rooftop 52b. The bolt 718 is rotated further to bottom out the peaked ribs 856 against the rooftop 52.

Figure 58:
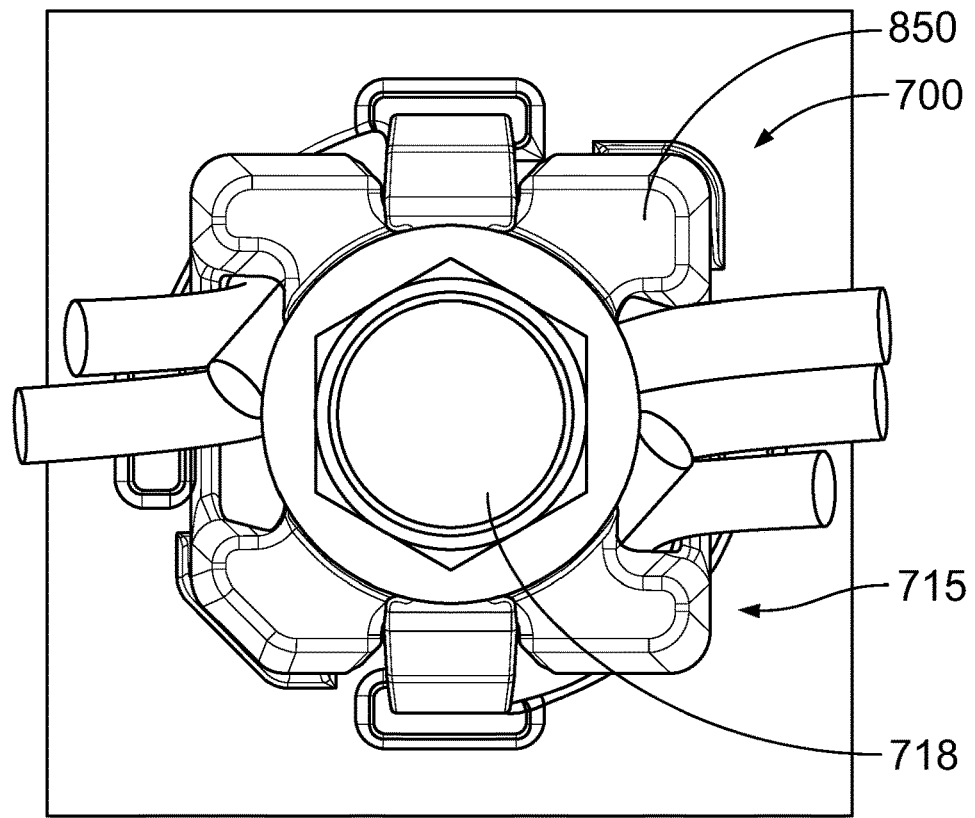
FIG. 58 is a bottom view of the antenna mount assembly partially installed on the rooftop of the vehicle in accordance with an exemplary embodiment.
Figure 59:
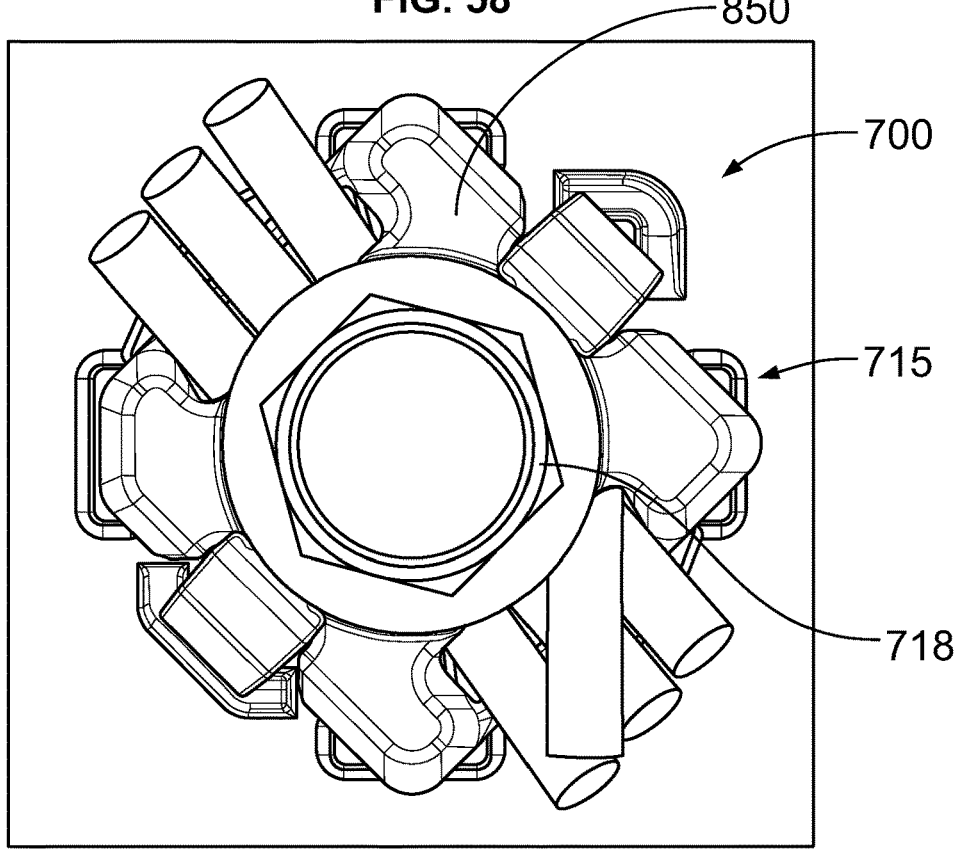
FIG. 59 is a bottom view of the antenna mount assembly locked to the rooftop of the vehicle in accordance with an exemplary embodiment.

FIG. 58 is a bottom view of the antenna mount assembly 700 in accordance with an exemplary embodiment in an unlocked position. FIG. 59 is a bottom view of the antenna mount assembly 700 in accordance with an exemplary embodiment in a locked position. During installation, the bolt 718 is tightened to lock the antenna mount assembly 700 to the rooftop 52 (not shown). As the bolt 718 is tightened, the lock assembly 715 is driven upward by the bolt 718 to rotate the lock assembly 715 and move the mounting legs 850 from the clearance position (FIG. 52) to the engaging position (FIG. 53). In an exemplary embodiment, the lock assembly 715 is rotated approximately 45° between the unlocked position and the locked position. The bolt 718 is tightened to lock the mounting legs 850 against the rooftop 52 and prevent movement of the antenna mount assembly 700 relative to the rooftop 52.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An antenna mount assembly comprising:
a baseplate having an upper surface and a lower surface, the lower surface configured to be coupled to an exterior surface of a rooftop of a vehicle, the baseplate having a bolt hub, the bolt hub having a sliding ramp angled non-parallel to the baseplate;
a lock assembly located below the lower surface of the baseplate and configured to face an interior surface of the rooftop of the vehicle, the lock assembly including a base and mounting legs extending from the base, the mounting legs configured to be coupled to the interior surface of the rooftop of the vehicle, the lock assembly including at least one cable opening configured to hold at least one antenna cable, the lock assembly having a slider post engaging the sliding ramp to locate the lock assembly relative to the baseplate; and a bolt coupled to the baseplate and tightened to move the lock assembly toward the baseplate, the slider post sliding along the sliding ramp as the lock assembly is moved toward the baseplate to rotate the lock assembly to a locked position, the mounting legs engaging the rooftop in the locked position.

2. The antenna mount assembly of claim 1, further comprising a vehicle mounting bracket, the vehicle mounting bracket including a rooftop latch latchably coupled to an interior surface of the rooftop of the vehicle.

3. The antenna mount assembly of claim 2, wherein the vehicle mounting bracket is coupled to the baseplate.

4. The antenna mount assembly of claim 2, wherein the vehicle mounting bracket is coupled to the base of the lock assembly.

5. The antenna mount assembly of claim 2, wherein the base includes an inner support flange and an outer support flange radially outward of the inner support flange, the vehicle mounting bracket including a base mount captured in a space between the inner support flange and the outer support flange, the rooftop latch extending from the base mount, the rooftop latch being deflectable, the rooftop latch including a latch pocket configured to receive the rooftop.

6. The antenna mount assembly of claim 5, wherein the base mount is captured in the space by the bolt.

7. The antenna mount assembly of claim 2, wherein the rooftop latch is deflectable inward from a normal position by a first force, the rooftop latch being deflectable outward from the normal position by a second force at least three times the first force.

8. The antenna mount assembly of claim 2, wherein the vehicle mounting bracket is a first vehicle mounting bracket, the antenna mount assembly further comprising a second vehicle mounting bracket, the second vehicle mounting bracket including a second rooftop latch latchably coupled to the interior surface of the rooftop of the vehicle.

9. The antenna mount assembly of claim 2, wherein the bolt is tightened to move the lock assembly toward the baseplate from a latched position to a locked position, wherein the rooftop latch is latchably coupled to the interior surface of the rooftop in the latched position to capture the rooftop between the rooftop latch and the baseplate in the latched position, the mounting legs being spaced apart from the rooftop in the latched position, and wherein the rooftop latch is separated from and spaced apart from the rooftop in the locked position, the mounting legs engaging the rooftop in the locked position to capture the rooftop between the mounting legs and the baseplate in the locked position.

10. The antenna mount assembly of claim 2, wherein the rooftop latch is separate and discrete from the base of the lock assembly and being coupled thereto, the vehicle mounting bracket being manufactured from a first material, the base being manufactured from a second material different than the first material.

11. The antenna mount assembly of claim 1, wherein the sliding ramp is located along an exterior of the bolt hub.

12. The antenna mount assembly of claim 1, wherein the sliding ramp includes an inner wall portion and an outer wall portion forming a ramp pocket, the slider post being received in the ramp pocket and guided along the sliding ramp by the inner wall portion and the outer wall portion.

13. The antenna mount assembly of claim 1, wherein the bolt hub includes a first rotation stop element and a second rotation stop element, the sliding ramp extending between the first and second rotation stop elements, the slider post movable along the sliding ramp between the first and second rotation stop elements.

14. The antenna mount assembly of claim 13, wherein the second rotation stop element is radially offset from the first rotation stop element by between 30° and 60° to allow rotation of the lock assembly between 30° and 60°.

15. The antenna mount assembly of claim 1, wherein the baseplate includes alignment features extending from the lower surface of the baseplate, the alignment features being received in an opening in the rooftop and configured to engage an edge of the rooftop defining the opening in the rooftop to locate the baseplate relative to the rooftop and maintain a rotational position of the baseplate relative to the rooftop.

16. The antenna mount assembly of claim 1, wherein the lock assembly is rotated from a clearance position to the locked position, the mounting legs being aligned with an opening in the rooftop of the vehicle in the clearance position to allow loading of the lock assembly through the opening, the mounting legs being offset from the opening and aligned with the rooftop in the locked position to engage the mounting legs with the rooftop in the locked position.

17. The antenna mount assembly of claim 1, wherein each mounting leg includes a peaked rib at a distal end of the mounting leg, the bolt being tightened to drive the peaked rib into engagement with the rooftop to secure the lock assembly to the rooftop.

18. The antenna mount assembly of claim 1, wherein each mounting leg includes serrated ribs at a distal end of the mounting leg, the bolt being tightened to drive the serrated ribs into engagement with the rooftop to secure the lock assembly to the rooftop.

19. The antenna mount assembly of claim 1, wherein each mounting leg includes a support rail at a distal end of the mounting leg, the bolt being tightened to drive the support rail into an opening in the rooftop to press the support rail into mechanical connection with an inner edge of the rooftop along the opening to secure the lock assembly to the rooftop.

20. The antenna mount assembly of claim 1, wherein the lock assembly is electrically conductive, the lock assembly being configured to electrically connect to the rooftop to electrically common the antenna mount assembly to the rooftop.

21. The antenna mount assembly of claim 20, wherein the baseplate is electrically connected to the lock assembly through the bolt, the baseplate is configured to be electrically connected to an antenna circuit board to ground the antenna circuit board to the rooftop of the vehicle through the antenna mount assembly.

22. The antenna mount assembly of claim 1, wherein the baseplate includes at least one cable slot extending therethrough configured to receive the corresponding at least one cable, the at least one cable being rotated within the corresponding at least one cable slot as the lock assembly is rotated relative to the baseplate.

23. The antenna mount assembly of claim 1, wherein the lock assembly includes a cable support extending between corresponding mounting legs, a cable window being defined between the base and the cable support between the mounting legs, the at least one cable passing through the cable window.

24. The antenna mount assembly of claim 1, wherein the bolt includes a retainer, the retainer being coupled to the baseplate.

25. The antenna mount assembly of claim 24, wherein the retainer includes a threaded nut coupled to a distal end of the bolt, the threaded nut being received in a nut pocket of the bolt hub, the threaded nut being rotated with the bolt relative to the baseplate as the bolt is tightened.

26. The antenna mount assembly of claim 1, wherein the bolt couples the lock assembly to the baseplate as an assembled unit to restrict inadvertent disassembly of the antenna mount assembly, the assembled unit configured to be mounted to the rooftop of the vehicle by passing the bolt and the lock assembly through an opening in the rooftop, the assembled unit configured to be loosely mounted to the rooftop of the vehicle by coupling a vehicle mounting bracket to the rooftop, the assembled unit configured to be tightly mounted to the rooftop of the vehicle by tightening the bolt to drive the mounting legs of the lock assembly into the interior surface of the rooftop to securely couple the assembled unit to the rooftop of the vehicle.

27. The antenna mount assembly of claim 1, wherein the bolt includes a head and a threaded shank, the head of the shank being serrated, the base of the lock assembly including a support surface, the serrated head of the bolt engaging the support surface to lock the bolt to the lock assembly.

28. An antenna mount assembly comprising:
- a baseplate having an upper surface and a lower surface, the lower surface configured to be coupled to an exterior surface of a rooftop of a vehicle, the baseplate having a bore extending through the baseplate, the baseplate including at least one cable slot extending therethrough configured to receive at least one antenna cable;
- a vehicle mounting bracket separate and discrete from the baseplate, the vehicle mounting bracket including a rooftop latch, the rooftop latch extending through an opening in the rooftop to latchably couple to an interior surface of the rooftop of the vehicle;
- a lock assembly located below the lower surface of the baseplate and configured to face the interior surface of the rooftop of the vehicle, the lock assembly including a base and mounting legs extending from the base, the mounting legs configured to be coupled to the interior surface of the rooftop of the vehicle, the lock assembly having at least one cable opening configured to hold the corresponding at least one antenna cable; and
- a bolt being movable from an untightened position to the tightened position, the bolt having a head and a shank, the head coupled to the base of the lock assembly and the shank being received in the bore and configured to be coupled to the baseplate in the untightened position to prevent removal of the bolt from the baseplate;
- wherein the bolt couples the lock assembly to the baseplate as an assembled unit to restrict disassembly of the antenna mount assembly, the assembled unit configured to be mounted to the rooftop of the vehicle by passing the bolt and the lock assembly through an opening in the rooftop, the assembled unit configured to be loosely mounted to the rooftop of the vehicle by coupling the vehicle mounting bracket to the rooftop, the assembled unit configured to be tightly mounted to the rooftop of the vehicle by tightening the bolt to drive the mounting legs of the lock assembly into the interior surface of the rooftop to securely couple the assembled unit to the rooftop of the vehicle.

29. The antenna mount assembly of claim 28, wherein the bolt is tightened to move the lock assembly toward the baseplate from a latched position to a locked position, wherein the rooftop latch is latchably coupled to the interior surface of the rooftop in the latched position to capture the rooftop between the rooftop latch and the baseplate in the latched position, the mounting legs being spaced apart from the rooftop in the latched position, and wherein the rooftop latch is separated from and spaced apart from the rooftop in the locked position, the mounting legs engaging the rooftop in the locked position to capture the rooftop between the mounting legs and the baseplate in the locked position.

30. The antenna mount assembly of claim 28, wherein the base includes an inner support flange and an outer support flange radially outward of the inner support flange, the vehicle mounting bracket including a base mount captured in a space between the inner support flange and the outer support flange, the rooftop latch extending from the base mount, the rooftop latch being deflectable, the rooftop latch including a latch pocket configured to receive the rooftop.

31. The antenna mount assembly of claim 28, wherein the bolt hub includes a sliding ramp angled non-parallel to the baseplate, the lock assembly includes a slider post engaging the sliding ramp to locate the lock assembly relative to the baseplate, wherein the slider post slides along the sliding ramp as the lock assembly are moved to the locked position.

32. The antenna mount assembly of claim 28, wherein the lock assembly is rotated from a clearance position to the locked position, the mounting legs being aligned with the opening in the rooftop of the vehicle to allow loading of the lock assembly through the opening, the mounting legs being offset from the opening and aligned with the rooftop in the locked position to engage the mounting legs with the rooftop in the locked position.

33. The antenna mount assembly of claim 28, wherein the rooftop latches of the vehicle mounting bracket are released from the rooftop when the bolt is tightened and the mounting legs are tightly coupled to the rooftop.

* * * * *